(12) United States Patent
In

(10) Patent No.: US 12,437,691 B1
(45) Date of Patent: Oct. 7, 2025

(54) SCAN DRIVER

(71) Applicant: Samsung Display Co., Ltd., Yongin-Si (KR)

(72) Inventor: Hai Jung In, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/113,538

(22) Filed: Feb. 23, 2023

(30) Foreign Application Priority Data

Aug. 31, 2022 (KR) .................. 10-2022-0110110

(51) Int. Cl.
*G09G 3/20* (2006.01)

(52) U.S. Cl.
CPC ....... *G09G 3/20* (2013.01); *G09G 2310/0289* (2013.01); *G09G 2310/08* (2013.01)

(58) Field of Classification Search
CPC ............. G09G 3/20; G09G 2310/0289; G09G 2310/08
See application file for complete search history.

(56) References Cited

U.S. PATENT DOCUMENTS

| | | | | |
|---|---|---|---|---|
| 7,529,333 B2 * | 5/2009 | Kim | .................. | G11C 19/28 377/67 |
| 8,830,156 B2 * | 9/2014 | Kim | .................. | G09G 3/3677 377/64 |
| 9,330,593 B2 | 5/2016 | Jang | | |
| 9,767,753 B2 * | 9/2017 | Park | .................. | G11C 19/287 |
| 10,056,024 B2 | 8/2018 | Kim et al. | | |
| 10,217,414 B2 * | 2/2019 | Park | .................. | G09G 3/3258 |
| 10,460,691 B2 | 10/2019 | Hwang et al. | | |
| 10,638,086 B2 | 4/2020 | Ahn et al. | | |
| 10,741,123 B2 * | 8/2020 | Moon | .................. | H01L 27/1214 |
| 10,847,082 B2 * | 11/2020 | Kim | .................. | G09G 3/32 |
| 10,923,064 B2 | 2/2021 | Takeuchi et al. | | |
| 10,950,320 B2 * | 3/2021 | Xie | .................. | G09G 3/3677 |
| 11,127,339 B2 | 9/2021 | Kim et al. | | |

(Continued)

FOREIGN PATENT DOCUMENTS

| | | |
|---|---|---|
| CN | 111986600 A | 11/2020 |
| KR | 10-2017-0035404 A | 3/2017 |

(Continued)

OTHER PUBLICATIONS

Notice of Allowance was issued in the cross referenced U.S. Appl. No. 18/086,648 on Jan. 8, 2024, 21 pages.

*Primary Examiner* — Sejoon Ahn
(74) *Attorney, Agent, or Firm* — Innovation Counsel LLP

(57) ABSTRACT

A scan driver of the disclosure includes a plurality of stage groups configured to supply scan signals to scan lines based on clock signals, carry clock signals, and first and second powers. A first stage group of the stage groups includes a first stage configured to supply a first scan signal to a first scan line based on an input signal, a first clock signal of the clock signals, a first carry clock signal of the carry clock signals, and the first and second powers, and a second stage configured to supply a second scan signal to a second scan line based on the input signal, a second clock signal of the clock signals, a second carry clock signal of the carry clock signals, and the first and second powers. The first stage and the second stage are commonly connected to a first node and a second node.

19 Claims, 23 Drawing Sheets

(56) References Cited

U.S. PATENT DOCUMENTS

| | | | |
|---|---|---|---|
| 11,238,811 B2 | 2/2022 | Chung et al. | |
| 11,848,064 B2* | 12/2023 | Feng | G09G 3/20 |
| 2008/0049049 A1* | 2/2008 | Park | G09G 3/20 |
| | | | 345/690 |
| 2012/0105398 A1* | 5/2012 | Park | H03K 19/018521 |
| | | | 345/206 |
| 2013/0038587 A1* | 2/2013 | Song | G09G 3/20 |
| | | | 345/204 |
| 2014/0146031 A1* | 5/2014 | Lee | G11C 19/28 |
| | | | 345/212 |
| 2015/0187247 A1 | 7/2015 | Lee et al. | |
| 2015/0194089 A1* | 7/2015 | Nadiguebe | G09G 3/2092 |
| | | | 345/214 |
| 2019/0019454 A1* | 1/2019 | Chen | H10K 59/12 |
| 2019/0019460 A1* | 1/2019 | Shi | G09G 3/3266 |
| 2019/0019470 A1* | 1/2019 | Zeng | G09G 3/20 |
| 2019/0019474 A1* | 1/2019 | Jun | G06F 3/1446 |
| 2019/0021151 A1* | 1/2019 | Kim | H10K 71/00 |
| 2019/0155433 A1* | 5/2019 | Park | G06F 3/0416 |
| 2020/0027382 A1 | 1/2020 | Wang et al. | |
| 2020/0243018 A1 | 7/2020 | Kim et al. | |
| 2020/0320935 A1 | 10/2020 | Jeon | |
| 2021/0056908 A1 | 2/2021 | Park et al. | |
| 2021/0201799 A1 | 7/2021 | Kim et al. | |
| 2022/0101774 A1 | 3/2022 | Lim et al. | |
| 2022/0157250 A1 | 5/2022 | Kim et al. | |
| 2022/0206664 A1* | 6/2022 | Jung | G09G 3/3266 |
| 2023/0008896 A1 | 1/2023 | Noh et al. | |
| 2023/0105266 A1 | 4/2023 | Hong | |
| 2024/0013725 A1* | 1/2024 | Kim | G09G 3/3258 |
| 2024/0194150 A1* | 6/2024 | Noh | G09G 3/3291 |

FOREIGN PATENT DOCUMENTS

| | | |
|---|---|---|
| KR | 10-2018-0039232 A | 4/2018 |
| KR | 10-1980754 B1 | 5/2019 |
| KR | 10-2020-0049251 A | 5/2020 |
| KR | 10-2208397 B1 | 1/2021 |
| KR | 10-2021-0024343 A | 3/2021 |
| KR | 10-2316983 B1 | 10/2021 |

* cited by examiner

FIG. 6B

⟨SSP⟩

| | 1H | | | | | | | | | | | |
|---|---|---|---|---|---|---|---|---|---|---|---|---|
| SP | L | | | | | | | | | | | |
| CLK1 | L | | | | | | | | | | | |
| CLK2 | L | | | | | | | | | | | |
| CLK3 | L | | | | | | | | | | | |
| CLK4 | L | | | | | | | | | | | |
| RCLK1 | H | | | | | | | | | | | |
| RCLK2 | H | | | | | | | | | | | |
| RCLK3 | H | | | | | | | | | | | |
| RCLK4 | H | | | | | | | | | | | |
| QA1 | L | | | | | | | | | | | |
| QA2 | L | | | | | | | | | | | |
| QB_A | H | | | | | | | | | | | |
| QB_B | L | | | | | | | | | | | |
| CR1 | L | | | | | | | | | | | |
| CR2 | L | | | | | | | | | | | |
| CR3 | L | | | | | | | | | | | |
| CR4 | L | | | | | | | | | | | |
| ⋮ | | | | | | ⋮ | | | | | | |
| OUT1 | L | | | | | | | | | | | |
| OUT2 | L | | | | | | | | | | | |
| ⋮ | | | | | | ⋮ | | | | | | |
| GBI1 | H | | | | | | | | | | | |
| GBI2 | L | | | | | | | | | | | |

FIG. 7B
<SSP_1>

| | 1H | | | | | | | | | | |
|---|---|---|---|---|---|---|---|---|---|---|---|
| SP | L | | | | | | | | | | |
| CLK1 | L | | | | | | | | | | |
| CLK2 | L | | | | | | | | | | |
| CLK3 | L | | | | | | | | | | |
| CLK4 | L | | | | | | | | | | |
| RCLK1 | H | | | | | | | | | | |
| RCLK2 | H | | | | | | | | | | |
| RCLK3 | H | | | | | | | | | | |
| RCLK4 | H | | | | | | | | | | |
| QA1 | L | | | | | | | | | | |
| QA2 | L | | | | | | | | | | |
| QB_A | L | | | | | | | | | | |
| QB_B | H | | | | | | | | | | |
| CR1 | L | | | | | | | | | | |
| CR2 | L | | | | | | | | | | |
| CR3 | L | | | | | | | | | | |
| CR4 | L | | | | | | | | | | |
| ⋮ | | | | | | ⋮ | | | | | |
| OUT1 | L | | | | | | | | | | |
| OUT2 | L | | | | | | | | | | |
| ⋮ | | | | | | ⋮ | | | | | |
| GBI1 | L | | | | | | | | | | |
| GBI2 | H | | | | | | | | | | |

FIG. 17B

<SSP_2>

FIG. 18B

<SSP_3>

SCAN DRIVER

This application claims priority to Korean Patent Application No. 10-2022-0110110, filed on Aug. 31, 2022, and all the benefits accruing therefrom under 35 U.S.C. § 119, the content of which in its entirety is herein incorporated by reference.

BACKGROUND

1. Field

The disclosure relates to a scan driver.

2. Description of the Related Art

A display device includes a data driver for supplying a data signal to data lines, a scan driver for supplying a scan signal to scan lines, an emission driver for supplying an emission control signal to an emission control line, and pixels positioned to be connected to the data lines, the scan lines, and the emission control lines.

The scan driver includes a stage that generates the scan signal. The stage may include a plurality of transistors and capacitors, and may generate an output signal in which an input signal is shifted based on a plurality of clock signals.

SUMMARY

According to embodiments of the disclosure, a scan driver capable of minimizing a dead space is provided.

According to embodiments of the disclosure, a scan driver capable of improving power consumption is provided.

According to embodiments of the disclosure, a scan driver capable of improving reliability of transistors included in an output unit is provided.

A scan driver according to embodiments of the disclosure may include a plurality of stage groups configured to supply scan signals to scan lines based on clock signals, carry clock signals, a first power, and a second power. A first stage group of the stage groups may include a first stage and a second stage. The first stage is configured to supply a first scan signal to a first scan line based on an input signal, a first clock signal of the clock signals, a first carry clock signal of the carry clock signals, the first power, and the second power. The second stage is configured to supply a second scan signal to a second scan line based on the input signal, a second clock signal of the clock signals, a second carry clock signal of the carry clock signals, the first power, and the second power. The first stage and the second stage may be commonly connected to a first node and a second node.

In an embodiment, the first stage may include a first input unit, a first output unit, and a second output unit. The first input unit is configured to control a voltage of a third node based on the input signal and the second power. The first output unit is configured to output the first scan signal based on a voltage of the first node, a voltage of the second node, the voltage of the third node, the first clock signal, and the first power. The second output unit is configured to output a first carry signal based on the voltage of the first node, the voltage of the second node, the voltage of the third node, the first carry clock signal, and the second power. The second stage may include a second input unit, a third output unit, and a fourth output unit. The second input unit is configured to control a voltage of a fourth node based on the input signal and the second power. The third output unit is configured to output the second scan signal based on the voltage of the first node, the voltage of the second node, the voltage of the fourth node, the second clock signal, and the first power. The fourth output unit is configured to output a second carry signal based on the voltage of the first node, the voltage of the second node, the voltage of the fourth node, the second carry clock signal, and the second power.

In an embodiment, the first stage group may further include an output control circuit configured to control the voltage of the first node and the voltage of the second node based on a first node control signal, a second node control signal, the first power, the second power, the voltage of the third node, and the voltage of the fourth node.

In an embodiment, the output control circuit may include a first control unit, a second control unit, a third control unit, and a fourth control unit. The first control unit is configured to control the voltage of the first node based on a voltage of the first control node, the voltage of the third node, the voltage of the fourth node, the first power, and the second power. The second control unit is configured to control the voltage of the second node based on a voltage of the second control node, the voltage of the third node, the voltage of the fourth node, the first power, and the second power. The third control unit is configured to control the voltage of the first control node based on the first node control signal. The fourth control unit is configured to control the voltage of the second control node based on the second node control signal.

In an embodiment, each of the clock signals and each of the carry clock signals may have a constant signal level in at least a portion of one frame. The one frame may include a display scan period and a self-scan period. In the self-scan period, each of the carry clock signals may be maintained as a first level, and in the self-scan period, each of the clock signals may be maintained as a second level lower than the first level.

In an embodiment, each of the first node control signal and the second node control signal may have a constant signal level during one frame, and a signal level of the first node control signal may be different from a signal level of the second node control signal.

In an embodiment, the first input unit may include a first transistor and a second transistor. The first transistor is connected between a first input terminal to which a first input signal of the input signals is supplied and the third node, and has a gate electrode connected to the first input terminal. The second transistor is connected between the third node and a second power input terminal to which a voltage of the second power is supplied, and has a gate electrode connected to a fourth input terminal to which a second input signal of the input signals is supplied.

In an embodiment, the first output unit may include a third transistor, a fourth transistor, and a fifth transistor. The third transistor is connected between a second input terminal to which the first clock signal is supplied and a first output terminal to which the first scan signal is output, and has a gate electrode connected to the third node. The fourth transistor is connected between a first power input terminal to which a voltage of the first power is supplied and the first output terminal, and has a gate electrode connected to the first node. The fifth transistor is connected between the first power input terminal and the first output terminal, and has a gate electrode connected to the second node.

In an embodiment, the second output unit may include a sixth transistor, and a seventh transistor. The sixth transistor is connected between the third node and a second output terminal to which the first carry signal is output, and has a gate electrode connected to the first node. The seventh transistor is connected between the third node and the second output terminal, and has a gate electrode connected to the second node.

In an embodiment, the second output unit may include an eighth transistor, a ninth transistor, and a tenth transistor. The eighth transistor is connected between a third input terminal to which the first carry clock signal is supplied and the second output terminal, and has a gate electrode connected to the third node. The ninth transistor is connected between a second power input terminal to which a voltage of the second power is supplied and the second output terminal, and has a gate electrode connected to the first node. The tenth transistor is connected between the second power input terminal and the second output terminal, and has a gate electrode connected to the second node.

In an embodiment, the first stage may further include a first capacitor connected between the third node and the second output terminal.

In an embodiment, the first control unit may include an eleventh transistor, a twelfth transistor, and a thirteenth transistor. The eleventh transistor is connected between the first control node and a first power input terminal to which a voltage of the first power is supplied, and has a gate electrode connected to the third node. The twelfth transistor is connected between the first node and a second power input terminal to which a voltage of the second power is supplied, and has a gate electrode connected to the third node. The thirteenth transistor is connected between the first control node and the first power input terminal, and has a gate electrode connected to the fourth node. The second control unit may include a fourteenth transistor, a fifteenth transistor, and a sixteenth transistor. The fourteenth transistor is connected between the second control node and the first power input terminal, and has a gate electrode connected to the third node. The fifteenth transistor is connected between the second node and the second power input terminal, and has a gate electrode connected to the fourth node. The sixteenth transistor is connected between the second control node and the first power input terminal, and has a gate electrode connected to the fourth node.

In an embodiment, the third control unit may include a seventeenth transistor, and an eighteenth transistor. The seventeenth transistor is connected between a fifth input terminal to which the first node control signal is supplied and the first control node, and has a gate electrode connected to the fifth input terminal. The eighteenth transistor is connected between the fifth input terminal and the first node, and has a gate electrode connected to the first control node. The fourth control unit may include a nineteenth transistor, and a twentieth transistor. The nineteenth transistor is connected between a sixth input terminal to which the second node control signal is supplied and the second control node, and has a gate electrode connected to the sixth input terminal. The twentieth transistor is connected between the sixth input terminal and the second node, and has a gate electrode connected to the second control node.

In an embodiment, the first control unit may further include a second capacitor connected between the first node and the first control node. The second control unit may further include a third capacitor connected between the second node and the second control node.

In an embodiment, the second output unit may further include a twenty-third transistor connected between the third node and the sixth transistor, and having a gate electrode connected to the third input terminal.

In an embodiment, the first stage may include a first input unit, a first output unit, and a second output unit. The first input unit is configured to control a voltage of a third node based on the input signal. The first output unit is configured to output the first scan signal based on a voltage of the first node, a voltage of the second node, the voltage of the third node, the first clock signal, and the first power. The second output unit is configured to output a first carry signal based on the voltage of the first node, the voltage of the second node, the voltage of the third node, the first carry clock signal, and the second power. The second stage may include a second input unit, a third output unit, and a fourth output unit. The second input unit is configured to control a voltage of a fourth node based on the input signal, a third output unit configured to output the second scan signal based on the voltage of the first node, the voltage of the second node, the voltage of the fourth node, the second clock signal, and the first power. Thea fourth output unit is configured to output a second carry signal based on the voltage of the first node, the voltage of the second node, the voltage of the fourth node, the second carry clock signal, and the second power.

In an embodiment, the first input unit may include a first transistor connected between a first input terminal to which a first input signal of the input signal is supplied and the third node, and having a gate electrode connected to a fourth input terminal to which a second input signal of the input signal is supplied. The second input signal may be a third carry clock signal of the carry clock signals.

In an embodiment, the first stage group may further include a third stage configured to supply a third scan signal to a third scan line based on the input signal, a third clock signal of the clock signals, a third carry clock signal of the carry clock signals, the first power, and the second power. The third stage may be commonly connected to the first node and the second node together with the first stage and the second stage.

In an embodiment, the third stage may include a third input unit, a fifth output unit, and a sixth output unit. The third input unit is configured to control a voltage of a fifth node based on the input signal and the second power. The fifth output unit is configured to output the third scan signal based on the voltage of the first node, the voltage of the second node, the voltage of the fifth node, the third clock signal, and the first power. The sixth output unit is configured to output a third carry signal based on the voltage of the first node, the voltage of the second node, the voltage of the fifth node, the third carry clock signal, and the second power. The first stage group may further include an output control circuit configured to control the voltage of the first node and the voltage of the second node based on a first node control signal, a second node control signal, the first power, the second power, the voltage of the third node, and the voltage of the fifth node.

A scan driver according to embodiments of the disclosure may include a plurality of stage groups configured to supply scan signals to scan lines based on clock signals, carry clock signals, a first power, and a second power. A first stage group of the stage groups may include a first stage, a second stage, and an output control circuit. The first stage is configured to supply a first scan signal to a first scan line by controlling a voltage of a third node based on an input signal, a first clock signal of the clock signals, a first carry clock signal of the carry clock signals, the first power, the second power, and a voltage of a first node or a second node. The second stage is configured to supply a second scan signal to a second scan line by controlling a voltage of a fourth node based on the input signal, a second clock signal of the clock signals, a second carry clock signal of the carry clock signals, the first power, the second power, and the voltage of the first node or the second node. The output control circuit is configured to control the voltage of the first node and the voltage of the second node based on a first node control signal, a second node control signal, the first power, the second power, the voltage of the third node, and the voltage of the fourth node.

The scan driver according to embodiments of the disclosure may include the output control circuit for controlling a voltage level of an output control node included in each of a plurality of adjacent stages. For example, the plurality of adjacent stages may share the output control node, and an output operation of the plurality of adjacent stages may be controlled by one output control circuit. Accordingly, a dead space of the scan driver may be minimized.

In addition, according to embodiments of the disclosure, in a self-scan period in which scan signals are output as a gate-off level during one frame period, the clock signals and the carry clock signals may be maintained as a constant signal level. Accordingly, power consumption for transiting (or clocking) each of a signal level of the clock signals and a signal level of the carry clock signals to a constant period may be reduced.

In addition, the scan driver according to embodiments of the disclosure may separate and drive transistors performing a pull-down function of the output unit in a frame unit. Therefore, reliability of the transistors performing the pull-down function may be improved.

However, an effect of the disclosure is not limited to the above-described effect, and may be variously expanded within a range without departing from the spirit and scope of the disclosure.

BRIEF DESCRIPTION OF THE DRAWINGS

The above and other features of the disclosure will become more apparent by describing in further detail embodiments thereof with reference to the accompanying drawings.

FIG. 5 is a timing diagram illustrating an example of driving the scan driver of FIG. 2 during power-on.

FIG. 6B is a timing diagram illustrating an example of driving the first stage group of FIG. 3 in a self-scan period.

FIG. 7B is a timing diagram illustrating an example of driving the first stage group of FIG. 3 in the self-scan period.

FIG. 17B is a timing diagram illustrating an example of driving the first stage group of FIG. 15 in the self-scan period.

FIG. 18B is a timing diagram illustrating an example of driving the first stage group of FIG. 15 in the self-scan period.

DETAILED DESCRIPTION

Figure 1:
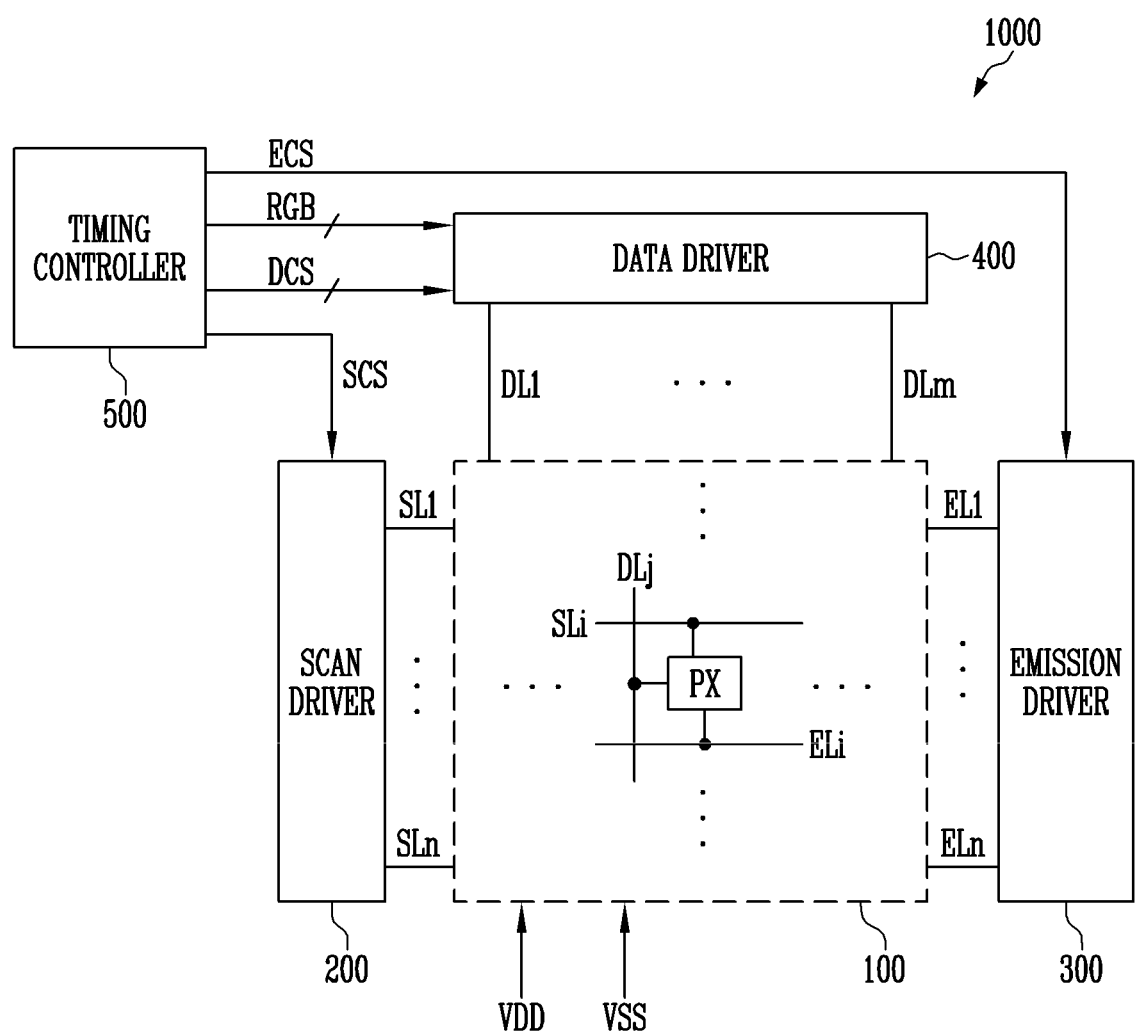
FIG. 1 is a block diagram illustrating a display device according to embodiments of the disclosure.

Hereinafter, an embodiment of the disclosure will be described in detail with reference to the accompanying drawings. The same reference numerals are used for the same components in the drawings, and repetitive description of the same components is omitted.

FIG. 1 is a block diagram illustrating a display device 1000 according to embodiments of the disclosure.

Referring to FIG. 1, the display device 1000 may include a pixel unit 100, a scan driver 200 (or a first gate driver), an emission driver 300 (or a second gate driver), a data driver 400, and a timing controller 500.

Hereinafter, the scan driver 200 and the emission driver 300 may be understood as one configuration of a gate driver.

The display device 1000 may display an image at various driving frequencies (image refresh rates, or screen refresh rates) according to a driving condition. The driving frequency is a frequency at which a data signal is substantially written to a driving transistor of a pixel PX. For example, the driving frequency may also be referred to as a screen scan rate or a screen refresh frequency, and may indicate a frequency at which a display screen is refreshed for one second. The display device 1000 may display an image in correspondence with various driving frequencies.

In an embodiment, an output frequency of the data driver 400 for one horizontal line (or pixel row) and/or an output frequency of the scan driver 200 outputting a scan signal may be determined in correspondence with the image refresh rate. For example, a refresh rate for driving a moving image may be a frequency of about 60 Hz or higher (for example, 80 Hz, 96 Hz, 120 Hz, 240 Hz, or the like).

In an embodiment, the display device 1000 may adjust the output frequency of the scan driver 200 for one horizontal line (or pixel row) and the output frequency of the data driver 400 corresponding thereto according to a driving condition. For example, the display device 1000 may display an image in correspondence with various image refresh rates of 1 Hz to 240 Hz. However, the display device 1000 may display an image at an image refresh rate of 240 Hz or higher (for example, 480 Hz) in an embodiment.

The pixel unit 100 may display an image. The pixel unit 100 may include pixels PX positioned to be connected to data lines DL1 to DLm, scan lines SL1 to SLn, and emission control lines EL1 to ELn. The pixels PX may receive voltages of first driving power VDD, second driving power VSS, and initialization power from the outside. In an embodiment, a voltage level of the second driving power VSS may be lower than a voltage level of the first driving power VDD. For example, the voltage of the first driving power VDD may be a positive voltage, and the voltage of the second driving power VSS may be a negative voltage.

Additionally, the pixels PX may be connected to one or more scan lines SLi and emission control lines ELi in correspondence with a pixel circuit structure. The pixel PX may include a driving transistor, a plurality of switching transistors implemented as at least one of an n-type transistor and a p-type transistor, and a light emitting element.

The timing controller 500 may receive an input control signal and an input image signal from an image source such as an external graphic device. The timing controller 500 may generate image data RGB suitable for an operation condition of the pixel unit 100 based on the input image signal and provide the image data RGB to the data driver 400. The timing controller 500 may generate a first control signal SCS for controlling a driving timing of the scan driver 200, a second control signal ECS for controlling a driving timing of the emission driver 300, and a third control signal DCS for controlling a driving timing of the data driver 400, based on the input control signal. The timing controller 500 may provide the first control signal SCS, the second control signal ECS, and the third control signal DCS to the scan driver 200, the emission driver 300, and the data driver 400, respectively.

The scan driver 200 may receive the first control signal SCS from the timing controller 500. The scan driver 200 may supply a scan signal to the scan lines SL1 to SLn in response to the first control signal SCS. The first control signal SCS may include a start pulse and a plurality of clock signals for the scan signal.

In an embodiment, the scan driver 200 may supply the scan signal to the scan lines SL1 to SLn at the same frequency (for example, a second frequency) as the image refresh rate of the display device 1000. Here, the scan signal may be a scan signal for writing a data signal to the driving transistor of the pixel PX. The second frequency may be set to a divisor of a first frequency for driving the emission driver 300.

The scan driver 200 may supply a scan signal having a gate-on level of a pulse to the scan lines SL1 to SLn in the display scan period of one frame. For example, the scan driver 200 may supply at least one scan signal to each of the scan lines SL1 to SLn during the display scan period.

In addition, the scan driver 200 may supply a scan signal maintained as a gate-off level to the scan lines SL1 to SLn during the self-scan period of one frame.

In an embodiment, the scan driver 200 may additionally supply a scan signal for initialization and/or compensation to the pixels PX.

The emission driver 300 may receive the second control signal ECS from the timing controller 500. The emission driver 300 may supply an emission control signal to the emission control lines EL1 to ELn in response to the second control signal ECS. The second control signal ECS may include a start pulse and a plurality of clock signals for the emission control signal.

In an embodiment, the emission driver 300 may supply the emission control signal to the emission control lines EL1 to ELn at the first frequency. For example, the emission driver 300 may always supply the emission control signal to the emission control lines EL1 to ELn at a constant frequency (for example, the first frequency) regardless of a frequency of the image refresh rate. Therefore, within one frame, the emission control signals supplied to the emission control lines EL1 to ELn may be repeatedly supplied for each predetermined period.

In addition, the first frequency may be set higher than the second frequency. In an embodiment, the frequency (or the second frequency) of the image refresh rate may be set to a divisor of the first frequency.

For example, at all driving frequencies at which the display device 1000 may be driven, the emission driver 300 may perform scanning once during the display scan period, and perform scanning at least once during the self-scan period according to the image refresh rate.

That is, the emission control signal may be sequentially output to each of the emission control lines EL1 to ELn once during the display scan period, and the emission control signal may be sequentially output to each of the emission control lines EL1 to ELn once or more during the self-scan period.

Accordingly, when the image refresh rate is decreased, the number of repetitions of an operation of the emission driver 300 supplying the emission control signal to each of the emission control lines EL1 to ELn within one frame may increase.

The data driver 400 may receive the third control signal DCS from the timing controller 500. The data driver 400 may convert the image data RGB into an analog data signal (for example, a data voltage) in response to the third control signal DCS and supply the data signal to the data lines DL1 to DLm.

Meanwhile, in FIG. 1, for convenience of description, each of the scan driver 200 and the emission driver 300 is shown as a single configuration. However, according to design, the scan driver 200 may include a plurality of scan drivers each supplying at least one of scan signals of different waveforms. In addition, at least a portion of the scan driver 200 and the emission driver 300 may be integrated into one driving circuit, module, or the like.

In an embodiment, the display device 1000 may further include a power supply. The power supply may supply the voltage of the first driving power VDD and the voltage of the second driving power VSS for driving the pixel PX to the pixel unit 100.

Figure 2:
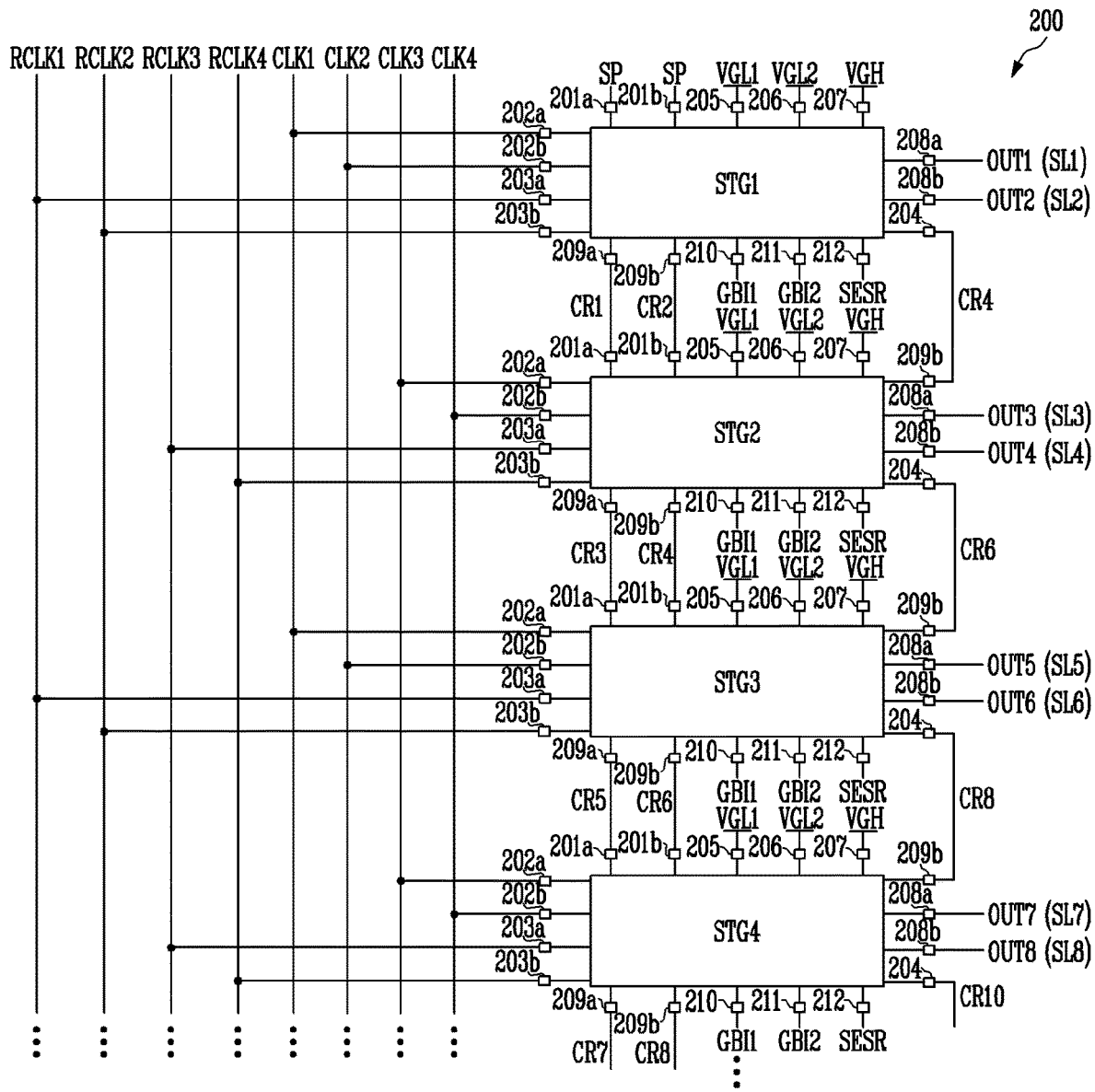
FIG. 2 is a block diagram illustrating a scan driver (gate driver) according to embodiments of the disclosure.

FIG. 2 is a block diagram illustrating a scan driver 200 (gate driver) according to embodiments of the disclosure.

Meanwhile, for convenience of description, in FIG. 2, four stage groups STG1 to STG4 among, i.e., of, stage groups included in the scan driver 200 and scan signals (or output signals OUT1 to OUT8) output from the stage groups are exemplarily shown.

Meanwhile, the scan driver 200 is an example of the gate driver.

Referring to FIG. 2, the scan driver 200 may include a plurality of stage groups STG1 to STG4. The stage groups STG1 to STG4 may be respectively connected to corresponding scan lines SL1 to SLB, and may output a scan signal (or an output) corresponding to clock signals CLK1 to CLK4 and carry clock signals RCLK1 to RCLK4.

In an embodiment, each of the stage groups STG1 to STG4 may include two stages. For example, a first stage group STG1 may include a first stage ST1 and a second stage ST2, a second stage group STG2 may include a third stage ST3 and a fourth stage ST4, a third stage group STG3 may include a fifth stage ST5 and a sixth stage ST6, and a fourth stage group STG4 may include a seventh stage ST7 and an eighth stage ST8. The first stage ST1 and the second stage ST2 included in the first stage group STG1 may output a first scan signal (or a first output signal OUT1) and a second scan signal (or a second output signal OUT2) through a first scan line SL1 and a second scan line SL2, respectively. The third stage ST3 and the fourth stage ST4 included in the second stage group STG2 may output a third scan signal (or a third output signal OUT3) and a fourth scan signal (or a fourth output signal OUT4) through a third scan line SL3 and a fourth scan line SL4, respectively. The fifth stage ST5 and the sixth stage ST6 included in the third stage group STG3 may output a fifth scan signal (or a fifth output signal OUT5) and a sixth scan signal (or a sixth output signal OUT6) through a fifth scan line SL5 and a sixth scan line SL6, respectively. The seventh stage ST7 and the eighth stage ST8 included in the fourth stage group STG4 may output a seventh scan signal (or a seventh output signal OUT7) and an eighth scan signal (or an eighth output signal OUT8) through a seventh scan line SL7 and an eighth scan line SLB, respectively.

In an embodiment, each of the stage groups STG1 to STG4 may include an output control circuit (or an output control unit). For example, the first stage group STG1 may include a first output control circuit OCC1, the second stage group STG2 may include a second output control circuit OCC2, the third stage group STG3 may include a third output control circuit OCC3, and the fourth stage group STG4 may include a fourth output control circuit OCC4. Each of the output control circuits OCC1 to OCC4 may control a voltage level of an output control node (for example, a first node QB_A or a second node QB_B of FIG. 3) included in each of the stages included in a corresponding stage group.

According to an embodiment, the two stages included in each of the stage groups STG1 to STG4 may share one output control circuit.

For example, the first stage ST1 and the second stage ST2 included in the first stage group STG1 may share the first output control circuit OCC1. The third stage ST3 and the fourth stage ST4 included in the second stage group STG2 may share the second output control circuit OCC2. The fifth stage ST5 and the sixth stage ST6 included in the third stage group STG3 may share the third output control circuit OCC3. The seventh stage ST7 and the eighth stage ST8 included in the fourth stage group STG4 may share the fourth output control circuit OCC4.

As described above, since the two stages included in each of the stage groups STG1 to STG4 share one output control circuit, the voltage level of the output control node (for example, the first node QB_A or the second node QB_B of FIG. 3) included in each of the two stages included in one stage group may be controlled by one output control circuit. Accordingly, a dead space of the scan driver 200 (or the stage groups STG1 to STG4) may be reduced (or minimized).

A configuration in which the voltage level of the output control node included in each of the stages is controlled according to an operation of the output control circuit is specifically described with reference to FIGS. 3, 6A, and 6B.

The second stage group STG2 may be connected in dependence on the first stage group STG1, the third stage group STG3 may be connected in dependence on the second stage group STG2, and the fourth stage group STG4 may be connected in dependence on the third stage group STG3. The first to fourth stage groups STG1 to STG4 may have substantially the same configuration. For example, the stages ST1 to ST8 included in each of the stage groups STG1 to STG4 may have substantially the same configuration.

Each of the stage groups STG1 to STG4 may include a first input terminal 201, a second input terminal 202, a third input terminal 203, a fourth input terminal 204, a first power input terminal 205, a second power input terminal 206, a third power input terminal 207, a first output terminal 208, and a second output terminal 209.

In an embodiment, each of the stage groups STG1 to STG4 may further include a fifth input terminal 210, a sixth input terminal 211, and a seventh input terminal 212.

According to an embodiment, the two stages included in each of the stage groups STG1 to ST4 may be commonly connected to the fourth input terminal 204, the seventh input terminal 212, the first power input terminal 205, the second power input terminal 206, and the third power input terminal 207. In addition, the output control circuit included in each of the stage groups STG1 to ST4 may be connected to the fifth input terminal 210 and the sixth input terminal 211.

In an embodiment, the first input terminal 201 included in each of the stage groups STG1 to STG4 may include a first sub-input terminal 201a and a second sub-input terminal 201b, the second input terminal 202 may include a third sub-input terminal 202a and a fourth sub-input terminal 202b, and the third input terminal 203 may include a fifth sub-input terminal 203a and a sixth sub-input terminal 203b. Each the sub-input terminal may be connected to a corresponding stage among the stages included in each of the stage groups STG1 to STG4.

For example, the first stage ST1 of the stages ST1 and ST2 included in the first stage group STG1 may be connected to the first sub-input terminal 201a, the third sub-input terminal 202a, and the fifth sub-input terminal 203a. In addition, the second stage ST2 of the stages ST1 and ST2 included in the first stage group STG1 may be connected to the second sub-input terminal 201b, the fourth sub-input terminal 202b, and the sixth sub-input terminal 203b. Each of the stages included in the second to fourth stage groups STG2, STG3, and STG4 may also be connected to sub-input terminals in substantially the same form.

In addition, the first output terminal 208 included in each of the stage groups STG1 to STG4 may include a first sub-output terminal 208a and a second sub-output terminal 208b, and the second output terminal 209 may include a third sub-output terminal 209a and a fourth sub-output terminal 209b. Each the sub-output terminals may be connected to a corresponding stage among the stages included in each of the stage groups STG1 to STG4.

For example, the first stage ST1 of the stages ST1 and ST2 included in the first stage group STG1 may be connected to the first sub-output terminal 208a to output the first scan signal (or the first output signal OUT1) to the first sub-output terminal 208a, and may be connected to the third sub-output terminal 209a to output a first carry signal CR1 to the third sub-output terminal 209a. In addition, the second stage ST2 of the stages ST1 and ST2 included in the first stage group STG1 may be connected to the second sub-output terminal 208b to output the second scan signal (or the second output signal OUT2) to the second sub-output terminal 208b, and may be connected to the fourth sub-output terminal 209b to output the second carry signal CR2 to the fourth sub-output terminal 209b. The stages included in the second to fourth stage groups STG2, STG3, and STG4 may also be connected to the sub-output terminals in substantially the same form.

The first input terminal 201 of the first stage group STG1 may receive a start pulse SP. For example, each of the first sub-input terminal 201a and the second sub-input terminal 201b of the first stage group STG1 may receive the start pulse SP. Accordingly, the first stage ST1 included in the first stage group STG1 may receive the start pulse SP through the first sub-input terminal 201a, and the second stage ST2 included in the first stage group STG1 may receive the start pulse SP through the second sub-input terminal 201b.

In addition, each of the first input terminals 201 of the second to fourth stage groups STG2 to STG4 may receive carry signals output from the second output terminal 209 of a previous stage group.

For example, the first input terminal 201 of the second stage group STG2 may receive the first carry signal CR1 and a second carry signal CR2 output from the second output terminal 209 of the first stage group STG1. For example, the first sub-input terminal 201a of the second stage group STG2 may receive the first carry signal CR1 output from the third sub-output terminal 209a of the first stage group STG1, and the second sub-input terminal 201b of the second stage group STG2 may receive the second carry signal CR2 output from the fourth sub-output terminal 209b of the first stage group STG1. Accordingly, the third stage ST3 included in the second stage group STG2 may receive the first carry signal CR1 through the first sub-input terminal 201a, and the fourth stage ST4 included in the second stage group STG2 may receive the second carry signal CR2 through the second sub-input terminal 201b.

As another example, the first input terminal 201 of the third stage group STG3 may receive a third carry signal CR3 and a fourth carry signal CR4 output from the second output terminal 209 of the second stage group STG2. For example, the first sub-input terminal 201a of the third stage group STG3 may receive the third carry signal CR3 output from the third sub-output terminal 209a of the second stage group STG2, and the second sub-input terminal 201b of the third stage group STG3 may receive the fourth carry signal CR4 output from the fourth sub-output terminal 209b of the second stage group STG2. Accordingly, the fifth stage ST5 included in the third stage group STG3 may receive the third carry signal CR3 through the first sub-input terminal 201a, and the sixth stage ST6 included in the third stage group STG3 may receive the fourth carry signal CR4 through the second sub-input terminal 201b.

As still another example, the first input terminal 201 of the fourth stage group STG4 may receive a fifth carry signal CR5 and a sixth carry signal CR6 output from the second output terminal 209 of the third stage group STG3. For example, the first sub-input terminal 201a of the fourth stage group STG4 may receive the fifth carry signal CR5 output from the third sub-output terminal 209a of the third stage group STG3, and the second sub-input terminal 201b of the fourth stage group STG4 may receive the sixth carry signal CR6 output from the fourth sub-output terminal 209b of the third stage group STG3. Accordingly, the seventh stage ST7 included in the fourth stage group STG4 may receive the fifth carry signal CR5 through the first sub-input terminal 201a, and the eighth stage ST8 included in the fourth stage group STG4 may receive the sixth carry signal CR6 through the second sub-input terminal 201b.

First and second clock signals CLK1 and CLK2 or third and fourth clock signals CLK3 and CLK4 among clock signals CLK1 to CLK4 may be provided to the second input terminal 202 of the stage groups STG1 to STG4.

In an embodiment, the second input terminal 202 of a k-th stage group, where k is an integer greater than 0, may receive the first clock signal CLK1 and the second clock signal CLK2. For example, the third sub-input terminal 202a of the k-th stage group may receive the first clock signal CLK1, and the fourth sub-input terminal 202b of the k-th stage group may receive the second clock signal CLK2. On the other hand, the second input terminal 202 of a (k+1)-th stage group may receive the third clock signal CLK3 and the fourth clock signal CLK4. For example, the third sub-input terminal 202a of the (k+1)-th stage group may receive the third clock signal CLK3, and the fourth sub-input terminal 202b of the (k+1)-th stage group may receive the fourth clock signal CLK4.

For example, each of the second input terminals 202 of the first stage group STG1 and the third stage group STG3 may receive the first and second clock signals CLK1 and CLK2. For example, the third sub-input terminals 202a of the first stage group STG1 and the third stage group STG3 may receive the first clock signal CLK1, and the fourth sub-input terminals 202b of the first stage group STG1 and the third stage group STG3 may receive the second clock signal CLK2. On the other hand, each of the second input terminals 202 of the fourth stage group STG4 may receive the third and fourth clock signals CLK3 and CLK4. For example, the third sub-input terminals 202a of the second stage group STG2 and the fourth stage group STG4 may receive the third clock signal CLK3, and the fourth sub-input terminals 202b of the second stage group STG2 and the fourth stage group STG4 may receive the fourth clock signal CLK4.

Accordingly, an s-th stage, where s is an integer greater than 0, included in the k-th stage group may receive the first clock signal CLK1 through the third sub-input terminal 202a of the second input terminal 202, and an (s+1)-th stage included in the k-th stage group may receive the second clock signal CLK2 through the fourth sub-input terminal 202b of the second input terminal 202.

In addition, an (s+2)-th stage included in the (k+1)-th stage group may receive the third clock signal CLK3 through the third sub-input terminal 202a of the second input terminal 202, and an (s+3)-th stage included in the (k+1)-th stage group may receive the fourth clock signal CLK4 through the fourth sub-input terminal 202b of the second input terminal 202.

That is, the first to fourth clock signals CLK1 to CLK4 may be sequentially provided to the s-th stage, the (s+1)-th stage, the (s+2)-th stage, and the (s+3)-th stage included in two adjacent stage groups, for example, the k-th stage group and the (k+1)-th stage group.

For example, each of the first stage ST1 included in the first stage group STG1 and the fifth stage ST5 included in the third stage group STG3 may receive the first clock signal CLK1 through the third sub-input terminal 202a, and each of the second stage ST2 included in the first stage group STG1 and the sixth stage ST6 included in the third stage group STG3 may receive the second clock signal CLK2 through the fourth sub-input terminal 202b.

In addition, each of the third stage ST3 included in the second stage group STG2 and the seventh stage ST7 included in the fourth stage group STG4 may receive the third clock signal CLK3 through the third sub-input terminal 202a, and each of the fourth stage ST4 included in the second stage group STG2 and the eighth stage ST8 included in the fourth stage group STG4 may receive the fourth clock signal CLK4 through the fourth sub-input terminal 202b.

That is, the first to fourth clock signals CLK1 to CLK4 may be sequentially provided to the first to fourth stages ST1 to ST4, and the first to fourth clock signals CLK1 to CLK4 may be sequentially provided to the fifth to eighth stages ST5 to ST8.

In an embodiment, the clock signals CLK1 to CLK4 may have the same period in a display scan period DSP (refer to FIG. 6A) and have a waveform in which a phase partially overlaps. For example, in the display scan period DSP (refer to FIG. 6A), the second clock signal CLK2 may be set to a signal shifted by about 1/4 period from the first clock signal CLK1, the third clock signal CLK3 may be set to a signal shifted by about 1/4 period from the second clock signal CLK2, and the fourth clock signal CLK4 may be set to a signal shifted by about 1/4 period from the third clock signal CLK3.

In an embodiment, the clock signals CLK1 to CLK4 may have a waveform maintained as a constant level during a self-scan period SSP (refer to FIG. 6B). For example, in the self-scan period SSP (refer to FIG. 6B), the clock signals CLK1 to CLK4 may be set to a signal maintained as a low level (or a low voltage).

First and second carry clock signals RCLK1 and RCLK2 or third and fourth carry clock signals RCLK3 and RCLK4 among carry clock signals RCLK1 to RCLK4 may be provided to the third input terminal 203 of the stage groups STG1 to STG4.

In an embodiment, the third input terminal 203 of the k-th stage group may receive the first carry clock signal RCLK1 and the second carry clock signal RCLK2. For example, the fifth sub-input terminal 203a of the k-th stage group may receive the first carry clock signal RCLK1, and the sixth sub-input terminal 203b of the k-th stage group may receive the second carry clock signal RCLK2. On the other hand, the third input terminal 203 of the (k+1)-th stage group may receive the third carry clock signal RCLK3 and the fourth carry clock signal RCLK4. For example, the fifth sub-input terminal 203a of the (k+1)-th stage group may receive the third carry clock signal RCLK3, and the sixth sub-input terminal 203b of the (k+1)-th stage group may receive the fourth carry clock signal RCLK4.

For example, each of the third input terminals 203 of the first stage group STG1 and the third stage group STG3 may receive the first and second carry clock signals RCLK1 and RCLK2. For example, the fifth sub-input terminals 203a of the first stage group STG1 and the third stage group STG3 may receive the first carry clock signal RCLK1, and the sixth sub-input terminals 203b of the first stage group STG1 and the third stage group STG3 may receive the second carry clock signal RCLK2. On the other hand, each of the third input terminals 203 of the second stage group STG2 and the fourth stage group STG4 may receive the third and fourth carry clock signals RCLK3 and RCLK4. For example, the fifth sub-input terminals 203a of the second stage group STG2 and the fourth stage group STG4 may receive the third carry clock signal RCLK3, and the sixth sub-input terminals 203b of the second stage group STG2 and the fourth stage group STG4 may receive the fourth carry clock signal RCLK4.

Accordingly, the s-th stage included in the k-th stage group may receive the first carry clock signal RCLK1 through the fifth sub-input terminal 203a of the third input terminal 203, and the (s+1)-th stage included in the k-th stage group may receive the second carry clock signal RCLK2 through the sixth sub-input terminal 203b of the third input terminal 203.

In addition, the (s+2)-th stage included in the (k+1)-th stage group may receive the third carry clock signal RCLK3 through the fifth sub-input terminal 203a of the third input terminal 203, and the (s+3)-th stage included in the (k+1)-th stage group may receive the fourth carry clock signal RCLK4 through the sixth sub-input terminal 203b of the third input terminal 203.

That is, the first to fourth carry clock signals RCLK1 to RCLK4 may be sequentially provided to the s-th stage, the (s+1)-th stage, the (s+2)-th stage, and the (s+3)-th stage included in two adjacent stage groups, for example, the k-th stage group and the (k+1)-th stage group.

For example, each of the first stage ST1 included in the first stage group STG1 and the fifth stage ST5 included in the third stage group STG3 may receive the first carry clock signal RCLK1 through the fifth sub-input terminal 203a, and each of the second stage ST2 included in the first stage group STG1 and the sixth stage ST6 included in the third stage group STG3 may receive the second carry clock signal RCLK2 through the sixth sub-input terminal 203b.

In addition, each of the third stage ST3 included in the second stage group STG2 and the seventh stage ST7 included in the fourth stage group STG4 may receive the third carry clock signal RCLK3 through the fifth sub-input terminal 203a, and each of the fourth stage ST4 included in the second stage group STG2 and the eighth stage ST8 included in the fourth stage group STG4 may receive the fourth carry clock signal RCLK4 through the sixth sub-input terminal 203b.

That is, the first to fourth carry clock signals RCLK1 to RCLK4 may be sequentially provided to the first to fourth stages ST1 to ST4, and the first to fourth carry clock signals RCLK1 to RCLK4 may be sequentially provided to the fifth to eighth stages ST5 to ST8.

In an embodiment, the carry clock signals RCLK1 to RCLK4 may have the same period in the display scan period DSP (refer to FIG. 6A), and may have a waveform in which a phase partially overlaps. For example, in the display scan period DSP (refer to FIG. 6A), the second carry clock signal RCLK2 may be set to a signal shifted by about 1/4 period from the first carry clock signal RCLK1, the third carry clock signal RCLK3 may be set to a signal shifted by about 1/4 period from the second carry clock signal RCLK2, and the fourth carry clock signal RCLK4 may be set to a signal shifted by about 1/4 period from the third carry clock signal RCLK3.

In an embodiment, the carry clock signals RCLK1 to RCLK4 may have a waveform maintained as a constant level during the self-scan period SSP (refer to FIG. 6B). For example, in the self-scan period SSP (refer to FIG. 6B), the carry clock signals RCLK1 to RCLK4 may be set to a signal maintained as a high level (or a high voltage).

As described with reference to FIG. 1, according to the image refresh rate of the display device 1000 (refer to FIG. 1), the scan driver 200 may supply the scan signal having the pulse of the gate-on level (for example, the high level) to the scan lines SL1 to SL8 in the display scan period DSP (refer to FIG. 6A) of one frame, and supply the scan signal maintained as the gate-off level (for example, the low level) to the scan lines SL1 to SL8 in the self-scan period SSP (refer to FIG. 6B) of one frame. Here, the display device 1000 (refer to FIG. 1) (or the scan driver 200) according to embodiments of the disclosure may maintain the clock signals CLK1 to CLK4 and the carry clock signals RCLK1 to RCLK4 used to generate the scan signal as a constant level during the self-scan period in which the scan signals (or the output signals OUT1 to OUT8) are maintained as the gate-off level (or the low level). Therefore, power consumption for transiting (or clocking) a signal level of the clock signals CLK1 to CLK4 and a signal level of the carry clock signals RCLK1 to RCLK4 to a constant period may be reduced. This is specifically described with reference to FIGS. 3 and 6A to 7B.

Each of the fourth input terminals 204 of the stage groups STG1 to STG4 may receive a carry signal output from the second output terminal 209 (for example, the fourth sub-output terminal 209b) of a next stage group.

In an embodiment, the fourth input terminal 204 of the k-th stage group may receive the carry signal output from the fourth sub-output terminal 209b of the (k+1)-th stage group. Accordingly, the s-th stage and the (s+1)-th stage included in the k-th stage group may receive an (s+3)-th carry signal output from the (s+3)-th stage through the fourth sub-output terminal 209b of the (k+1)-th stage group.

For example, the fourth input terminal 204 of the first stage group STG1 may receive the fourth carry signal CR4 output from the fourth sub-output terminal 209b of the second stage group STG2. That is, the fourth input terminal 204 of the first stage group STG1 may receive the fourth carry signal CR4 output from the fourth stage ST4 included in the second stage group STG2. Accordingly, each of the first stage ST1 and the second stage ST2 included in the first stage group STG1 may receive the fourth carry signal CR4 through the fourth input terminal 204.

As another example, the fourth input terminal 204 of the second stage group STG2 may receive the sixth carry signal CR6 output from the fourth sub-output terminal 209b of the third stage group STG3. That is, the fourth input terminal 204 of the second stage group STG2 may receive the sixth carry signal CR6 output from the sixth stage ST6 included in the third stage group STG3. Accordingly, each of the third stage ST3 and the fourth stage ST4 included in the second stage group STG2 may receive the sixth carry signal CR6 through the fourth input terminal 204.

As still another example, the fourth input terminal 204 of the third stage group STG3 may receive an eighth carry signal CR8 output from the fourth sub-output terminal 209b of the fourth stage group STG4. That is, the fourth input terminal 204 of the third stage group STG3 may receive the eighth carry signal CR8 output from the eighth stage ST8 included in the fourth stage group STG4. Accordingly, each of the fifth stage ST5 and the sixth stage ST6 included in the third stage group STG3 may receive the eighth carry signal CR8 through the fourth input terminal 204.

As still another example, the fourth input terminal 204 of the fourth stage group STG4 may receive a tenth carry signal CR10 output from the fourth sub-output terminal of a next stage group, for example, a fifth stage group. That is, the fourth input terminal 204 of the fourth stage group STG4 may receive the tenth carry signal CR10 output from a tenth stage included in the fifth stage group. Accordingly, each of the seventh stage ST7 and the eighth stage ST8 included in the fourth stage group STG4 may receive the tenth carry signal CR10 through the fourth input terminal 204.

However, in an embodiment, the s-th stage and the (s+1)-th stage included in the k-th stage group may receive a q-th carry signal output from a q-th stage, where q is an integer greater than p+3, through the fourth input terminal 204.

Voltages of power required for driving the stage groups STG1 to STG4 (or the stages ST1 to ST8) may be applied to the first to third power input terminals 205, 206, and 207 of the stage groups STG1 to STG4.

For example, a voltage of first power VGL1 may be applied to the first power input terminal 205 of each of the stage groups STG1 to STG4, a voltage of second power VGL2 may be applied to the second power input terminal 206 of each of the stage groups STG1 to STG4, and a voltage of third power VGH may be applied to the third power input terminal 207 of each of the stage groups STG1 to STG4. Accordingly, the voltage of the first power VGL1, the voltage of the second power VGL2, and the voltage of the third power VGH may be applied to the stages ST1 to ST8 included in the stage groups STG1 to STG4.

The voltage of the first power VGL1, the voltage of the second power VGL2, and the voltage of the third power VGH may have a DC voltage level. Here, a voltage level of the third power VGH may be set higher than a voltage level of the first power VGL1 and the second power VGL2. In an embodiment, the voltage level of the second power VGL2 may be set equal to the voltage level of the first power VGL1 or lower than the voltage level of the first power VGL1.

The output signals OUT1 to OUT8 may be output to the first output terminals 208, for example, the first and second sub-output terminals 208a and 208b, of each of the stage groups STG1 to STG4. In an embodiment, the output signals OUT1 to OUT8 output to the first output terminals 208 may be provided to the corresponding scan lines SL1 to SL8 as the scan signals.

The carry signals CR1 to CR8 may be output to the second output terminals 209 of each of the stage groups STG1 to STG4. As described above, each of the carry signals CR1 to CR8 output to the second output terminals 209 may be provided to the first input terminals 201 of a next stage group. For example, the first carry signal CR1 and the second carry signal CR2 output from the second output terminal 209 of the first stage group STG1 may be provided to the first input terminal 201 of the second stage group STG2. For example, the first carry signal CR1 output from the third sub-output terminal 209a of the first stage group STG1 may be provided to the first sub-input terminal 201a of the second stage group STG2, and the second carry signal CR2 output from the fourth sub-output terminal 209b of the first stage group STG1 may be provided to the second sub-input terminal 201b of the second stage group STG2. In addition, the third carry signal CR3 and the fourth carry signal CR4 output from the second output terminal 209 of the second stage group STG2 may be provided to the first input terminal 201 of the third stage group STG3. For example, the third carry signal CR3 output from the third sub-output terminal 209a of the second stage group STG2 may be provided to the first sub-input terminal 201a of the third stage group STG3, and the fourth carry signal CR4 output from the fourth sub-output terminal 209b of the second stage group STG2 may be provided to the second sub-input terminal 201b of the third stage group STG3. In addition, the fifth carry signal CR5 and the sixth carry signal CR6 output from the second output terminal 209 of the third stage group STG3 may be provided to the first input terminal 201 of the fourth stage group STG4. For example, the fifth carry signal CR5 output from the third sub-output terminal 209a of the third stage group STG3 may be provided to the first sub-input terminal 201a of the fourth stage group STG4, and the sixth carry signal CR6 output from the fourth sub-output terminal 209b of the third stage group STG3 may be provided to the second sub-input terminal 201b of the fourth stage group STG4. Similarly to this, the seventh carry signal CR7 and the eighth carry signal CR8 output from the second output terminal 209 of the fourth stage group STG4 may be provided to the first input terminal of the fifth stage group.

A first node control signal GBI1 and a second node control signal GBI2 may be provided to the fifth input terminal 210 and the sixth input terminal 211 of the stage groups STG1 to STG4, respectively.

In an embodiment, the first node control signal GBI1 and the second node control signal GBI2 may have opposite signal levels. For example, when the first node control signal GBI1 has a high level, the second node control signal GBI2 may have a low level. As another example, when the first node control signal GBI1 has a low level, the second node control signal GBI2 may have a high level. However, in an example, the first node control signal GBI1 and the second node control signal GBI2 may have the same signal level, for example, a high level. As another example, the first node control signal GBI1 and the second node control signal GBI2 may have opposite signal levels in a partial section, and may have the same signal level in another partial section.

In an embodiment, each of the signal level of the first node control signal GBI1 and the signal level of the second node control signal GBI2 may vary in a frame unit. For example, the first node control signal GBI1 may be maintained as a high level during one frame, and may transit to a low level by varying the signal level of the first node control signal GBI1 in a next frame of the corresponding frame. Similarly, the second node control signal GBI2 may be maintained as a low level during one frame, and may transit to a high level by varying the signal level of the second node control signal GBI2 in a next frame of the corresponding frame. However, an embodiment of the disclosure is not limited thereto, and the signal level of the first node control signal GBI1 and the second node control signal GBI2 may vary in two or more frame units. The first node control signal GBI1 and the second node control signal GBI2 are specifically described with reference to FIGS. 3 and 6A to 8B.

An initialization control signal SESR may be provided to the seventh input terminal 212 of the stage groups STG1 to STG4. The initialization control signal SESR may be provided to the stage groups STG1 to STG4 through the seventh input terminal 212 at least once when the display device 1000 (refer to FIG. 1) (or the scan driver 200) is powered on, and may not be provided thereafter.

In an embodiment, the stage groups STG1 to STG4, for example, stages ST1 to ST8, included in the scan driver 200 may have substantially the same configuration except for a type of a signal received through the first input terminal 201, for example, the first and second sub-input terminals 201a and 201b. For example, the first stage group STG1 that is an initial stage that receives the start pulse SP through the first input terminal 201 and the remaining stages, for example, second to fourth stage groups STG2 to STG4, that receive the carry signals of a previous stage through the first input terminal 201 may have substantially the same circuit configuration and may operate substantially identically except for the input signal (that is, the start pulse SP or the carry signals of the previous stage group) through the first input terminal 201.

Accordingly, hereinafter, for convenience of description, in describing the stage groups (or stages) included in the scan driver 200, the first stage group STG1 is described as a reference.

Figure 3:
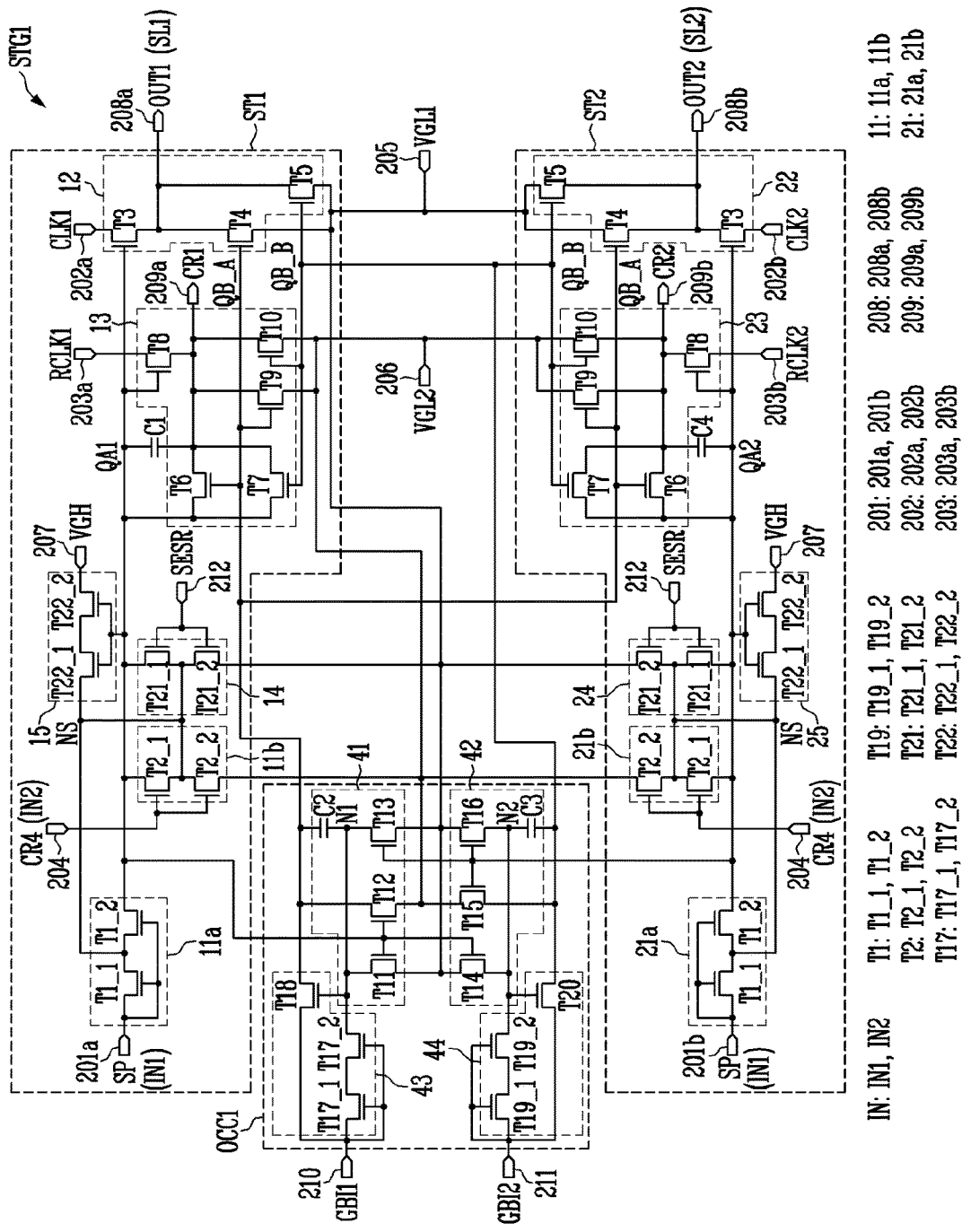
FIG. 3 is a circuit diagram illustrating an example of a first stage group included in the scan driver of FIG. 2.
Figure 4A:
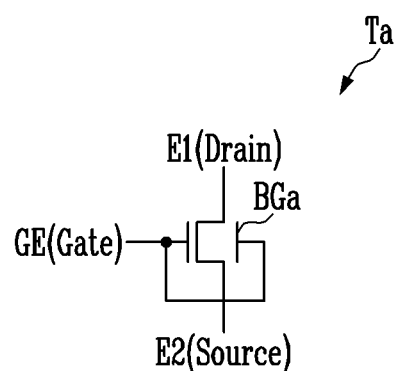
FIGS. 4A and 4B are diagrams illustrating an example of a transistor included in the first stage group of FIG. 3.
Figure 4B:
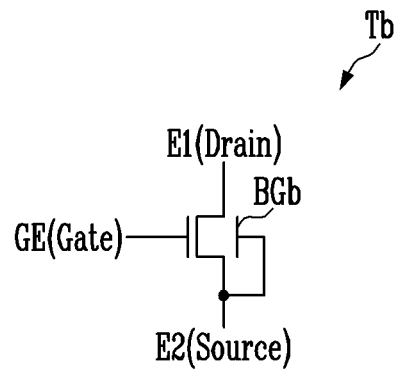

FIG. 3 is a circuit diagram illustrating an example of the first stage group included in the scan driver of FIG. 2. FIGS. 4A and 4B are diagrams illustrating an example of a transistor included in the first stage group of FIG. 3.

Referring to FIGS. 2 and 3, the first stage group STG1 may include the first stage ST1 and the second stage ST2. In an embodiment, the first stage group STG1 may further include the first output control circuit OCC1.

The first stage ST1 may include a first input unit 11, a first output unit 12 (or a first scan signal output unit), a second output unit 13 (or a first carry signal output unit), and a first capacitor C1 (or a first boosting capacitor). According to embodiments, the first stage ST1 may further include a first initialization unit 14 and a first stabilization unit 15.

The second stage ST2 may include a second input unit 21, a third output unit 22 (or a second scan signal output unit), a fourth output unit 23 (or a second carry signal output unit), and a fourth capacitor C4 (or a second boosting capacitor). According to embodiments, the second stage ST2 may further include a second initialization unit 24 and a second stabilization unit 25.

The first stage ST1 may generate and output the first carry signal CR1 and the first output signal OUT1 (or the first scan signal), based on an input signal IN, a first carry clock signal RCLK1, a first clock signal CLK1, the voltage of the first power VGL1, the voltage of the second power VGL2, and the voltage of the third power VGH.

The second stage ST2 may generate and output the second carry signal CR2 and the second output signal OUT2 (or the second scan signal), based on the input signal IN, a second carry clock signal RCLK2, a second clock signal CLK2, the voltage of the first power VGL1, the voltage of the second power VGL2, and the voltage of the third power VGH.

Meanwhile, as described with reference to FIG. 2, the voltage level of the third power VGH may be set higher than the voltage level of the first power VGL1 and the second power VGL2, for example, set to a high voltage. In addition, the voltage level of the second power VGL2 may be set equal to the voltage level of the first power VGL1 or lower than the voltage level of the first power VGL1. Hereinafter, for convenience of description, the description is given based on a case in which the voltage level of the first power VGL1 and the voltage level of the second power VGL2 are the same, for example, the same low voltage.

In an embodiment, the first stage ST1 and the second stage ST2 included in the first stage group STG1 may be commonly connected to the same node. For example, the first stage ST1 and the second stage ST2 may be commonly connected to the first node QB_A and the second node QB_B.

According to an embodiment, a signal level of the first output signal OUT1 and the first carry signal CR1 output by the first stage ST1 may be controlled based on a voltage of the first node QB_A, a voltage of the second node QB_B, and a voltage of a third node QA1, and a signal level of the second output signal OUT2 and the second carry signal CR2 output by the stage ST2 may be controlled based on the voltage of the first node QB_A, the voltage of the second node QB_B, and a voltage of a fourth node QA2. That is, an operation of the first output unit 12 and the second output unit 13 of the first stage ST1 may be controlled based on the voltage of the first node QB_A, the voltage of the second node QB_B, and a voltage of the third node QA1. In addition, an operation of the third output unit 22 and the fourth output unit 23 of the second stage ST2 may be controlled based on the voltage of the first node QB_A, the voltage of the second node QB_B, and a voltage of the fourth node QA2.

In an embodiment, the first output control circuit OCC1 may control the voltage of the first node QB_A and the voltage of the second node QB_B based on the first node control signal GBI1, the second node control signal GBI2, the first power VGL1, and the second power VGL2. For example, the first output control circuit OCC1 may control the operation of the first output unit 12 and the second output unit 13 of the first stage ST1 by controlling the voltage of the first node QB_A and the voltage of the second node QB_B. In addition, the first output control circuit OCC1 may control the operation of the third output unit 22 and the fourth output unit 23 of the second stage ST2 by controlling the voltage of the first node QB_A and the voltage of the second node QB_B.

As described above, according to embodiments of the disclosure, an operation of two adjacent stages, for example, the first stage ST1 and the second stage ST2, may be controlled by one output control circuit, for example, the first output control circuit OCC1. For example, an operation in which the two adjacent stages, for example, the first stage ST1 and the second stage ST2, output the scan signal and the carry signal may be controlled by one output control circuit, for example, the first output control circuit OCC1. Accordingly, a dead space of the scan driver 200 may be minimized.

Hereinafter, with reference to FIG. 3, the first stage ST1, the second stage ST2, and the first output control circuit OCC1 included in the first stage group STG1 are more specifically described. In addition, an operation of the first stage ST1, the second stage ST2, and the first output control circuit OCC1 is specifically described with reference to FIGS. 5 to 7B.

In an embodiment, the first stage ST1 may include the first input unit 11, the first output unit 12, the second output unit 13, and the first capacitor C1.

The first input unit 11 may receive a first input signal IN1, for example, the start pulse SP, through the first input terminal 201, for example, the first sub-input terminal 201a, receive a second input signal IN2, for example, the fourth carry signal CR4, through the fourth input terminal 204, and receive the voltage of the second power VGL2 through the second power input terminal 206.

In an embodiment, the first input unit 11 may control the voltage of the third node QA1, based on the start pulse SP, the fourth carry signal CR4, and the voltage of the second power VGL2.

For example, the first input unit 11 may include a first sub-input unit 11a and a second sub-input unit 11b.

The first sub-input unit 11a may include a first transistor T1.

The first transistor T1 may be connected between the first sub-input terminal 201a and the third node QA1 and may include a gate electrode connected to the first sub-input terminal 201a. The first transistor T1 may be turned on when the first input signal IN1 (or the start pulse SP) supplied through the first sub-input terminal 201a has a gate-on level, for example, a high level, to electrically connect the first sub-input terminal 201a and the third node QA1.

In an embodiment, the first transistor T1 may include a plurality of sub-transistors connected to each other in series. For example, the first transistor T1 may include first and second sub-transistors T1_1 and T1_2 connected to each other in series. Each of the first and second sub-transistors T1_1 and T1_2 may include a gate electrode commonly connected to the first sub-input terminal 201a, for example, referred to as a dual gate structure. Accordingly, a current leakage by the first transistor T1 may be minimized.

The second sub-input unit 11b may include a second transistor T2.

The second transistor T2 may be connected between the second power input terminal 206 and the third node QA1, and may include a gate electrode connected to the fourth input terminal 204. The second transistor T2 may be turned on when the second input signal IN2 (or the fourth carry signal CR4) supplied through the fourth input terminal 204 has a gate-on level, for example, a high level, to electrically connect the second power input terminal 206 and the third node QA1.

In an embodiment, the second transistor T2 may include a plurality of sub-transistors connected to each other in series. For example, the second transistor T2 may include third and fourth sub-transistors T2_1 and T2_2 connected to each other in series. Each of the third and fourth sub-transistors T2_1 and T2_2 may include a gate electrode commonly connected to the fourth input terminal 204, for example, referred to as a dual gate structure. Accordingly, a current leakage by the second transistor T2 may be minimized.

The first output unit 12 may be connected to the first node QB_A, the second node QB_B, and the third node QA1, may receive the first clock signal SLK1 through the second input terminal 202, for example, the third sub-input terminal 202a, and may receive the voltage of the first power VGL1 through the first power input terminal 205.

The first output unit 12 may output the first output signal OUT1 (or the first scan signal), based on the voltage of the first node QB_A, the voltage of the second node QB_B, the voltage of the third node QA1, the first clock signal CLK1, and the first power VGL1. For example, a high level of the first clock signal CLK1 may correspond to a high level of the first output signal OUT1, and the voltage of the first power VGL1 may correspond to a low level of the first output signal OUT1. The first output signal OUT1 may be provided to the first scan line SL1 through the first output terminal 208, for example, the first sub-output terminal 208a, as the scan signal.

To this end, the first output unit 12 may include third to fifth transistors T3 to T5.

The third transistor T3 may be connected between the third sub-input terminal 202a and the first sub-output terminal 208a, and may include a gate electrode connected to the third node QA1. The third transistor T3 may be turned on or off based on the voltage of the third node QA1. When the third transistor T3 is turned on, the third sub-input terminal 202a and the first sub-output terminal 208a may be electrically connected. When the first clock signal CLK1 supplied through the third sub-input terminal 202a has a high level when the third transistor T3 is turned on, the high level of the first clock signal CLK1 may correspond to the high level of the first output signal OUT1.

The fourth transistor T4 may be connected between the first power input terminal 205 and the first sub-output terminal 208a and may include a gate electrode connected to the first node QB_A. The fourth transistor T4 may be turned on or off based on the voltage of the first node QB_A. When the fourth transistor T4 is turned on, the first power input terminal 205 and the first sub-output terminal 208a may be electrically connected. When the fourth transistor T4 is turned on, the voltage of the first power VGL1 supplied through the first power input terminal 205 may correspond to the low level of the first output signal OUT1.

The fifth transistor T5 is connected between the first power input terminal 205 and the first sub-output terminal 208a, and may include a gate electrode connected to the second node QB_B. The fifth transistor T5 may be turned on or off based on the voltage of the second node QB_B. When the fifth transistor T5 is turned on, the first power input terminal 205 and the first sub-output terminal 208a may be electrically connected. When the fifth transistor T5 is turned on, the voltage of the first power VGL1 supplied through the first power input terminal 205 may correspond to the low level of the first output signal OUT1.

That is, the third transistor T3 of the first output unit 12 may perform a pull-up function for outputting the first output signal OUT1, and the fourth and fifth transistors T4 and T5 may perform a pull-down function for outputting the first output signal OUT1.

The second output unit 13 may be connected to the first node QB_A, the second node QB_B, and the third node QA1, may receive the first carry clock signal RCLK1 through the third input terminal 203 (for example, the fifth sub-input terminal 203a), and may receive the voltage of the second power VGL2 through the second power input terminal 206.

The second output unit 13 may output the first carry signal CR1 based on the voltage of the first node QB_A, the voltage of the second node QB_B, the voltage of the third node QA1, the first carry clock signal RCLK1, and the voltage of the second power VGL2. For example, a high level of the first carry clock signal RCLK1 may correspond to a high level of the first carry signal CR1, and the voltage of the second power VGL2 may correspond to a low level of the first carry signal CR1. Meanwhile, as described with reference to FIG. 2, the first carry signal CR1 may be provided to a next stage group, for example, the second stage group STG2, through the second output terminal 209, for example, the third sub-output terminal 209a.

To this end, the second output unit 13 may include sixth to tenth transistors T6 to T10.

The sixth transistor T6 may be connected between the third node QA1 and the third sub-output terminal 209a, and may include a gate electrode connected to the first node QB_A. The sixth transistor T6 may be turned on or off based on the voltage of the first node QB_A.

The seventh transistor T7 may be connected between the third node QA1 and the third sub-output terminal 209a, and may include a gate electrode connected to the second node QB_B. The seventh transistor T7 may be turned on or off based on the voltage of the second node QB_B.

The eighth transistor T8 may be connected between the fifth sub-input terminal 203a and the third sub-output terminal 209a, and may include a gate electrode connected to the third node QA1. The eighth transistor T8 may be turned on or turned off based on the voltage of the third node QA1. When the eighth transistor T8 is turned on, the fifth sub-input terminal 203a and the third sub-output terminal 209a may be electrically connected. When the first carry clock signal RCLK1 supplied through the fifth sub-input terminal 203a has the high level when the eighth transistor T8 is turned on, the high level of the first carry clock signal RCLK1 may correspond to the high level of the first carry signal CR1.

The ninth transistor T9 may be connected between the second power input terminal 206 and the third sub-output terminal 209a, and may include a gate electrode connected to the first node QB_A. The ninth transistor T9 may be turned on or off based on the voltage of the first node QB_A. When the ninth transistor T9 is turned on, the second power input terminal 206 and the third sub-output terminal 209a may be electrically connected. When the ninth transistor T9 is turned on, the voltage of the second power VGL2 supplied through the second power input terminal 206 may correspond to the low level of the first carry signal CR1.

The tenth transistor T10 may be connected between the second power input terminal 206 and the third sub-output terminal 209a, and may include a gate electrode connected to the second node QB_B. The tenth transistor T10 may be turned on or off based on the voltage of the second node QB_B. When the tenth transistor T10 is turned on, the second power input terminal 206 and the third sub-output terminal 209a may be electrically connected. When the tenth transistor T10 is turned on, the voltage of the second power VGL2 supplied through the second power input terminal 206 may correspond to the low level of the first carry signal CR1.

That is, the eighth transistor T8 of the second output unit 13 performs a pull-up function for outputting the first carry signal CR1, and the ninth and tenth transistors T9 and T10 performs a pull-down function for outputting the first carry signal CR1.

The first capacitor C1 may be connected between the third node QA1 and the second output terminal 209, for example, the third sub-output terminal 209a. For example, the first capacitor C1 may include a first electrode connected to the third node QA1 and a second electrode connected to the third sub-output terminal 209a.

In an embodiment, the first stage ST1 may further include an initialization unit and a stabilization unit. For example, the first stage ST1 may further include a first initialization unit 14 and a first stabilization unit 15.

The first initialization unit 14 may receive the voltage of the first power VGL1 through the first power input terminal 205 and receive the initialization control signal SESR through the seventh input terminal 212.

The first initialization unit 14 may control the voltage of the third node QA1, based on the initialization control signal SESR and the voltage of the first power VGL1. For example, in order to discharge a voltage remaining in the third node QA1, for example, a parasitic capacitor or the like connected to the third node QA1, during power-on, the first initialization unit 14 may provide a low voltage of the first power VGL1 to the third node QA1 at least once during power-on.

To this end, the first initialization unit 14 may include a twenty-first transistor T21.

The twenty-first transistor T21 may be connected between the first power input terminal 205 and the third node QA1, and may include a gate electrode connected to the seventh input terminal 212. The twenty-first transistor T21 may be turned on when the initialization control signal SESR supplied through the seventh input terminal 212 has a gate-on level, for example, a high level, and in this case, the low voltage of the first power VGL1 supplied through the first power input terminal 205 may be provided to the third node QA1.

In an embodiment, the twenty-first transistor T21 may include a plurality of sub-transistors connected to each other in series. For example, the twenty-first transistor T21 may include ninth and tenth sub-transistors T21_1 and T21_2 connected to each other in series. Each of the ninth and tenth sub-transistors T21_1 and T21_2 may include a gate electrode commonly connected to the seventh input terminal 212, for example, referred to as a dual gate structure. Accordingly, a current leakage by the twenty-first transistor T21 may be minimized.

A specific operation of the first initialization unit 14 (or the twenty-first transistor T21) is specifically described with reference to FIG. 5.

The first stabilization unit 15 may be connected to the third node QA1, and may receive the voltage of the third power VGH through the third power input terminal 207.

The first stabilization unit 15 may stabilize a node between sub-transistors included in the first transistor T1, for example, the first and second sub-transistors T1_1 and T1_2, a node between sub-transistors, for example, the third and fourth sub-transistors T2_1 and T2_2, included in the second transistor T2, and a node between sub-transistors, for example, the ninth and tenth sub-transistors T21_1 and T21_2, included in the twenty-first transistor T21, based on the voltage of the third node QA1 and the voltage of the third power VGH.

To this end, the first stabilization unit 15 may include a twenty-second transistor T22.

The twenty-second transistor T22 may be connected between the third power input terminal 207 and a stabilization node NS, and may include a gate electrode connected to the third node QA1. Here, the stabilization node NS may correspond to the node between the sub-transistors, for example, the first and second sub-transistors T1_1 and T1_2, included in the first transistor T1, the node between the sub-transistors, for example, the third and fourth sub-transistors T2_1 and T2_2, included in the second transistor T2, and the node between the sub-transistors, for example, the ninth and tenth sub-transistors T21_1 and T21_2, included in the twenty-first transistor T21.

The twenty-second transistor T22 may be turned on or off based on the voltage of the third node QA1. A case in which the twenty-second transistor T22 is turned on may correspond to a case in which the voltage of the third node QA1 is a high level (or a high voltage). Therefore, the twenty-second transistor T22 may allow the voltage of the third node QA1 to stably maintain the high level (or the high voltage) by applying the voltage of the third power VGH, which is a high voltage, to the node between the sub-transistors, for example, the first and second sub-transistors T1_1 and T1_2, included in the first transistor T1, the node between the sub-transistors, for example, the third and fourth sub-transistors T2_1 and T2_2, included in the second transistor T2, and the node (that is, the stabilization node NS) between the sub-transistors, for example, the ninth and tenth sub-transistors T21_1 and T21_2, included in the twenty-first transistor T21.

In an embodiment, the twenty-second transistor T22 may include a plurality of sub-transistors connected to each other in series. For example, the twenty-second transistor T22 may include eleventh and twelfth sub-transistors T22_1 and T22_2 connected to each other in series. Each of the eleventh and twelfth sub-transistors T22_1 and T22_2 may include a gate electrode commonly connected to the third node QA1.

In an embodiment, according to a circuit design of the first stage ST1, a configuration of the first stabilization unit 15 may be omitted. For example, when the first transistor T1, the second transistor T2, and the twenty-first transistor T21 do not include a plurality of sub-transistors and are implemented as a single transistor, the first stabilization unit 15 may be omitted.

Meanwhile, a configuration of the first stage ST1 may also be applied to an r-th stage, where r is an integer equal to or greater than 2.

For example, the second stage ST2 may include a second input unit 21, for example, the second input unit 21 including a third sub-input unit 21a and a fourth sub-input unit 21b, a third output unit 22, a fourth output unit 23, and a fourth capacitor C4. According to embodiments, the second stage ST2 may further include a second initialization unit 24 and a second stabilization unit 25.

Here, the second stage ST2 may be substantially the same as or similar to the first stage ST1 except for a configuration in which the start pulse SP is provided through the first input terminal 201, for example, the second sub-input terminal 201b, the second clock signal CLK2 is provided through the second input terminal 202, for example, the fourth sub-input terminal 202b, and the second carry clock signal RCLK2 is provided through the third input terminal 203, for example, the sixth sub-input terminal 203b. For example, configurations and operations of the second input unit 21, the third output unit 22, the fourth output unit 23, the fourth capacitor C4, the second initialization unit 24, and the second stabilization unit 25 of the second stage ST2 may be substantially the same as or similar to configurations and operations of the first input unit 11, the first output unit 12, the second output unit 13, the first capacitor C1, the first initialization unit 14, and the first stabilization unit 15 of the second stage ST1, respectively. Accordingly, hereinafter, a description overlapping the configuration and the operation of the first stage ST1 is not repeated in relation to the configuration and the operation of the second stage ST2 unless otherwise described.

In an embodiment, the first output control circuit OCC1 may include a first control unit 41, a second control unit 42, a third control unit 43, and a fourth control unit 44.

The first controller 41 may be connected to the third node QA1 of the first stage ST1 and the fourth node QA2 of the second stage ST2, may receive the voltage of the first power VGL1 through the first power input terminal 205, and may receive the voltage of the second power VGL2 through the second power input terminal 206.

The first control unit 41 may control the voltage of the first node QB_A, based on the voltage of the third node QA1, the voltage of the fourth node QA2, the voltage of the first power VGL1, and the voltage of the second power VGL2.

To this end, the first control unit 41 may include an eleventh transistor T11, a twelfth transistor T12, a thirteenth transistor T13, and a second capacitor C2.

The eleventh transistor T11 may be connected between the first control node N1 and the first power input terminal 205, and may include a gate electrode connected to the third node QA1. The eleventh transistor T11 may be turned on or off based on the voltage of the third node QA1.

The twelfth transistor T12 may be connected between the first node QB_A and the second power input terminal 206, and may include a gate electrode connected to the third node QA1. The twelfth transistor T12 may be turned on or off based on the voltage of the third node QA1. When the twelfth transistor T12 is turned on, the voltage of the second power VGL2 of the low level may be supplied to the first node QB_A.

The thirteenth transistor T13 may be connected between the first control node N1 and the first power input terminal 205, and may include a gate electrode connected to the fourth node QA2. The thirteenth transistor T13 may be turned on or off based on the voltage of the fourth node QA2.

The second capacitor C2 may be connected between the first node QB_A and the first control node N1. For example, the second capacitor C2 may include a first electrode connected to the first node QB_A and a second electrode connected to the first control node N1.

Meanwhile, when the eleventh transistor T11 and the thirteenth transistor T13 are turned on, the first control node N1 and the first power input terminal 205 may be electrically connected, and thus the voltage of the first power VGL1, which is a constant voltage, may be supplied to the second electrode (that is, the first control node N1) of the second capacitor C2. Accordingly, the voltage of the second power VGL2 of the low level supplied to the first node QB_A by the turned on eleventh and thirteenth transistors T11 and T13 may be stably maintained by the second capacitor C2.

The second control unit 42 may be connected to the third node QA1 of the first stage ST1 and the fourth node QA2 of the second stage ST2, may receive the voltage of the first power VGL1 through the first power input terminal 205, and may receive the voltage of the second power VGL2 through the second power input terminal 206.

The second control unit 42 may control the voltage of the second node QB_B, based on the voltage of the third node QA1, the voltage of the fourth node QA2, the voltage of the first power VGL1, and the voltage of the second power VGL2.

To this end, the second control unit 42 may include a fourteenth transistor T14, a fifteenth transistor T15, a sixteenth transistor T16, and a third capacitor C3.

The fourteenth transistor T14 may be connected between the second control node N2 and the first power input terminal 205, and may include a gate electrode connected to the third node QA1. The fourteenth transistor T14 may be turned on or off based on the voltage of the third node QA1.

The fifteenth transistor T15 may be connected between the second node QB_B and the second power input terminal 206, and may include a gate electrode connected to the fourth node QA2. The fifteenth transistor T15 may be turned on or off based on the voltage of the fourth node QA2. When the fifteenth transistor T15 is turned on, the voltage of the second power VGL2 of the low level may be supplied to the second node QB_B.

The sixteenth transistor T16 may be connected between the second control node N2 and the first power input terminal 205, and may include a gate electrode connected to the fourth node QA2. The sixteenth transistor T16 may be turned on or off based on the voltage of the fourth node QA2.

The third capacitor C3 may be connected between the second node QB_B and the second control node N2. For example, the third capacitor C3 may include a first electrode connected to the second node QB_B and a second electrode connected to the second control node N2.

Meanwhile, when the fourteenth transistor T14 and the sixteenth transistor T16 are turned on, the second control node N2 and the first power input terminal 205 may be electrically connected, and thus the voltage of the first power VGL1, which is a constant voltage, may be supplied to the second electrode (that is, the second control node N2) of the third capacitor C3. Accordingly, the voltage of the second power VGL2 of the low level supplied to the second node QB_B by the turned on fourteenth and sixteenth transistors T14 and T16 may be stably maintained by the third capacitor C3.

The third control unit 43 may be connected to the first control node N1, and may receive the first node control signal GBI1 through the fifth input terminal 210.

In an embodiment, the third controller 43 may control the voltage of the first node QB_A based on the first node control signal GBI1.

To this end, the third control unit 43 may include a seventeenth transistor T17 and an eighteenth transistor T18.

The seventeenth transistor T17 may be connected between the fifth input terminal 210 and the first control node N1, and may include a gate electrode connected to the fifth input terminal 210. The seventeenth transistor T17 may be turned on when the first node control signal GBI1 supplied through the fifth input terminal 210 has a gate-on level, for example, a high level, to electrically connect the fifth input terminal 210 and the first control node N1.

In an embodiment, the seventeenth transistor T17 may include a plurality of sub-transistors connected to each other in series. For example, the seventeenth transistor T17 may include fifth and sixth sub-transistors T17_1 and T17_2 connected to each other in series. Each of the fifth and sixth sub-transistors T17_1 and T17_2 may include a gate electrode commonly connected to the fifth input terminal 210, for example, referred to as a dual gate structure. Accordingly, a current leakage by the seventeenth transistor T17 may be minimized.

The eighteenth transistor T18 may be connected between the fifth input terminal 210 and the first node QB_A, and may include a gate electrode connected to the first control node N1. The eighteenth transistor T18 may be turned on or turned off based on the voltage of the first control node N1.

The fourth control unit 44 may be connected to the second control node N2, and may receive the second node control signal GBI2 through the sixth input terminal 211.

In an embodiment, the fourth controller 44 may control the voltage of the second node QB_B based on the second node control signal GBI2.

To this end, the fourth control unit 44 may include a nineteenth transistor T19 and a twentieth transistor T20.

The nineteenth transistor T19 may be connected between the sixth input terminal 211 and the second control node N2, and may include a gate electrode connected to the sixth input terminal 211. The nineteenth transistor T19 may be turned on when the second node control signal GBI2 supplied through the sixth input terminal 211 has a gate-on level, for example, a high level, to electrically connect the sixth input terminal 211 and the second control node N2.

In an embodiment, the nineteenth transistor T19 may include a plurality of sub-transistors connected to each other in series. For example, the nineteenth transistor T19 may include seventh and eighth sub-transistors T19_1 and T19_2 connected to each other in series. Each of the seventh and eighth sub-transistors T19_1 and T19_2 may include a gate electrode commonly connected to the sixth input terminal 211, for example, referred to as a dual gate structure. Accordingly, a current leakage by the nineteenth transistor T19 may be minimized.

The twentieth transistor T20 may be connected between the sixth input terminal 211 and the second node QB_B, and may include a gate electrode connected to the second control node N2. The twentieth transistor T20 may be turned on or off based on the voltage of the second control node N2.

Meanwhile, the transistors T1 to T22 included in the first stage group STG1 may be n-type transistors. However, in an embodiment, at least a portion of the transistors T1 to T22 included in the first stage group STG1 may be a p-type transistor.

Meanwhile, in FIG. 3, the transistors T1 to T22 included in the first stage group STG1 include three electrodes, for example, a gate electrode, a drain electrode (a first electrode), and a source electrode (a second electrode), but an embodiment of the disclosure is not limited thereto.

For example, the transistors T1 to T22 included in the first stage group STG1 may further include a back-gate electrode.

For example, further referring to FIG. 4A, a transistor Ta may include a first electrode E1, for example, a drain electrode, a second electrode E2, for example, a source electrode, a gate electrode GE, and a back-gate electrode BGa. Here, the back-gate electrode BGa may be connected to the gate electrode GE. When the transistor Ta is implemented in a form in which the back-gate electrode BGa is connected to the gate electrode GE as described above, an electrical characteristic of the transistor Ta may be improved, and mobility of the transistor Ta may be improved.

As another example, referring further to FIG. 4B, the transistor Tb may include a first electrode E1, for example, a drain electrode, a second electrode E2, for example, a source electrode, a gate electrode GE, and a back-gate electrode BGb. Here, the back-gate electrode BGb may be connected to the second electrode E2, for example, the source electrode. When the transistor Tb is implemented in a form in which the back-gate electrode BGb is connected to the second electrode E2, for example, the source electrode, a back-biasing technique (or a sync technique) for shifting a threshold voltage Vth of the transistor Tb in a negative direction or a positive direction may be applied. For example, a source-sync technique may be applied by connecting the back-gate electrode BGb to the second electrode E2, for example, the source electrode, and thus that an operation characteristic of the transistor Tb may be stabilized. However, in an embodiment, the back-gate electrode BGb of the transistor Tb may be connected to the first electrode E1, for example, the drain electrode.

Meanwhile, referring to FIG. 3 again, each of an output signal, for example, the first output signal OUT1 and the second output signal OUT2, and a carry signal, for example, the first carry signal CR1 and the second carry signal CR2, may have a signal form having a high level of pulse in the display scan period of one frame. That is, the first output signal OUT1 (or the second output signal OUT2) and the first carry signal CR1 (or the second carry signal CR2) may have a signal form maintaining a low level during most of period except for a period in which the first output signal OUT1 (or the second output signal OUT2) and the first carry signal CR1 (or the second carry signal CR2) has the high level of pulse during the display scan period.

Here, in a period in which the first output signal OUT1 (or the second output signal OUT2) is maintained as the low level, at least one of the fourth transistor T4 and the fifth transistor T5 performing a pull-down function of the first output unit 12 (or the third output unit 22 of the second stage ST2) may maintain a turn-on state. Therefore, the first power VGL1 of the low level (or the low voltage) may be output to the first scan line SL1 (or the second scan line SL2) through the first sub-output terminal 208a (or the second sub-output terminal 208b) as the first output signal OUT1 (or the second output signal OUT2). Similarly, in a period in which the first carry signal CR1 (or the second carry signal CR2) is maintained as the low level, at least one of the ninth transistor T9 and the tenth transistor T10 performing a pull-down function of the second output unit 13 of the first stage ST1 (or the fourth output unit 23 of the second stage ST2) may maintain a turn-on state. Therefore, the second power VGL2 of the low level (or the low voltage) may be output through the third sub-output terminal 209a (or the fourth sub output 209b) as the first carry signal CR1 (or the second carry signal CR2).

Here, when all of the fourth and fifth transistors T4 and T5 of the first output unit 12 (or the third output unit 22) and the ninth and tenth transistors T9 and T10 of the second output unit 13 (or the fourth output unit 23) are maintained as a turn-on state and driven (that is, when both of the voltages of the first node QB_A and the second node QB_B are maintained as a high voltage (a high level)) during the scan driver 200 (or the first stage group STG1) is driven, a high voltage is continuously applied to the gate electrode of each of the fourth and fifth transistors T4 and T5 and the ninth and tenth transistors T9 and T10. At this time, since all of the fourth and fifth transistors T4 and T5 and the ninth and tenth transistors T9 and T10 are n-type transistors, for example, a transistor in which a channel is implemented as an oxide semiconductor, a threshold voltage of the fourth and fifth transistors T4 and T5 and the ninth and tenth transistors T9 and T10 may be shifted in a positive direction by the continuously applied high voltage, and thus a problem may occur in reliability.

According to embodiments, as described with reference to FIG. 1, the first node control signal GBI1 and the second node control signal GBI2 may have opposite signal levels in at least a partial section, and each of the signal level of the first node control signal GBI1 and the signal level of the second node control signal GBI2 may vary in a frame unit, for example, 1 frame unit, 2 frame units, or the like. As the first node control signal GBI1 and the second node control signal GBI2 having opposite signal levels vary in the frame unit, only some of the transistors performing the pull-down function of the first output unit 12 and the second output unit 13 (or the third output unit 22 and the fourth output unit 23) may be maintained as a turn-on state and remaining transistors may be maintained as a turn-off state, in response to a period in which signal levels of each of the output signal, for example, the first output signal OUT1 and the second output signal OUT2, and the carry signal, for example, the first carry signal CR1 and the second carry signal CR2, is maintained as a low level. For example, only the fourth and ninth transistors T4 and T9 of which respective gate electrodes are connected to the first node QB_A may be maintained as the turn-on state, and the fifth and tenth transistors T5 and T10 of which respective gate electrodes are connected to the second node QB_B may be maintained as the turn-off state. Alternatively, only the fifth and tenth transistors T5 and T10 may be maintained as the turn-on state, and the fourth and ninth transistors T4 and T9 may be maintained as the turn-off state.

That is, the scan driver 200 (or the display device 1000 referring to FIG. 1) according to embodiments of the disclosure may separate and drive the transistors, which perform the pull-down function of each of the output units 12, 13, 22, and 23, in a frame unit.

As described above, the scan driver 200 (or the display device 1000 referring to FIG. 1) according to embodiments of the disclosure may maintain some of the transistors performing the pull-down function of each of the output units 12, 13, 22, and 23 as the turn-on state. Therefore, reliability of the transistors (that is, the transistors performing the pull-down function) included in the output units 12, 13, 22, and 23 of each stage may be improved.

An operation of the scan driver 200 related to this is specifically described with reference to FIGS. 6A to 8B.

In addition, as described with reference to FIG. 2, the voltage level of the output control node, for example, the first node QB_A or the second node QB_B, included in each of the two adjacent stages, for example, the first and second stages ST1 and ST2, included in one stage group, for example, the first stage group STG1, may be controlled by one output control circuits, for example, the first output control circuit OCC1. Accordingly, a dead space of the scan driver 200 (or the stage groups STG1 to STG4) may be reduced (or minimized).

Figure 5:
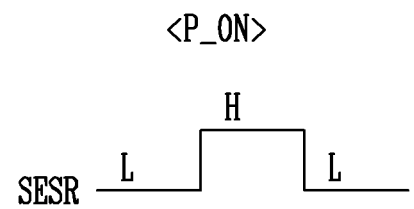

FIG. 5 is a timing diagram illustrating an example of driving the scan driver of FIG. 2 during power-on.

Referring to FIGS. 2, 3, and 5, the initialization control signal SESR may have a pulse of a high level H during power-on P_ON of the scan driver 200 (or the display device 1000).

Meanwhile, the high level H (or a high voltage) shown in FIG. 5 may correspond to the voltage of the third power VGH, and a low level L (or a low voltage) shown in FIG. 5 may correspond to the voltage of the first power VGL1 (or the voltage of the second power VGL2).

When the initialization control signal SESR is at the high level H, the twenty-first transistor T21 may be turned on. When the twenty-first transistor T21 is turned on, the voltage of the first power VGL1 of the low level L may be applied to the third node QA1 (or the fourth node QA2). In this case, a voltage remaining in the third node QA1 (or the fourth node QA2) may be discharged by the voltage of the low level L. For example, a voltage remaining in a parasitic capacitor or the like connected to the third node QA1 (or the fourth node QA2) may be discharged by the voltage of the low level L. Accordingly, an unintentional output of the output signal, for example, the first output signal OUT1 and the second output signal OUT2, through the scan line, for example, the first scan line SL1 and the second scan line SL2, due to turn-on of the third transistor T3 by the residual voltage of the third node QA1 (or the fourth node QA2).

Meanwhile, the initialization control signal SESR may be maintained as the low level L after having the pulse of the high level H in response to the power-on P_ON of the scan driver 200.

Figure 6A:
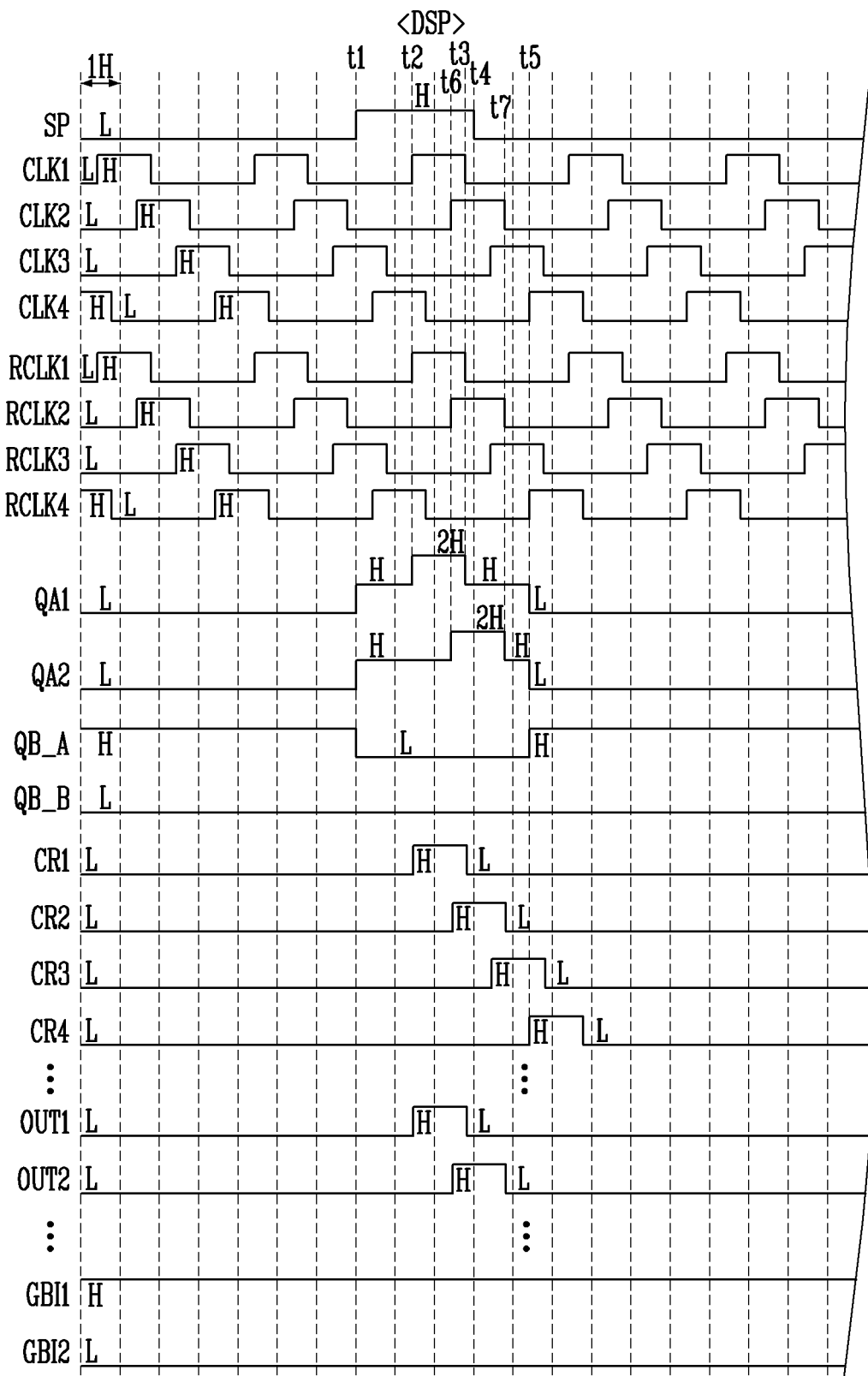
FIG. 6A is a timing diagram illustrating an example of driving the first stage group of FIG. 3 in a display scan period.

FIG. 6A is a timing diagram illustrating an example of driving the first stage group of FIG. 3 in the display scan period. FIG. 6B is a timing diagram illustrating an example of driving the first stage group of FIG. 3 in the self-scan period.

Referring to FIGS. 1 to 3, 6A, and 6B, in FIGS. 6A and 6B, scan signals (or output signals OUT1, OUT2, . . . ) output through the scan lines SL1 to SLn and supplied to the pixels PX are shown. As described with reference to FIG. 1, the scan driver 200 may supply the scan signal including the gate-on level of pulse to the scan lines SL1 to SLn in the display scan period DSP of one frame. In addition, the scan driver 200 may supply the scan signal maintained as the gate-off level to the scan lines SL1 to SLn in the self-scan period SSP of one frame.

In the display scan period DSP of one frame, the pixels PX may receive signals for image display. For example, in the display scan period DSP of one frame, transistors, for example, the scan transistor, included in each of the pixels PX and receiving the scan signal may be turned on based on the scan signals (or the output signals OUT1, OUT2, . . . ) supplied to the pixels PX through the scan lines SL1 to SLn, and thus the data signal may be written to the driving transistor of each of the pixels PX.

In addition, the scan driver 200 may supply the scan signal maintained as the gate-off level to the scan lines SL1 to SLn in the self-scan period SSP of one frame.

Meanwhile, as shown below, the high level H (or the high voltage) may correspond to the voltage of the third power VGH, and the low level L (or the low voltage) may correspond to the voltage of the first power VGL1 (or the voltage of the second power VGL2). For example, the voltage of the third power VGH may be a positive voltage, and the voltage of the first power VGL1 (or the voltage of the second power VGL2) may be a negative voltage. However, in an example, the voltage of the high level H and the voltage of the low level L may be set according to a type of a transistor, a usage environment of the display device, and the like.

In an embodiment, during a corresponding frame, for example, the display scan period DSP and the self-scan period SSP, the first node control signal GBI1 may be maintained as the high level H, and the second node control signal GBI2 may be maintained as the low level L. That is, as described with reference to FIGS. 1 to 3, the first node control signal GBI1 and the second node control signal GBI2 may have opposite signal levels. However, in an example, during the corresponding frame, for example, the display scan period DSP and the self-scan period SSP, the first node control signal GBI1 may be maintained as the low level L, and the second node control signal GBI2 may be maintained as the high level H.

In FIGS. 6A and 6B, the description is given based on an embodiment in which the first node control signal GBI1 is maintained as the high level H and the second node control signal GBI2 is maintained as the low level L. An embodiment in which the first node control signal GBI1 is maintained as the low level L and the second node control signal GBI2 is maintained as the high level H is described with reference to FIGS. 7A and 7B.

First, in order to describe an operation of the first stage group STG1 included in the scan driver 200 in the display scan period DSP, referring to FIGS. 1 to 3 and 6A, in the display scan period DSP of one frame, the first to fourth clock signals CLK1 to CLK4 may be supplied at different timings. For example, the second clock signal CLK2 may be set to a signal shifted by a 1/4 period, for example, 1 horizontal period 1H, from the first clock signal CLK1, the third clock signal CLK3 may be set to a signal shifted by 1/4 period, for example, 1 horizontal period 1H, from the second clock signal CLK2, and the fourth clock signal CLK4 may be set to a signal shifted by 1/4 period, for example, 1 horizontal period 1H, from the third clock signal CLK3.

In addition, in the display scan period DSP of one frame, the first to fourth carry clock signals RCLK1 to RCLK4 may be supplied at different timings. For example, the second carry clock signal RCLK2 may be set to a signal shifted by 1/4 period, for example, 1 horizontal period 1H, from the first carry clock signal RCLK1, the third carry clock signal RCLK3 may be set to a signal shifted by 1/4 period, for example, 1 horizontal period 1H, from the second carry clock signal RCLK2, and the fourth carry clock signal RCLK4 may be set to a signal shifted by 1/4 period, for example, 1 horizontal period 1H, from the third carry clock signal RCLK3.

In a period from a first time point t1 to a fourth time point t4, the start pulse SP may have the high level H. In addition, in a period before the first time point t1 and a period after the fourth time point t4, the start pulse SP may have the low level L.

Meanwhile, in the period before the first time point t1, the voltage of the third node QA1 of the first stage ST1 and the voltage of the fourth node QA2 of the second stage ST2 may have the low level L. For example, at a time point when the second input signal IN2, for example, the fourth carry signal CR4, is the high level H during the period before the first time point t1, the second transistor T2 included in each of the first stage ST1 and the second stage ST2 may be turned on, and thus the voltage of the second power VGL2 of the low level L may be provided to the third node QA1 and the fourth node QA2. Accordingly, each of the voltages of the third node QA1 and the fourth node QA2 may change to the low level L (or each of the voltages of the third node QA1 and the fourth node QA2 is maintained as the low level L). Accordingly, in the period before the first time point t1, the eleventh to sixteenth transistors T11 to T16 may maintain a turn-off state.

Meanwhile, since the first node control signal GBI1 is maintained as the high level H, the seventeenth transistor T17 may be turned on or maintained as a turn-on state. Accordingly, the first node control signal GBI1 of the high level H may be provided to the first control node N1, and thus the eighteenth transistor T18 may be turned on or maintained as a turn-on state. In this case, since the first node control signal GBI1 of the high level H is provided to the first node QB_A, in the period before the first time point t1, the voltage of the first node QB_A may have the high level H.

Meanwhile, unlike the first node control signal GBI1, since the second node control signal GBI2 is maintained as the low level L, the nineteenth transistor T19 and the twentieth transistor T20 may be turned off or maintained as a turn-off state. Accordingly, the second node QB_B may be maintained as the low level L.

Hereinafter, for convenience of description, the description is given based on an operation of the first stage ST1 and the first output control circuit OCC1 at first to fifth time points t1 to t5. In addition, an operation of the second stage ST2 is mainly described based on a point different from that of the operation of the first stage ST1, and an overlapping description is not repeated.

At the first time point t1, the start pulse SP supplied through the first sub-input terminal 201a may transit from the low level L to the high level H. In this case, the first transistor T1 included in the first sub-input unit 11a may be turned on by the start pulse SP of the high level H (or the gate-on level).

When the first transistor T1 is turned on, the high level H of the start pulse SP may be supplied to the third node QA1. Accordingly, the voltage of the third node QA1 may transit from the low level L to the high level H.

Meanwhile, similarly to this, since the start pulse SP is supplied through the second sub-input terminal 201b of the second stage ST2, the first transistor T1 included in the second sub-input unit 11b of the second stage ST2 may be turned on at the first time point t1, and thus the voltage of the fourth node QA2 may transit from the low level L to the high level H.

The eleventh, twelfth, and fourteenth transistors T11, T12, and T14 may be turned on by the voltage of the high level H of the third node QA1. In addition, the thirteenth, fifteenth, and sixteenth transistors T13, T15, and T16 may be turned on by the voltage of the high level H of the fourth node QA2.

When the twelfth transistor T12 is turned on, the voltage of the second power VGL2 having the low level L may be supplied to the first node QB_A. Accordingly, the voltage of the first node QB_A may transit from the high level H to the low level L.

Meanwhile, as described with reference to FIG. 3, when the eleventh transistor T11 and the thirteenth transistor T13 are turned on, since the voltage of the first power VGL1, which is a constant voltage, is applied to the first control node N1, the voltage of the first node QB_A may be stably maintained as the low level L by the second capacitor C2.

Meanwhile, since the eleventh transistor T11 and the thirteenth transistor T13 are turned on, the voltage of the first power VGL1 of the low level L may be supplied to the first control node N1, and thus the eighteenth transistor T18 may be turned off or may maintain a turn-off state.

At this time, since the first node control signal GBI1 is maintained as the high level H, not only the voltage of the first power VGL1 of the low level L but also the first node control signal GBI1 of the high level H may be supplied together to the first control node N1 by the turned-on seventh transistor T17. Here, the first node control signal GBI1 may be a signal of which a signal level is variable. In contrast, the voltage of the first power VGL1 may correspond to a constant voltage supplied from a constant voltage source. Therefore, the voltage level of the first power VGL1 may be maintained stably more than the signal level of the first node control signal GBI1. Accordingly, even though the first node control signal GBI1 is supplied to the first control node N1, the first control node N1 may be maintained as the low level L stably by the voltage of the first power VGL1 of the low level L supplied through the turned-on eleventh and thirteenth transistors T11 and T13.

Meanwhile, the third transistor T3 of the first output unit 12 and the eighth transistor T8 of the second output unit 13 may be turned on by the voltage of the high level H of the third node QA1. Since both of the first clock signal CLK1 and the first carry clock signal RCLK1 have the low level L at the first time point t1, both of the first output signal OUT1 output through the first sub-output terminal 208a and the first carry signal CR1 output through the third sub-output terminal 209a may have the low level L.

Similarly to this, the third transistor T3 of the third output unit 22 and the eighth transistor T8 of the fourth output unit 23 may be turned on by the voltage of the high level H of the fourth node QA2. Since both of the second clock signal CLK2 and the second carry clock signal RCLK2 have the low level L at the first time point t1, the second output signal OUT2 output through the second sub-output terminal 208b and the second carry signal CR2 output through the fourth sub-output terminal 209b may have the low level L.

Meanwhile, since the voltage of the third node QA1 has the high level H and a voltage of a node corresponding to the third sub-output terminal 209a has the low level L, the first capacitor C1 of the first stage ST1 may store a voltage corresponding to a difference (voltage difference) between the voltage of the high level H and the voltage of the low level L. Similarly to this, since the voltage of the fourth node QA2 has the high level H and a voltage of a node corresponding to the fourth sub-output terminal 209b has the low level L, the fourth capacitor C4 of the second stage ST2 may store a voltage corresponding to a difference (voltage difference) between the voltage of the high level H and the voltage of the low level L.

Thereafter, at the second time point t2, the first clock signal CLK1 of the high level H may be supplied through the third sub-input terminal 202a and the first carry clock signal RCLK1 of the high level H may be supplied.

Here, the third transistor T3 of the first output unit 12 and the eighth transistor T8 of the second output unit 13 may be turned on or may maintain a turn-on state by the voltage of the third node QA1 of the high level H.

Since the third transistor T3 of the first output unit 12 is turned on or maintains the turn-on state, the first clock signal CLK1 of the high level H may be supplied to the first sub-output terminal 208a, and thus the first output signal OUT1 may be output as the high level H.

In addition, since the eighth transistor T8 of the second output unit 13 is turned on or maintains the turn-on state, the first carry clock signal RCLK1 of the high level H may be supplied to the third sub-output terminal 209a, and thus the first carry signal CR1 may be output as the high level H.

Meanwhile, as described above, the voltage of the node corresponding to the third sub-output terminal 209a (that is, the node connected to the second electrode of the first capacitor C1) may change from the existing low level L to the high level H. In this case, the voltage of the third node QA1 may be increased from the existing high level H to a 2-high level 2H by coupling of the first capacitor C1. Accordingly, the third transistor T3 of the first output unit 12 and the eighth transistor T8 of the second output unit 13 may stably maintain the turn-on state.

Meanwhile, the 2-high level 2H may correspond to a voltage level in which a voltage change amount of the node corresponding to the third sub-output terminal 209a is reflected in the voltage of the third node QA1 by the coupling of the first capacitor C1. For example, the 2-high level 2H may correspond to a value obtained by adding the voltage change amount (that is, a difference between the high level H and the low level L) of the node corresponding to the third sub-output terminal 209*a* to the high level H.

Thereafter, at the third time point t3, the first clock signal CLK1 of the low level L may be supplied through the third sub-input terminal 202*a*, and the first carry clock signal RCLK1 of the low level L may be supplied through the fifth sub-input terminal 203*a*.

Here, the third transistor T3 of the first output unit 12 and the eighth transistor T8 of the second output unit 13 may be turned on or may maintain a turn-on state by the voltage of the third node QA1 of the high level H.

Since the third transistor T3 of the first output unit 12 is turned on or maintains the turn-on state, the first clock signal CLK1 of the low level L may be supplied to the first sub-output terminal 208*a*, and thus the first output signal OUT1 may be output as the low level L again.

In addition, since the eighth transistor T8 of the second output unit 13 is turned on or maintains the turn-on state, the first carry clock signal RCLK1 of the low level L may be supplied to the third sub-output terminal 209*a*, and thus the first carry signal CR1 may be output as the low level L again.

Meanwhile, as described above, the voltage of the node corresponding to the third sub-output terminal 209*a* (that is, the node connected to the second electrode of the first capacitor C1) may change from the existing high level H to the low level L. In this case, the voltage of the third node QA1 may be lowered from the existing 2-high level 2H to the high level H again due to the coupling of the first capacitor C1.

Thereafter, at the fourth time point t4, the start pulse SP supplied through the first input terminal 201, for example, the first sub-input terminal 201*a* or the second sub-input terminal 201*b*, may transit from the high level H to the low level L.

Thereafter, at the fifth time point t5, the second input signal IN2 of the high level H (or the gate-on level), for example, the fourth carry signal CR4 of the high level H, may be supplied through the fourth input terminal 204. In this case, the second transistor T2 of the second sub-input unit 11*b* may be turned on.

When the second transistor T2 of the second sub-input unit 11*b* is turned on, the voltage of the second power VGL2 of the low level L may be supplied to the third node QA1. Accordingly, the voltage of the third node QA1 may transit from the high level H to the low level L at the fifth time point t5.

Meanwhile, the second stage ST2 may operate substantially identically or similarly to the operation of the first stage ST1 described above.

For example, at the first time point t1, the voltage of the fourth node QA2 may transit from the low level L to the high level H by the first input signal IN1 (or the start pulse SP) of the high level H provided to the second sub-input terminal 201*b*. Accordingly, each of the third transistor T3 of the third output unit 22 and the eighth transistor T8 of the fourth output unit 23 may be turned on, and the second output signal OUT2 of the high level H and the second carry signal CR2 of the high level H may be output to the second sub-output terminal 208*b* and the fourth sub-output terminal 209*b*, respectively, in response to a period in which the second clock signal CLK2 supplied through the fourth sub-input terminal 202*b* and the second carry clock signal RCLK2 supplied through the sixth sub-input terminal 203*b* have the high level H. For example, in a period from the sixth time point t6 to the seventh time point t7, the second clock signal CLK2 and the second carry clock signal RCLK2 may have the high level H. Accordingly, in the period from the sixth time point t6 to the seventh time point t7, the second output signal OUT2 of the high level H may be output to the second sub-output terminal 208*b* through the third transistor T3 that is turned on (or maintaining the turn-on state) of the third output unit 22, and the second carry signal CR2 of the high level H may be output to the fourth sub-output terminal 209*b* through the eighth transistor T8 that is turned on (or maintaining the turn-on state) of the fourth output unit 22.

In addition, at the fifth time point t5, since the second input signal IN2 of the high level H (or the gate-on level), for example, the fourth carry signal CR4 of the high level H, is supplied through the fourth input terminal 204, the second transistor T2 of the fourth sub-input unit 201*b* may be turned on. In this case, since the voltage of the second power VGL2 of the low level L is supplied to the fourth node QA2, the voltage of the fourth node QA2 may transit from the high level H to the low level L at the fifth time point t5.

The third and eighth transistors T3 and T8 included in each of the first stage ST1 and the second stage ST2 may be turned off by the voltage of the low level L of the third node QA1 and the voltage of the low level L of the fourth node QA2.

In addition, the eleventh to sixteenth transistors T11 to T16 may be turned off by the voltage of the low level L of the third node QA1 and the voltage of the low level L of the fourth node QA2. Here, since the twelfth transistor T12 is turned off, the voltage of the second power VGL2 of the low level L may be blocked from being supplied to the first node QB_A.

Here, as described above, since the seventeenth and eighteenth transistors T17 and T18 are turned on or maintain the turn-on state by the first node control signal GBI1 of the high level H, the voltage of the first node QB_A may change from the low level L to the high level H in correspondence with the fifth time point t5.

The fourth transistor T4 and the ninth transistor T9 included in each of the first stage ST1 and the second stage ST2 may be turned on by the voltage of the high level H of the first node QB_A.

Since the fourth transistor T4 is turned on, the voltage of the first power VGL1 of the low level L may be supplied to the first sub-output terminal 208*a* (or the second sub-output terminal 208*b*), and thus the first output signal OUT1 (or the second output signal OUT2) may be output as the low level L.

In addition, since the ninth transistor T9 is turned on, the voltage of the second power VGL2 of the low level L may be supplied to the third sub-output terminal 209*a* (or the fourth sub-output terminal 209*b*), and thus the first carry signal CR1 (or the second carry signal CR2) may be output as the low level L.

Next, in order to describe the operation of the first stage group STG1 included in the scan driver 200 in the self-scan period SSP, referring further to FIG. 6B, in the self-scan period SSP of one frame, the start pulse SP may be maintained as the low level L.

In an embodiment, the first to fourth clock signals CLK1 to CLK4 may be maintained as a constant level during the self-scan period SSP of one frame. For example, the first to fourth clock signals CLK1 to CLK4 may be maintained as the low level L.

In addition, during the self-scan period SSP of one frame, the first to fourth carry clock signals RCLK1 to RCLK4 may be maintained as a constant level. For example, the first to fourth carry clock signals RCLK1 to RCLK4 may be maintained as the high level H.

Here, since the start pulse SP is maintained as the low level L, the first transistor T1 may maintain a turn-off state. In this case, the voltage of the low level L supplied to the third node QA1 and the fourth node QA2 before the self-scan period SSP may be maintained.

Since each of the voltage of the third node QA1 and the voltage of the fourth node QA2 is maintained as the low level L, the third transistor T3 and the eighth transistor T8 included in each of the first stage ST1 and the second stage ST2 may be maintained as a turn-off state. In addition, since the voltage of the third node QA1 and the voltage of the fourth node QA2 are maintained as the low level L, the eleventh to sixteenth transistors T11 to T16 may be maintained as a turn-off state.

Meanwhile, since the voltage of the first node QB_A is maintained as the high level H by the first node control signal GBI1 maintained as the high level H, the fourth transistor T4 and the ninth transistor T9 included in each of the first stage ST1 and the second stage ST2 may maintain a turn-on state.

Since the fourth transistor T4 maintains the turn-on state, the voltage of the first power VGL1 of the low level L may be supplied to the first sub-output terminal 208a (or the second sub-output terminal 208b), and thus the first output signal OUT1 (or the second output signal OUT2) output through the first sub-output terminal 208a (or the second sub-output terminal 208b) may be maintained as the low level L.

In addition, since the ninth transistor T9 maintains the turn-on state, the voltage of the second power VGL2 of the low level L may be supplied to the third sub-output terminal 209a (or the fourth sub-output terminal 209b), and thus the first carry signal CR1 (or the second carry signal CR2) output to the third sub-output terminal 209a (or the fourth sub-output terminal 209b) may be maintained as the low level L.

As described above, the display device 1000 (refer to FIG. 1) (or the scan driver 200) according to embodiments of the disclosure may maintain the clock signals CLK1 to CLK4 and the carry clock signals RCLK1 to RCLK4 as a constant level in the self-scan period SSP in which the scan signals (or the output signals OUT1, OUT2, . . . ) output from the scan driver 200 are maintained as the gate-off level. Therefore, power consumption for transitioning (or clocking) each of the signal level of the clock signals CLK1 to CLK4 and the signal level of the carry clock signals RCLK1 to RCLK4 at a constant period may be reduced.

Figure 7A:
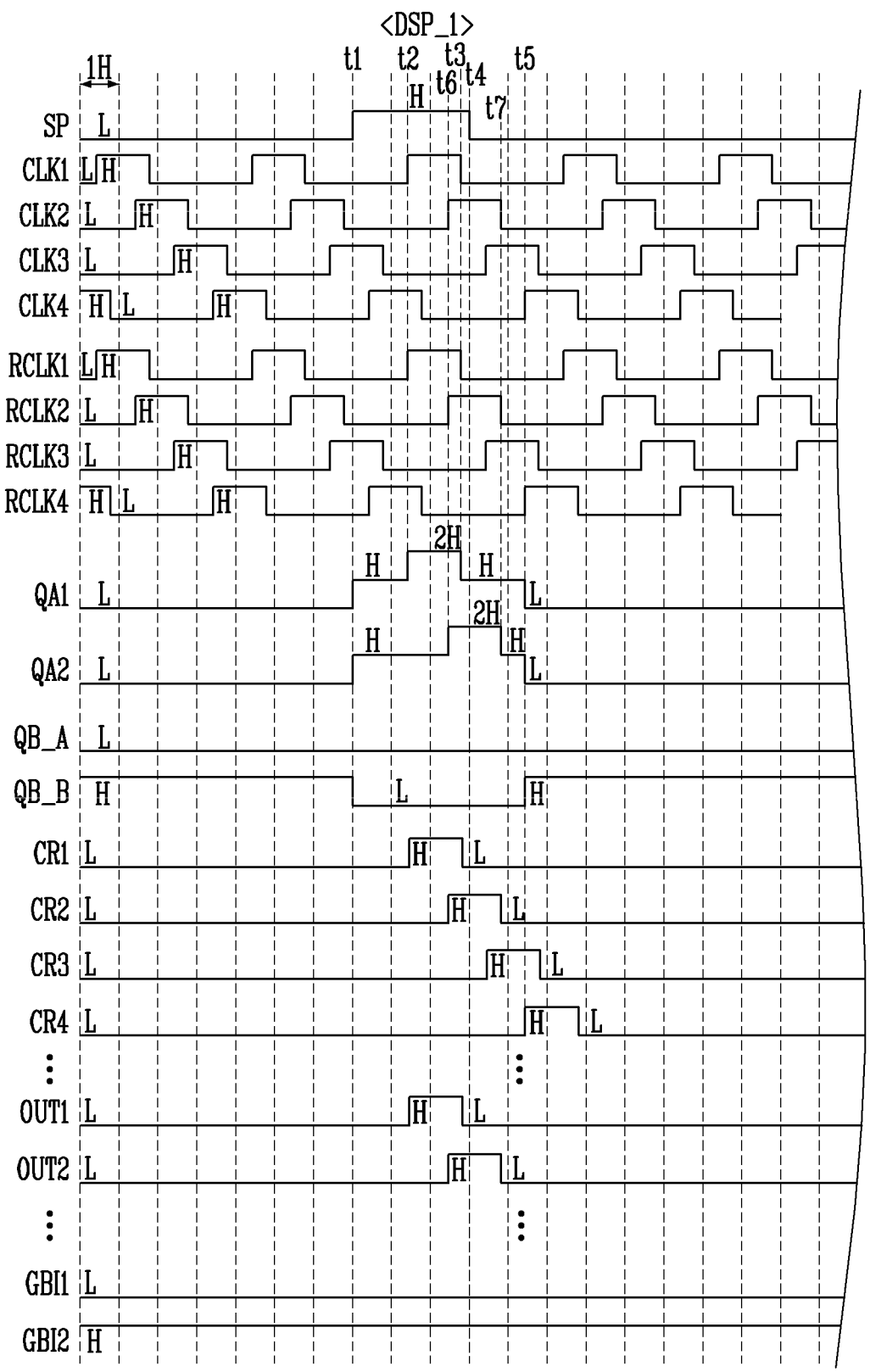
FIG. 7A is a timing diagram illustrating an example of driving the first stage group of FIG. 3 in the display scan period.

FIG. 7A is a timing diagram illustrating an example of driving the first stage group of FIG. 3 in the display scan period. FIG. 7B is a timing diagram illustrating an example of driving the first stage group of FIG. 3 in the self-scan period.

Referring to FIGS. 1 to 3, 7A, and 7B, a timing diagram of signals in the display scan period DSP_1 is shown in FIG. 7A, and a timing diagram of signals in the self-scan period SSP_1 is shown in FIG. 7B.

Meanwhile, in FIGS. 7A and 7B, since the timing diagram of the signals in the display scan period DSP_1 of FIG. 7A and the timing diagram of the signals in the self-scan period SSP_1 of FIG. 7B are substantially the same as or similar to the timing diagram of the signals in the display scan period DSP of FIG. 6A and the timing diagram of the signals in the self-scan period SSP of FIG. 6B, respectively, except that the first node control signal GBI1 is maintained as the low level L and the second node control signal GBI2 is maintained as the high level H, an overlapping description is not be repeated.

In an embodiment, during a corresponding frame, for example, the display scan period DSP_1 and the self-scan period SSP_1, the first node control signal GBI1 may be maintained as the low level L, and the second node control signal GBI2 may be maintained as the high level H. That is, as described with reference to FIGS. 1 and 2, the first node control signal GBI1 and the second node control signal GBI2 may have opposite signal levels.

First, in order to describe the operation of the first stage group STG1 included in the scan driver 200 in the display scan period DSP_1, referring to FIGS. 1 to 3, and 7A, since the second node control signal GBI2 is maintained as the high level H, the nineteenth transistor T19 may be turned on or maintained as a turn-on state. Accordingly, the second node control signal GBI2 of the high level H may be provided to the second control node N2, and thus the twentieth transistor T20 may be turned on or maintained as a turn-on state. In this case, since the second node control signal GBI2 of the high level H is provided to the second node QB_B, in a period before the first time point t1, the voltage of the second node QB_B may have the high level H.

Meanwhile, unlike the second node control signal GBI2, since the first node control signal GBI1 is maintained as the low level L, the seventeenth transistor T17 and the eighteenth transistor T18 may be turned off or maintained as a turn-off state. Accordingly, the first node QB_A may be maintained as the low level L.

At the first time point t1, the eleventh to sixteenth transistors T11 to T16 may be turned on by the voltage of the high level H of the third node QA1 and the voltage of the high level H of the fourth node QA2.

When the fifteenth transistor T15 is turned on, the voltage of the second power VGL2 having the low level L may be supplied to the second node QB_B. Accordingly, the voltage of the second node QB_B may transit from the high level H to the low level L.

Meanwhile, as described with reference to FIG. 3, when the fourteenth transistor T14 and the sixteenth transistor T16 are turned on, since the voltage of the first power VGL1, which is a constant voltage, is applied to the second control node N2, the voltage of the second node QB_B may be stably maintained as the low level L by the third capacitor C3.

Meanwhile, since the fourteenth transistor T14 and the sixteenth transistor T16 are turned on, the voltage of the first power VGL1 of the low level L may be supplied to the second control node N2, and thus the twentieth transistor T20 may be turned off or may maintain a turn-off state.

At this time, since the second node control signal GBI2 is maintained as the high level H, not only the voltage of the first power VGL1 of the low level L but also the second node control signal GBI2 of the high level H may be supplied together to the second control node N2 by the turned-on nineteenth transistor T19. Here, the second node control signal GBI2 may be a signal of which a signal level is variable. In contrast, the voltage of the first power VGL1 may correspond to a constant voltage supplied from a constant voltage source. Therefore, the voltage level of the first power VGL1 may be maintained stably more than the signal level of the first node control signal GBI1. Accordingly, even though the second node control signal GBI2 is supplied to the second control node N2, the second control node N2 may be maintained as the low level L stably by the voltage of the first power VGL1 of the low level L supplied through the turned-on fourteenth and sixteenth transistors T14 and T16.

Thereafter, at the fifth time point t5, the eleventh to sixteenth transistors T11 to T16 may be turned off by the voltage of the low level L of the third node QA1 and the voltage of the low level L of the fourth node QA2. Here, since the fifteenth transistor T15 is turned off, the voltage of the second power VGL2 of the low level L may be blocked from being supplied to the second node QB_B.

Here, as described above, since the nineteenth and twentieth transistors T19 and T20 are turned on or maintain the turn-on state by the second node control signal GBI2 of the high level H, the voltage of the second node QB_B may change from the low level L to the high level H in correspondence with the fifth time point t5.

The fifth transistor T5 and the tenth transistor T10 included in each of the first stage ST1 and the second stage ST2 may be turned on by the voltage of the high level H of the second node QB_B.

Since the fifth transistor T5 is turned on, the voltage of the first power VGL1 of the low level L may be supplied to the first sub-output terminal 208a (or the second sub-output terminal 208b), and thus the first output signal OUT1 (or the second output signal OUT2) may be output as the low level L.

In addition, since the tenth transistor T10 is turned on, the voltage of the second power VGL2 of the low level L may be supplied to the third sub-output terminal 209a (or the fourth sub-output terminal 209b), and thus the first carry signal CR1 (or the second carry signal CR2) may be output as the low level L.

Next, in order to describe the operation of the first stage group STG1 included in the scan driver 200 in the self-scan period SSP_1, referring further to FIG. 7B, in the self-scan period SSP_1 of one frame, the start pulse SP may be maintained as the low level L.

In an embodiment, the first to fourth clock signals CLK1 to CLK4 may be maintained as a constant level during the self-scan period SSP_1 of one frame. For example, the first to fourth clock signals CLK1 to CLK4 may be maintained as the low level L.

In addition, during the self-scan period SSP_1 of one frame, the first to fourth carry clock signals RCLK1 to RCLK4 may be maintained as a constant level. For example, the first to fourth carry clock signals RCLK1 to RCLK4 may be maintained as the high level H.

Here, since the start pulse SP is maintained as the low level L, the first transistor T1 may maintain a turn-off state. In this case, the voltage of the low level L supplied to the third node QA1 and the fourth node QA2 before the self-scan period SSP_1 may be maintained.

Since each of the voltage of the third node QA1 and the voltage of the fourth node QA2 is maintained as the low level L, the third transistor T3 and the eighth transistor T8 included in each of the first stage ST1 and the second stage ST2 may be maintained as a turn-off state. In addition, since the voltage of the third node QA1 and the voltage of the fourth node QA2 are maintained as the low level L, the eleventh to sixteenth transistors T11 to T16 may be maintained as a turn-off state.

Meanwhile, since the voltage of the second node QB_B is maintained as the high level H by the second node control signal GBI2 maintained as the high level H, the fifth transistor T5 and the tenth transistor T10 included in each of the first stage ST1 and the second stage ST2 may maintain a turn-on state.

Since the fifth transistor T5 maintains the turn-on state, the voltage of the first power VGL1 of the low level L may be supplied to the first sub-output terminal 208a (or the second sub-output terminal 208b), and thus the first output signal OUT1 (or the second output signal OUT2) output through the first sub-output terminal 208a (or the second sub-output terminal 208b) may be maintained as the low level L.

In addition, since the tenth transistor T10 maintains the turn-on state, the voltage of the second power VGL2 of the low level L may be supplied to the third sub-output terminal 209a (or the fourth sub-output terminal 209b), and thus the first carry signal CR1 (or the second carry signal CR2) output to the third sub-output terminal 209a (or the fourth sub-output terminal 209b) may be maintained as the low level L.

In an embodiment, as described with reference to FIGS. 1 and 2, the signal level of the first node control signal GBI1 and the signal level of the second node control signal GBI2 may vary at a constant period. For example, the signal level of the first node control signal GBI1 and the signal level of the second node control signal GBI2 may vary in one frame unit. As another example, the signal level of the first node control signal GBI1 and the signal level of the second node control signal GBI2 may vary in two or more frame units. However, an embodiment of the disclosure is not limited thereto, and the signal level of the first node control signal GBI1 and the signal level of the second node control signal GBI2 may vary in one horizontal line, for example, 1 horizontal period 1H, unit.

Figure 8A:
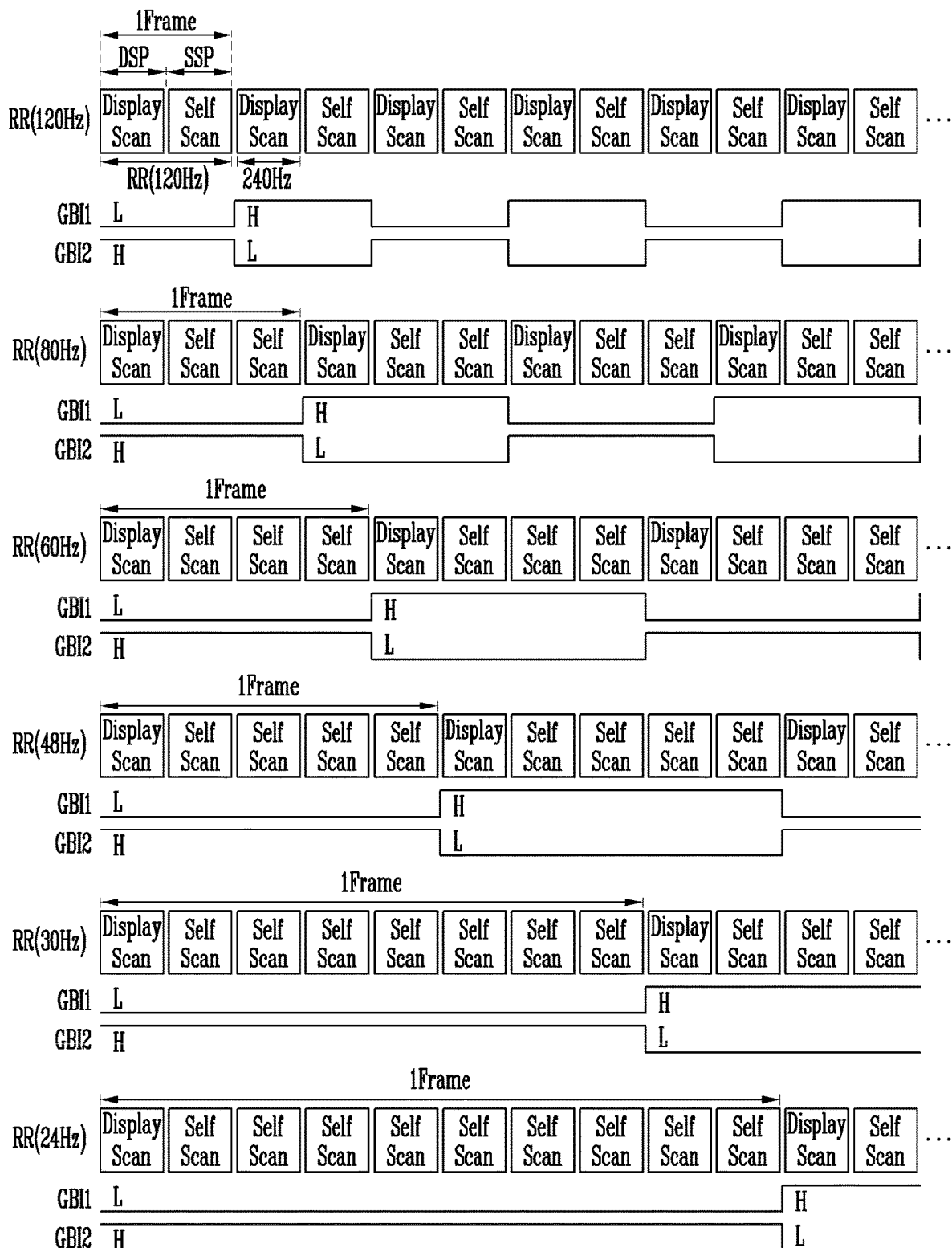
FIGS. 8A and 8B are diagrams illustrating a method of driving the display device and the scan driver according to an image refresh rate.
Figure 8B:
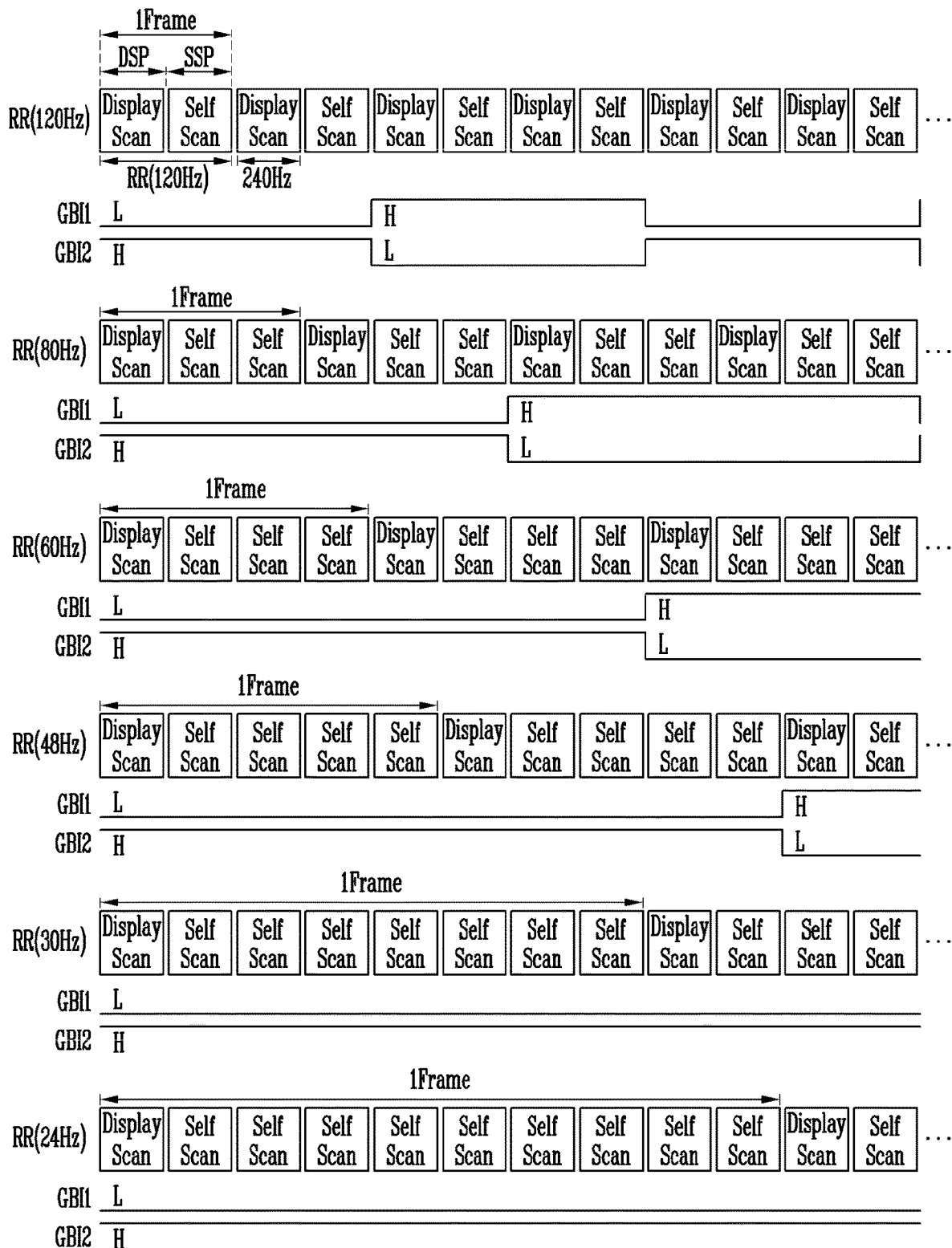

FIGS. 8A and 8B are diagrams illustrating a method of driving the display device 1000 and the scan driver 200 according to the image refresh rate.

Referring to FIGS. 1, 2, 3, 6A, 6B, 7A, 7B, and 8A, the scan driver 200 (or the stage groups of the scan driver 200) may perform the operation of the scan driver 200 (or the stage groups of the scan driver 200) described with reference to FIG. 6A or 7A in the display scan period DSP and perform the operation of the scan driver 200 (or the stage groups of the scan driver 200) described with reference to FIG. 6B or 7B in the self-scan period SSP.

In an embodiment, an output frequency of the scan signals output through the scan lines SL1 to SLn may vary according to an image refresh rate RR. For example, each of the scan signals may be output at the same frequency (second frequency) as the image refresh rate RR.

In an embodiment, lengths of the display scan period DSP and the self-scan period SSP may be substantially the same. However, the number of self-scan periods SSP included in one frame may be determined according to the image refresh rate RR.

For example, as shown in FIG. 8A, when the display device 1000 is driven at an image refresh rate RR of 120 Hz, one frame period may include one display scan period DSP and one self-scan period SSP. Accordingly, when the display device 1000 is driven at an image refresh rate RR of 120 Hz, the pixels PX may alternately repeat each of emission and non-emission twice during one frame period.

In addition, when the display device 1000 is driven at an image refresh rate RR of 80 Hz, one frame period may include one display scan period DSP and two successive self-scan periods SSP. Accordingly, when the display device 1000 is driven at the image refresh rate RR of 80 Hz, the pixels PX may alternately repeat each of emission and non-emission three times during one frame period.

In a method similar to that described above, the display device 1000 may be driven at a driving frequency of 60 Hz, 48 Hz, 30 Hz, 24 Hz, 20 Hz, 1 Hz, or the like by adjusting the number of self-scan periods SSP included in one frame period.

In an embodiment, each of the signal level of the first node control signal GBI1 and the signal level of the second node control signal GBI2 may vary in a frame unit. For example, as shown in FIG. 8A, the first node control signal GBI1 may be maintained as the high level H during one frame, and the signal level of the first node control signal GBI1 may vary and transit to the low level L in a next frame of a corresponding frame. Similarly, the second node control signal GBI2 may be maintained as the low level L during one frame, and the signal level of the second node control signal GBI2 may vary and transit to the high level H in a next frame of a corresponding frame.

Here, as described with reference to FIGS. 1 to 3 and FIGS. 6A to 7B, the voltage of the first node QB_A and the voltage of the second node QB_B of each of the stage groups (or the stages) of the scan driver 200 may be controlled in correspondence with the signal level of the first node control signal GBI1 and the signal level of the second node control signal GBI2.

That is, as described with reference to FIG. 3, since each of the signal level of the first node control signal GBI1 and the signal level of the second node control signal GBI2 vary in the frame unit, one of the first node QB_A and the second node QB_B may be maintained as the low level L in a corresponding frame. Therefore, reliability of the transistors (that is, the transistors performing the pull-down function) included in the output units 12, 13, 22, and 23 of each stage group may be improved.

FIG. 8A shows that the signal level of the first node control signal GBI1 and the signal level of the second node control signal GBI2 are varied in 1 frame unit.

However, for example, further referring to FIG. 8B, the signal level of the first node control signal GBI1 and the signal level of the second node control signal GBI2 may be varied in two or more frame units.

Figure 9A:
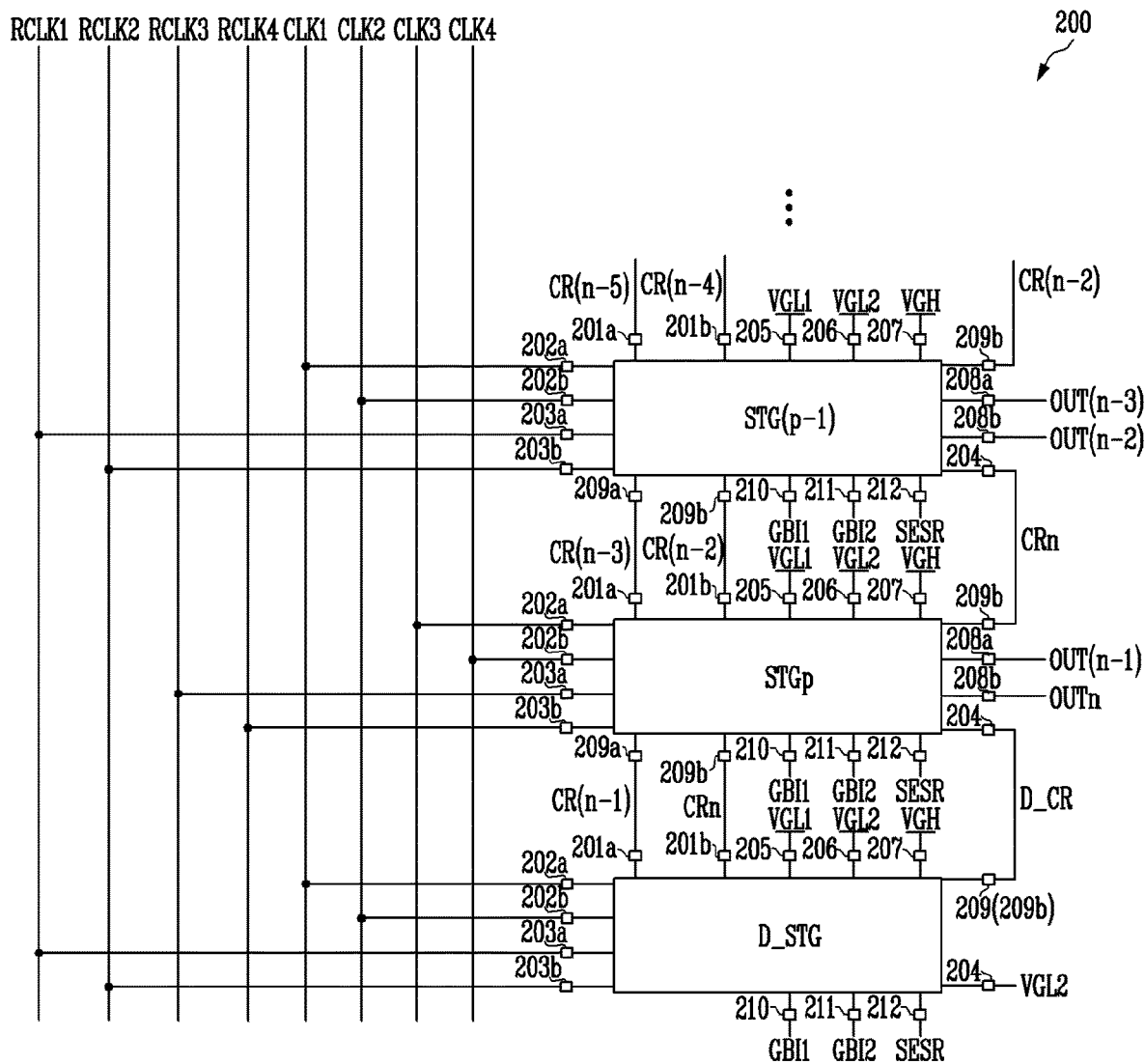
FIGS. 9A and 9B are block diagrams illustrating an example of the number of stage groups included in the scan driver of FIG. 2.
Figure 9B:
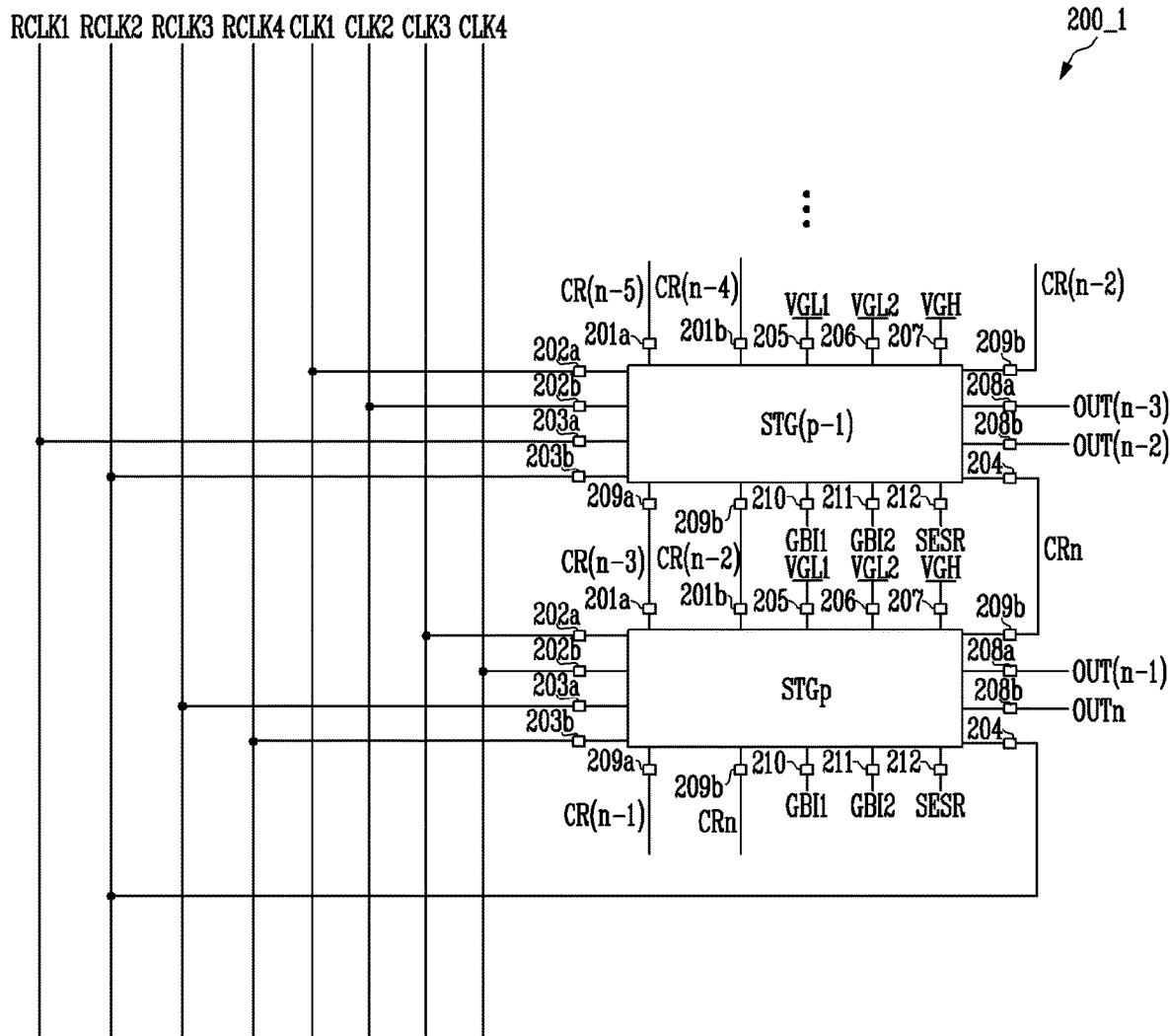

FIGS. 9A and 9B are block diagrams illustrating an example of the number of stage groups included in the scan driver of FIG. 2.

Referring to FIGS. 1, 2, 3, and 9A, the scan driver 200 may include stage groups STG(p-1) and STGp.

Each of the stage groups STG(p-1) and STGp may be substantially the same as or similar to each of the stage groups STG1, STG2, STG3, and STG4 described with reference to FIGS. 2 and 3.

In an embodiment, the scan driver 200 may further include a dummy stage group D_STG. For example, a dummy carry signal D_CR output from a second output terminal 209, for example, a fourth sub-output terminal 209*b*, of the dummy stage group D_STG may be provided to a fourth input terminal 204 of a p-th stage group STGp that is a last stage as a second input signal.

In this case, the scan driver 200 may include p+1 number of stage groups STG(p-1), STGp, and D_STG including the dummy stage group D_STG.

However, in an example, referring further to FIG. 9B, the scan driver 200_1 may include stage groups STG(p-1) and STGp.

Here, a second carry clock signal RCLK2 may be provided to the fourth input terminal 204 of the p-th stage group STGp that is the last stage. Here, since the second carry clock signal RCLK2 includes a pulse of a high level of the dummy carry signal D_CR described with reference to FIG. 9A, the p-th stage group STGp of the scan driver 200_1 may substantially identically operate.

In this case, since the scan driver 200_1 includes only the p number of stage groups STG(p-1) and STGp and does not include a separate dummy stage group, for example, the dummy stage group D_STG of FIG. 9A, for providing the second input signal to the last stage group, for example, the p-th stage group STGp, the scan driver 200_1 may be simplified and a dead space may be reduced, for example, minimized.

Figure 10:
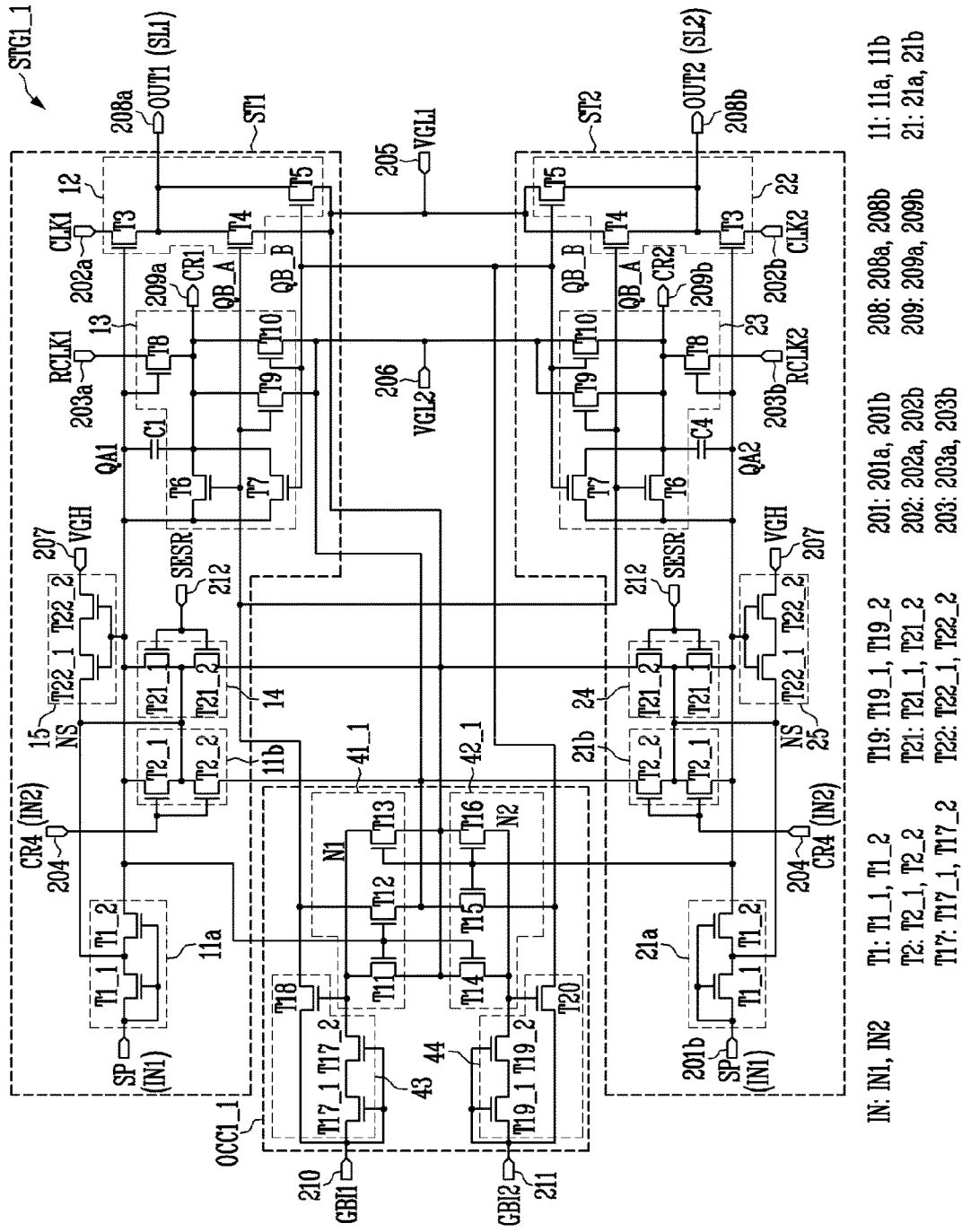
FIG. 10 is a circuit diagram illustrating an example of the first stage group included in the scan driver of FIG. 2.

FIG. 10 is a circuit diagram illustrating an example of the first stage group included in the scan driver 200 of FIG. 2. In FIG. 10, in order to avoid an overlapping description, a point different from that of the above-described embodiment is mainly described, a portion which is not specially described is in accordance with the above-described embodiment, the same reference numeral indicates the same component, and a similar reference numeral indicates a similar component.

A first stage group STG1_1 shown in FIG. 10 indicates a modified embodiment of the first stage group STG1 described with reference to FIG. 3.

Referring to FIGS. 3 and 10, the first stage group STG1_1 may include the first stage ST1 and the second stage ST2. In an embodiment, the first stage group STG1_1 may further include a first output control circuit OCC1_1.

In an embodiment, the first output control circuit OCC1_1 may include the eleventh to twentieth transistors T11 to T20. Here, as shown in FIG. 10, according to a circuit layout of the first output control circuit OCC1_1 (or the first stage group STG1_1), when a parasitic capacitance between the first control node N1 and the first node QB_A and/or between the second control node N2 and the second node QB_B is sufficient, a separate capacitor, for example, the second capacitor C2 and/or the third capacitor C3 described with reference to FIG. 3, may be omitted on the first output control circuit OCC1_1.

Figure 11:
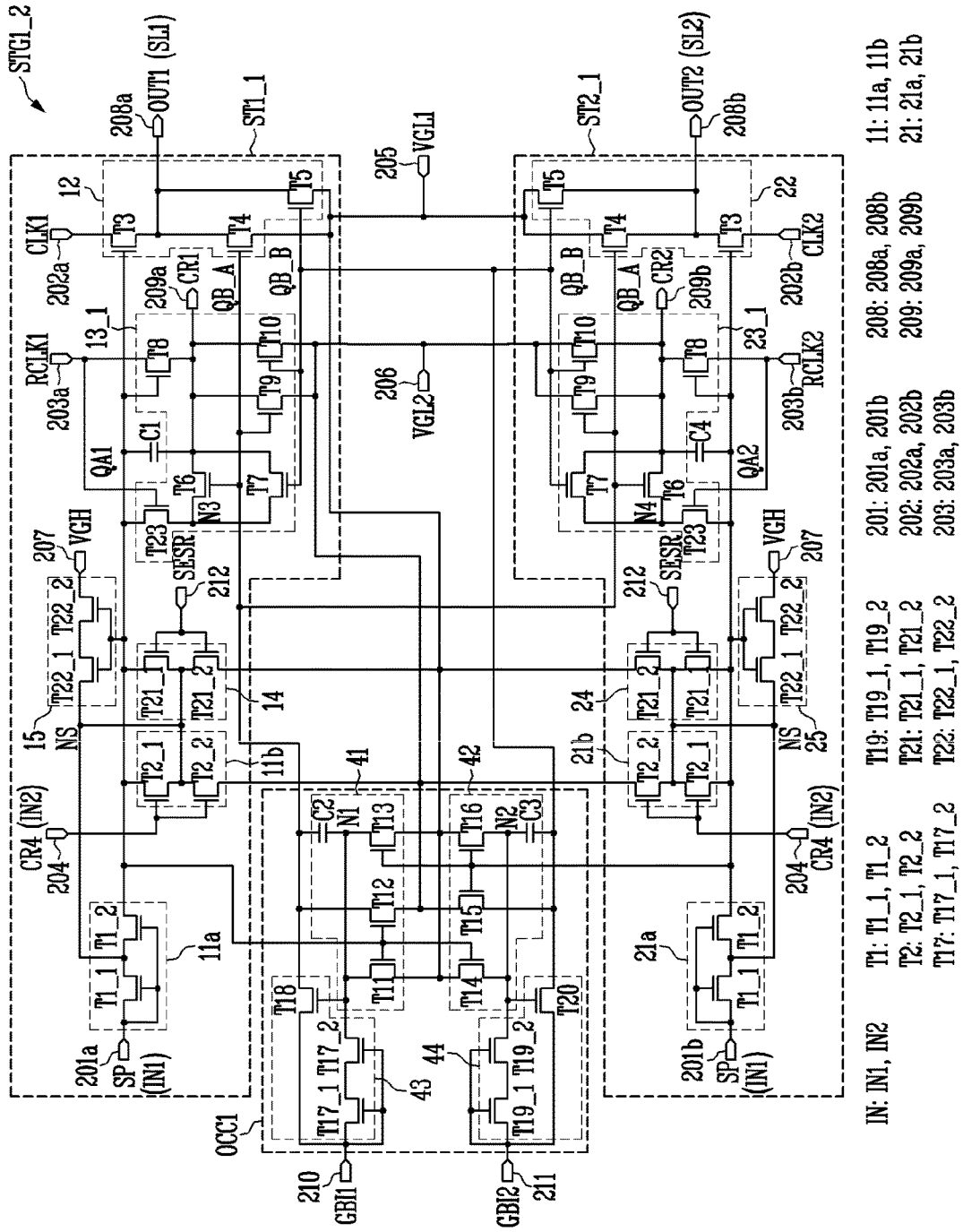
FIG. 11 is a circuit diagram illustrating an example of the first stage group included in the scan driver of FIG. 2.

FIG. 11 is a circuit diagram illustrating an example of the first stage group included in the scan driver 200 of FIG. 2. In FIG. 11, in order to avoid an overlapping description, a point different from that of the above-described embodiment is mainly described, a portion which is not specially described is in accordance with the above-described embodiment, the same reference numeral indicates the same component, and a similar reference numeral indicates a similar component.

The first stage group STG1_2 shown in FIG. 11 indicates a modified embodiment of the first stage group STG1 described with reference to FIG. 3.

Referring to FIGS. 3 and 11, the first stage group STG1_2 may include a first stage ST1_1 and a second stage ST2_1. In an embodiment, the first stage group STG1_2 may further include the first output control circuit OCC1.

The first stage ST1_1 may include the first input unit 11, the first output unit 12 (or the first scan signal output unit), a second output unit 13_1 (or a first carry signal output unit), and the first capacitor C1 (or the first boosting capacitor). According to embodiments, the first stage ST1_1 may further include the first initialization unit 14 and the first stabilization unit 15.

The second stage ST2_1 may include the second input unit 21, the third output unit 22 (or the second scan signal output unit), a fourth output unit 23_1 (or a second carry signal output unit), and the fourth capacitor C4 (or the second boosting capacitor). According to embodiments, the second stage ST2_1 may further include the second initialization unit 24 and the second stabilization unit 25.

The second output unit 13_1 may include the sixth to tenth transistors T6 to T10 and may further include a twenty-third transistor T23.

The twenty-third transistor T23 may be connected between the third node QA1 and a third control node N3, and may include a gate electrode connected to the third input terminal 203, for example, the fifth sub-input terminal 203a. The twenty-third transistor T23 may be turned on when the first carry clock signal RCLK1 supplied through the fifth sub-input terminal 203a has a gate-on level, for example, a high level, to electrically connect the third node QA1 and the third control node N3.

Here, since the second output unit 13_1 further includes the twenty-third transistor T23, a current leakage between the third node QA1 and the third control node N3 may be prevented (or improved).

Meanwhile, the second stage ST2_1 may be substantially the same as or similar to the above-described first stage ST1_1. For example, the fourth output unit 23_1 of the second stage ST2_1 may be connected between the fourth node QA2 and a fourth control node N4, and may include a twenty-third transistor T23 including a gate electrode connected to the third input terminal 203, for example, the sixth sub-input terminal 203b.

Figure 12:
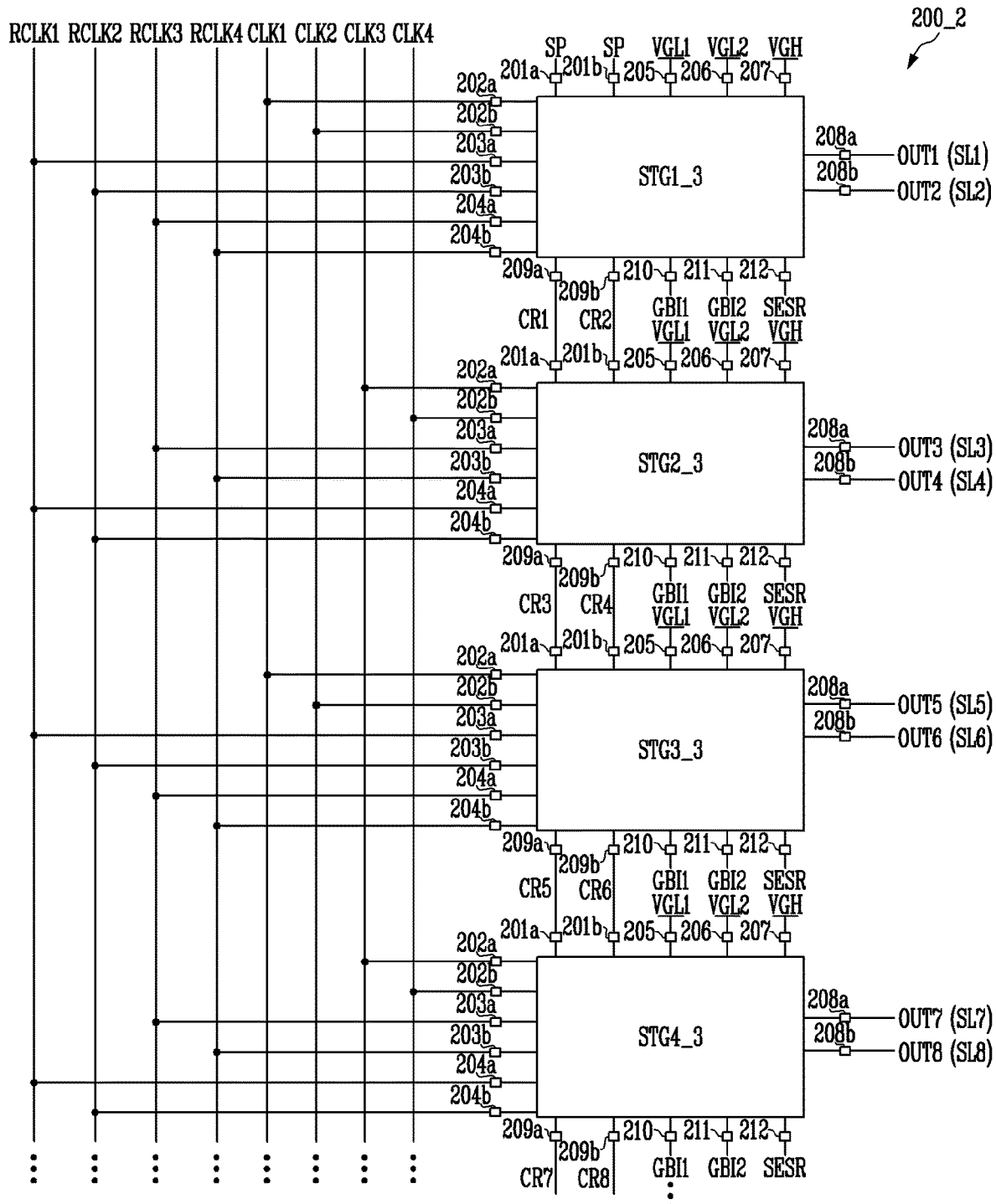
FIG. 12 is a block diagram illustrating a scan driver (gate driver) according to embodiments of the disclosure.

FIG. 12 is a block diagram illustrating a scan driver 200_2 (gate driver) according to embodiments of the disclosure. In FIG. 12, in order to avoid an overlapping description, a point different from that of the above-described embodiment is mainly described, a portion which is not specially described is in accordance with the above-described embodiment, the same reference numeral indicates the same component, and a similar reference numeral indicates a similar component.

The scan driver 200_2 shown in FIG. 12 indicates a modified embodiment of the scan driver 200 described with reference to FIG. 2.

Referring to FIGS. 2 and 12, the scan driver 200_2 may include a plurality of stage groups STG1_3 to STG4_3. Each of the stage groups STG1_3 to STG4_3 may be connected to corresponding scan lines SL1 to SL8, and output the scan signal (or the output signal) in response to the clock signals CLK1 to CLK4 and the carry clock signals RCLK1 to RCLK4.

In an embodiment, each of the stage groups STG1_3 to STG4_3 may include two stages. For example, a first stage group STG1_3 may include a first stage ST1_2 and a second stage ST2_2, a second stage group STG2_3 may include a third stage ST3_2 and a fourth stage ST4_2, a third stage group STG3_3 may include a fifth stage ST5_2 and a sixth stage ST6_2, and a fourth stage group STG4_3 may include a seventh stage ST7_2 and an eighth stage ST8_2.

In an embodiment, each of the stage groups STG1_3 to STG4_3 may include an output control circuit (or an output controller). For example, the first stage group STG1_3 may include a first output control circuit OCC1, the second stage group STG2_3 may include a second output control circuit OCC2, the third stage group STG3_3 may include a third output control circuit OCC3, and the fourth stage group STG4_3 may include a fourth output control circuit OCC4. Each of the output control circuits OCC1 to OCC4 may control the voltage level of the output control node, for example, the first node QB_A or the second node QB_B of FIG. 13, included in each of stages included in a corresponding stage group.

Each of the stage groups STG1_3 to STG4_3 may include the first input terminal 201, the second input terminal 202, the third input terminal 203, a fourth input terminal 204_1, the first power input terminal 205, the second power input terminal 206, the third power input terminal 207, the first output terminal 208, and the second output terminal 209.

In an embodiment, the fourth input terminal 204_1 included in each of the stage groups STG1_3 to STG4_3 may include a seventh sub-input terminal 204a and an eighth sub-input terminal 204b. Each of the seventh and eighth sub-input terminals 204a and 204b may be connected to a corresponding stage among the stages included in each of the stage groups STG1_3 to STG4_3.

For example, the first stage ST1_2 of the stages ST1_2 and ST2_2 included in the first stage group STG1_3 may be connected to the seventh sub-input terminal 204a. In addition, the second stage ST2_2 of the stages ST1_2 and ST2_2 included in the first stage group STG1_3 may be connected to the eighth sub-input terminal 204b. The stages included in the second to fourth stage groups STG2_3, STG3_3, and STG4_3 may also be connected to sub-input terminals in substantially the same form.

The first and second carry clock signals RCLK1 and RCLK2 or third and fourth carry clock signals RCLK3 and RCLK4 among the carry clock signals RCLK1 to RCLK4 may be provided to the fourth input terminal 204_1 of the stage groups STG1_3 to STG4_3.

In an embodiment, a fourth input terminal 204_1 of a k-th stage group, where k is an integer greater than 0, may receive the third carry clock signal RCLK3 and the fourth carry clock signal RCLK4. For example, a seventh sub-input terminal 204a of the k-th stage group may receive the third carry clock signal RCLK3, and an eighth sub-input terminal 204b of the k-th stage group may receive the fourth carry clock signal RCLK4. On the other hand, a fourth input terminal 204_1 of a (k+1)-th stage group may receive the first carry clock signal RCLK1 and the second carry clock signal RCLK2. For example, a seventh sub-input terminal 204a of the (k+1)-th stage group may receive the first carry clock signal RCLK1, and an eighth sub-input terminal 204b of the (k+1)-th stage group may receive the second carry clock signal RCLK2.

For example, each of the fourth input terminals 204_1 of the first stage group STG1_3 and the third stage group STG3_3 may receive the third and fourth carry clock signals RCLK3 and RCLK4. For example, the seventh sub-input terminals 204a of the first stage group STG1_3 and the third stage group STG3_3 may receive the third carry clock signal RCLK3, and the eighth sub-input terminals 204b of the first stage group STG1_3 and the third stage group STG3_3 may receive the fourth carry clock signal RCLK4. On the other hand, each of the fourth input terminals 204_1 of the second stage group STG2_3 and the fourth stage group STG4_3 may receive the first and second carry clock signals RCLK1 and RCLK2. For example, the seventh sub-input terminals 204a of the second stage group STG2_3 and the fourth stage group STG4_3 may receive the first carry clock signal RCLK1, and the eighth sub-input terminals 204b of the second stage group STG2_3 and the fourth stage group STG4_3 may receive the second carry clock signal RCLK2.

Accordingly, an s-th stage, where s is an integer greater than 0, included in the k-th stage group may receive the third carry clock signal RCLK3 through a seventh sub-input terminal 204a of a fourth input terminal 204_1, and an (s+1)-th stage included in the k-th stage group may receive the fourth carry clock signal RCLK4 through an eighth sub-input terminal 204b of a fourth input terminal 204_1.

In addition, an (s+2)-th stage included in the (k+1)-th stage group may receive the first carry clock signal RCLK1 through a seventh sub-input terminal 204a of a fourth input terminal 204_1, and an (s+3)-th stage included in the (k+1)-th stage group may receive the second carry clock signal RCLK2 through an eighth sub-input terminal 204b of a fourth input terminal 204_1.

That is, third, fourth, first, and second carry clock signals RCLK3, RCLK4, RCLK1, and RCLK2 may be sequentially provided to the s-th stage, the (s+1)-th stage, the (s+2)-th stage, and the (s+3)-th stage included in two adjacent stage groups, for example, the k-th stage group and the k+1-th stage group.

For example, each of the first stage ST1_2 included in the first stage group STG1_3 and the fifth stage ST5_2 included in the third stage group STG3_3 may receive the third carry clock signal RCLK3 through the seventh sub-input terminal 204a, and each of the second stage ST2_2 included in the first stage group STG1_3 and the sixth stage ST6_2 included in the third stage group STG3_3 may receive the fourth carry clock signal RCLK4 through the eighth sub-input terminal 204b.

In addition, each of the third stage ST3_2 included in the second stage group STG2_3 and the seventh stage ST7_2 included in the fourth stage group STG4_3 may receive the first carry clock signal RCLK1 through the seventh sub-input terminal 204a, and each of the fourth stage ST4_2 included in the second stage group STG2_3 and the eighth stage ST8_2 included in the fourth stage group STG4_3 may receive the second carry clock signal RCLK2 through the eighth sub-input terminal 204b.

That is, the third, fourth, first, and second carry clock signals RCLK3, RCLK4, RCLK1, and RCLK2 may be sequentially provided to the first to fourth stages ST1_2 to ST4_2, and the third, fourth, first, and second carry clock signals RCLK3, RCLK4, RCLK1, and RCLK2 may be sequentially provided to the fifth to eighth stages ST5_2 to ST8_2.

Figure 13:
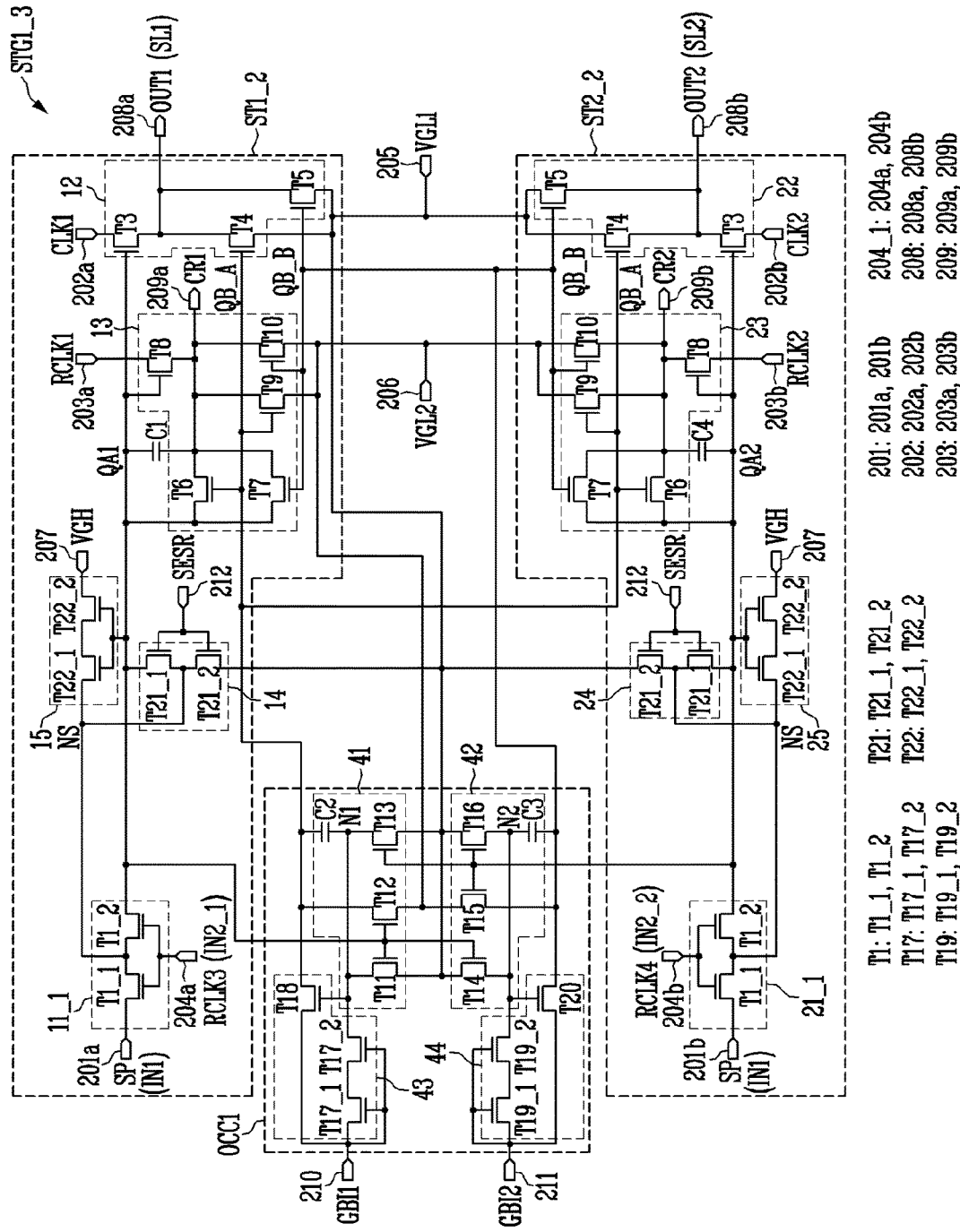
FIG. 13 is a circuit diagram illustrating an example of the first stage group included in the scan driver of FIG. 12.
Figure 14:
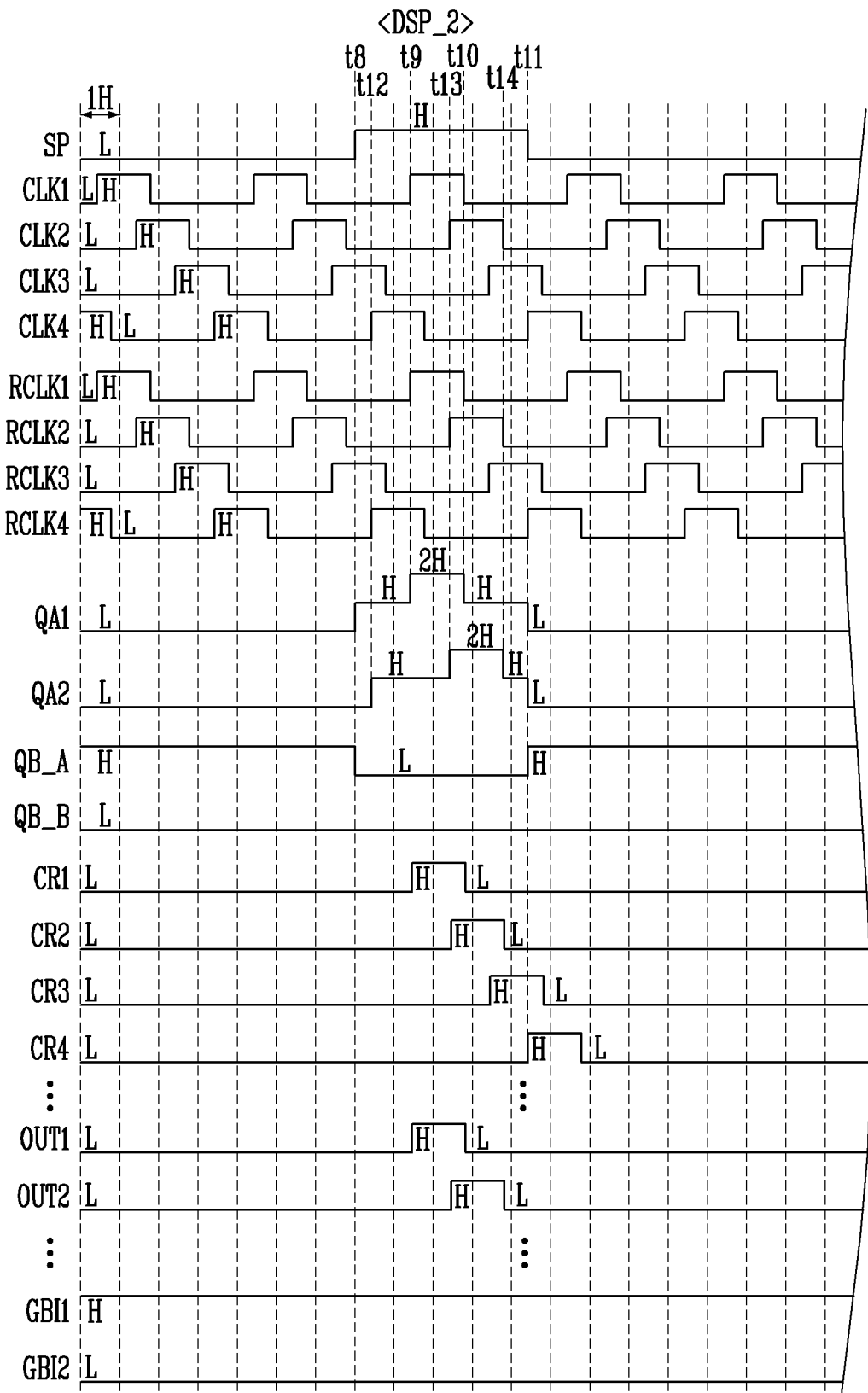
FIG. 14 is a timing diagram illustrating an example of driving the first stage group of FIG. 13 in the display scan period.

FIG. 13 is a circuit diagram illustrating an example of the first stage group STG1_3 included in the scan driver 200_2 of FIG. 12. FIG. 14 is a timing diagram illustrating an example of driving the first stage group STG1_3 of FIG. 13 in the display scan period DSP_2.

In FIGS. 13 and 14, in order to avoid an overlapping description, a point different from that of the above-described embodiment is mainly described, a portion which is not specially described is in accordance with the above-described embodiment, the same reference numeral indicates the same component, and a similar reference numeral indicates a similar component.

The first stage group STG1_3 shown in FIG. 13 indicates an example of the first stage group STG1_3 included in the scan driver 200_2 described with reference to FIG. 12, and indicates a modified embodiment of the first stage group STG1 described with reference to FIG. 3.

Referring to FIGS. 3, 12, and 13, the first stage group STG1_3 may include the first stage ST1_2 and the second stage ST2_2. In an embodiment, the first stage group STG1_3 may further include the first output control circuit OCC1.

The first stage ST1_2 may include a first input unit 11_1, the first output unit 12 (or the first scan signal output unit), the second output unit 13 (or the first carry signal output unit), and the first capacitor C1 (or the first boosting capacitor). According to embodiments, the first stage ST1_2 may further include the first initialization unit 14 and the first stabilization unit 15.

The second stage ST2_2 may include a second input unit 21_1, the third output unit 22 (or the second scan signal output unit), the fourth output unit 23 (or the second carry signal output unit), and the fourth capacitor C4 (or the second boosting capacitor). According to embodiments, the second stage ST2_1 may further include the second initialization unit 24 and the second stabilization unit 25.

The first input unit 11_1 may receive the first input signal IN1, for example, the start pulse SP, through the first input terminal 201, for example, the first sub-input terminal 201a, and receive a second input signal IN2_1, for example, the third carry clock signal RCLK3, through the fourth input terminal 204_1, for example, the seventh sub-input terminal 204a.

In an embodiment, the first input unit 11_1 may control the voltage of the third node QA1 based on the start pulse SP and the third carry clock signal RCLK3.

To this end, the first input unit 11_1 may include the first transistor T1.

The first transistor T1 may be connected between the first sub-input terminal 201a and the third node QA1, and may include a gate electrode connected to the seventh sub-input terminal 204a. The first transistor T1 may be turned on when the second input signal IN2_1 (or the third carry clock signal RCLK3) supplied through the seventh sub-input terminal 204a has a gate-on level, for example, a high level, to electrically connect the first sub-input terminal 201a and the third node QA1.

Meanwhile, the second stage ST2_2 may be substantially the same as or similar to the above-described first stage ST1_2. For example, the second input unit 21_1 of the second stage ST2_2 may be connected between the second sub-input terminal 201b and the fourth node QA2, and may include the first transistor T1 including a gate electrode connected to the eighth sub-input terminal 204b to which the second input signal IN2_2 (or the fourth carry clock signal RCLK4) is provided.

Hereinafter, an operation, for example, an operation in the display scan period DSP_2, of the first stage group STG1_3 of FIG. 13 is more specifically described by further referring to FIG. 14. Meanwhile, for convenience of description, a description overlapping a content described with reference to FIGS. 3, 6A, and 6B is not repeated in relation to the operation of the first stage group STG1_3 of FIG. 13.

Referring further to FIG. 14, in a period from an eighth time point t8 to an eleventh time point t11, the start pulse SP may have the high level H. In addition, in a period before the eighth time point t8 and a period after the eleventh time point t11, the start pulse SP may have the low level L.

Meanwhile, in the period before the eighth time point t8, the voltage of the third node QA1 of the first stage ST1_2 and the voltage of the fourth node QA2 of the second stage ST2_2 may have the low level L. For example, during the period before the eighth time point t8, at a time point when the second input signals IN2_1 and IN2_2, for example, the third carry clock signal RCLK3 and the fourth carry clock signal RCLK4, have the high level, the first transistor T1 included in each of the first stage ST1 and the second stage ST2 may be turned on, and thus the start pulse SP of the low level L may be provided to each of the third node QA1 and the fourth node QA2. Accordingly, each of the voltages of the third node QA1 and the fourth node QA2 may change to the low level L (or each of the voltages of the third node QA1 and the fourth node QA2 are maintained as the low level L). Accordingly, in the period before the eighth time point t8, the eleventh to sixteenth transistors T11 to T16 may maintain a turn-off state.

Meanwhile, similar to that described with reference to FIGS. 3 and 6A, in the period before the eighth time point t8, the voltage of the first node QB_A may have the high level H.

Meanwhile, unlike the first node control signal GBI1, since the second node control signal GBI2 is maintained as the low level L, the nineteenth transistor T19 and the twentieth transistor T20 may be turned off or maintained as a turn-off state. Accordingly, the second node QB_B may be maintained as the low level L.

Hereinafter, for convenience of description, the description is given based on an operation of the first stage ST1_2 and the first output control circuit OCC1 at the eighth to eleventh time points t8 to t11. In addition, in relation to an operation of the second stage ST2_2, a point different from that of the operation of the first stage ST1_2 is mainly described, and an overlapping description is not repeated.

At the eighth time point t8, the start pulse SP supplied through the first sub-input terminal 201a may transit from the low level L to the high level H. In this case, the first transistor T1 included in the first input unit 11_1 may be turned on by the third carry clock signal RCLK3 of the high level H (or the gate-on level).

When the first transistor T1 is turned on, the high level H of the start pulse SP may be supplied to the third node QA1. Accordingly, the voltage of the third node QA1 may transit from the low level L to the high level H.

Meanwhile, similarly to this, the start pulse SP may be supplied through the second sub-input terminal 201b of the second stage ST2_2. Here, the first transistor T1 included in the third sub-input unit 21a may be turned on by the fourth carry clock signal RCLK4 of the high level H supplied at a twelfth time point t12 after the eighth time point t8. Accordingly, at the twelfth time point t12, the voltage of the fourth node QA2 may transit from the low level L to the high level H.

The eleventh, twelfth, and fourteenth transistors T11, T12, and T14 may be turned on by the voltage of the high level H of the third node QA1. In addition, the thirteenth, fifteenth, and sixteenth transistors T13, T15, and T16 may be turned on by the voltage of the high level H of the fourth node QA2.

Here, as described with reference to FIGS. 3 and 6A, the voltage of the first node QB_A may transit from the high level H to the low level L by the turned-on twelfth transistor T12.

Meanwhile, the third transistor T3 of the first output unit 12 and the eighth transistor T8 of the second output unit 13 may be turned on by the voltage of the high level H of the third node QA1. Since both of the first clock signal CLK1 and the first carry clock signal RCLK1 have the low level L at the eighth time point t8, the first output signal OUT1 output through the first sub-output terminal 208a and the first carry signal CR1 output through the third sub-output terminal 209a may have the low level L.

Similarly to this, the third transistor T3 of the third output unit 22 and the eighth transistor T8 of the fourth output unit 23 may be turned on by the voltage of the high level H of the fourth node QA2. Since both of the second clock signal CLK2 and the second carry clock signal RCLK2 have the low level L at the twelfth time point t12, the second output signal OUT2 output through the second sub-output terminal 208b and the second carry signal CR2 output through the fourth sub-output terminal 209b may have the low level L.

Thereafter, at the ninth time point t9, the first clock signal CLK1 of the high level H may be supplied through the third sub-input terminal 202a, and the first carry clock signal RCLK1 of the high level H may be supplied through the fifth sub-input terminal 203a.

Here, the third transistor T3 of the first output unit 12 and the eighth transistor T8 of the second output unit 13 may be turned on or may maintain a turn-on state by the voltage of the third node QA1 of the high level H.

Since the third transistor T3 of the first output unit 12 is turned on or maintains the turn-on state, the first clock signal CLK1 of the high level H may be supplied to the first sub-output terminal 208a, and thus the first output signal OUT1 may be output as the high level H.

In addition, since the eighth transistor T8 of the second output unit 13 is turned on or maintains the turn-on state, the first carry clock signal RCLK1 of high level H may be supplied to the third sub-output terminal 209a, and thus the first carry signal CR1 may be output as the high level H.

Meanwhile, as described above, the voltage of the node corresponding to the third sub-output terminal 209a (that is, the node connected to the second electrode of the first capacitor C1) may change from the existing low level L to the high level H. In this case, the voltage of the third node QA1 may be increased from the existing high level H to the 2-high level 2H by the coupling of the first capacitor C1. Accordingly, the third transistor T3 of the first output unit 12 and the eighth transistor T8 of the second output unit 13 may stably maintain a turn-on state.

Thereafter, at the tenth time point t10, the first clock signal CLK1 of the low level L may be supplied through the third sub-input terminal 202a, and the first carry clock signal RCLK1 of the low level L may be supplied through the fifth sub-input terminal 203a.

Here, the third transistor T3 of the first output unit 12 and the eighth transistor T8 of the second output unit 13 may be turned on or may maintain a turn-on state by the voltage of the third node QA1 of the high level H.

Since the third transistor T3 of the first output unit 12 is turned on or maintains the turn-on state, the first clock signal CLK1 of the low level L may be supplied to the first sub-output terminal 208a, and thus the first output signal OUT1 may be output as the low level L again.

In addition, since the eighth transistor T8 of the second output unit 13 is turned on or maintains the turn-on state, the first carry clock signal RCLK1 of the low level L may be supplied to the third sub-output terminal 209a, and thus the first carry signal CR1 may be output as the low level L again.

Meanwhile, as described above, the voltage of the node corresponding to the third sub-output terminal 209a (that is, the node connected to the second electrode of the first capacitor C1) may change from the existing high level H to the low level L. In this case, the voltage of the third node QA1 may be lowered from the existing 2-high level 2H to the high level H again due to the coupling of the first capacitor C1.

Thereafter, at the eleventh time point t11, the start pulse SP supplied through the first input terminal 201, for example, the first sub-input terminal 201a or the second sub-input terminal 201b, may transit from the high level H to the low level L.

At the eleventh time t11, since the third carry clock signal RCLK3 of the high level H (or the gate-on level) is supplied through the seventh sub-input terminal 204a, the first transistor T1 included in the first input unit 11_1 may be turned on. Accordingly, the start pulse SP of the low level L may be supplied to the third node QA1 by the turned-on first transistor T1, and thus the voltage of the third node QA1 may transit from the high level H to the low level L at the eleventh time point t11.

Meanwhile, the second stage ST2_2 may operate substantially identically or similarly to the operation of the first stage ST1_2 described above.

For example, at the twelfth time point t12, the first transistor T1 of the second input unit 21_1 may be turned on by the second input signal IN2_2, for example, the fourth carry clock signal RCLK4, of the high level H provided to the eighth sub-input terminal 204b. Accordingly, at the twelfth time point t12, the voltage of the fourth node QA2 may transit from the low level L to the high level H by the first input signal IN1 (or the start pulse SP) of the high level H provided to the second sub-input terminal 201b. Accordingly, each of the third transistor T3 of the third output unit 22 and the eighth transistor T8 of the fourth output unit 23 may be turned on, and the second output signal OUT2 of the high level H and the second carry signal CR2 of the high level H may be output to the second sub-output terminal 208b and the fourth sub-output terminal 209b, respectively, in response to a period in which the second clock signal CLK2 supplied through the fourth sub-input terminal 202b and the second carry clock signal RCLK2 supplied through the sixth sub-input terminal 203b have the high level H. For example, in a period from the thirteenth time point t13 to the fourteenth time point t14, the second clock signal CLK2 and the second carry clock signal RCLK2 may have the high level H. Accordingly, in the period from the thirteenth time point t13 to the fourteenth time point t14, the second output signal OUT2 of the high level H may be output to the second sub-output terminal 208b through the third transistor T3 that is turned on (or maintaining a turn-on state) of the third output unit 22, and the second carry signal CR2 of the high level H may be output to the fourth sub-output terminal 209b through the eighth transistor T8 that is turned on (or maintaining a turn-on state) of the fourth output unit 22.

In addition, at the eleventh time point t11, since the second input signal IN2_2 of the high level H (or the gate-on level), for example, the fourth carry clock signal RCLK4 of the high level H, is supplied through the eighth sub-input terminal 204b, the second transistor T2 of the second input unit 21_1 may be turned on. In this case, since the start pulse SP of the low level L is supplied to the fourth node QA2, the voltage of the fourth node QA2 may transit from the high level H to the low level L at the eleventh time point t11.

The third and eighth transistors T3 and T8 included in each of the first stage ST1_2 and the second stage ST2_2 may be turned off by the voltage of the low level L of the third node QA1 and the voltage of the low level L of the fourth node QA2.

In addition, the eleventh to sixteenth transistors T11 to T16 may be turned off by the voltage of the low level L of the third node QA1 and the voltage of the low level L of the fourth node QA2. Here, since the twelfth transistor T12 is turned off, the voltage of the second power VGL2 of the low level L may be blocked from being supplied to the first node QB_A.

Here, as described above, since the seventeenth and eighteenth transistors T17 and T18 are turned on or maintain the turn-on state by the first node control signal GBI1 of the high level H, the voltage of the first node QB_A may change from the low level L to the high level H in correspondence with the eleventh time point t11.

The fourth transistor T4 and the ninth transistor T9 included in each of the first stage ST1_2 and the second stage ST2_2 may be turned on by the voltage of the high level H of the first node QB_A.

Since the fourth transistor T4 is turned on, the voltage of the first power VGL1 of the low level L may be supplied to the first sub-output terminal 208a (or the second sub-output terminal 208b), and thus the first output signal OUT1 (or the second output signal OUT2) may be output as the low level L.

In addition, since the ninth transistor T9 is turned on, the voltage of the second power VGL2 of the low level L may be supplied to the third sub-output terminal 209a (or the fourth sub-output terminal 209b), and thus the first carry signal CR1 (or the second carry signal CR2) may be output as the low level L.

In FIG. 14, the description is given based on an embodiment in which the first node control signal GBI1 is maintained as the high level H and the second node control signal GBI2 is maintained as the low level L. However, in an example, as described with reference to FIGS. 6A to 8B, the first node control signal GBI1 may be maintained as the low level L and the second node control signal GBI2 may be maintained as the high level H.

Figure 15:
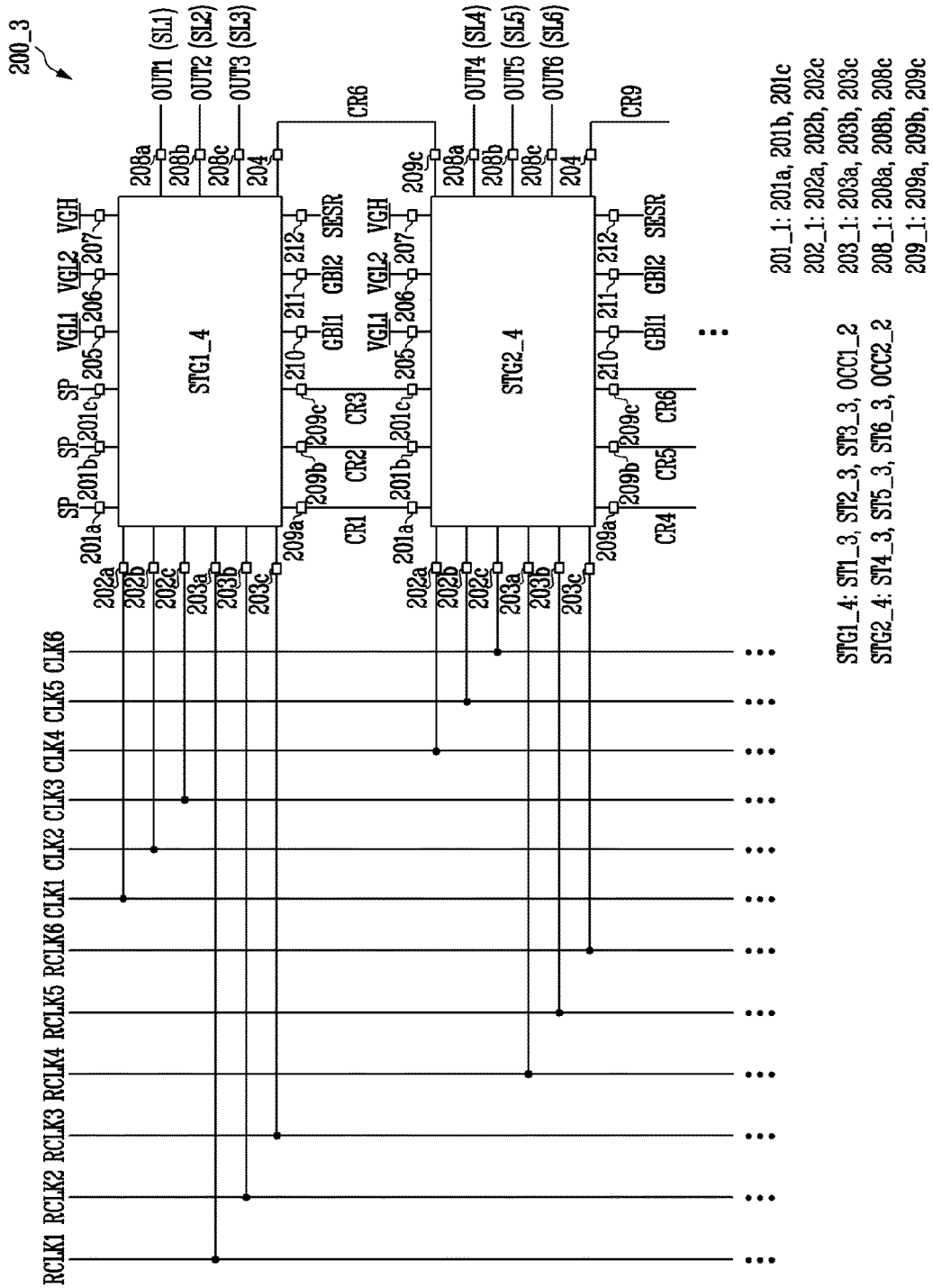
FIG. 15 is a block diagram illustrating a scan driver (gate driver) according to embodiments of the disclosure.

FIG. 15 is a block diagram illustrating a scan driver 200_3 (gate driver) according to embodiments of the disclosure. In FIG. 15, in order to avoid an overlapping description, a point different from that of the above-described embodiment is mainly described, a portion which is not specially described is in accordance with the above-described embodiment, the same reference numeral indicates the same component, and a similar reference numeral indicates a similar component.

The scan driver 200_3 shown in FIG. 15 indicates a modified embodiment of the scan driver 200 described with reference to FIG. 2.

Meanwhile, for convenience of description, in FIG. 15, two stage groups STG1_4 and STG2_4 among stage groups included in the scan driver 200_3 and scan signals (or output signals OUT1 to OUT6) output from the two stage groups STG1_4 and STG2_4 are exemplarily shown.

Referring to FIG. 15, the scan driver 200_3 may include a plurality of stage groups STG1_4 and STG2_4. Each of the stage groups STG1_4 and STG2_4 may be connected to corresponding scan lines SL1 to SL6, and may output a scan signal (or an output signal) in response to clock signals CLK1 to CLK6 and carry clock signals RCLK1 to RCLK6.

In an embodiment, each of the stage groups STG1_4 and STG2_4 may include three stages. For example, a first stage group STG1_4 may include a first stage ST1_3, a second stage ST2_3, and a third stage ST3_3, and a second stage group STG2_4 may include a fourth stage ST4_3, a fifth stage ST5_3, and a sixth stage ST6_3. The respective first to third stages ST1_3, ST2_3, and ST3_3 included in the first stage group STG1_4 may output a first scan signal (or a first output signal OUT1), a second scan signal (or a second output signal OUT2), and a third scan signal (or a third output signal OUT3) through respective first to third scan lines SL1, SL2, and SL3. Similarly, the respective fourth to sixth stages ST4_3, ST5_3, and ST6_3 included in the second stage group STG2_4 may output a fourth scan signal (or a fourth output signal OUT4), a fifth scan signal (or a fifth output signal OUT5), and a sixth scan signal (or a sixth output signal OUT6) through respective fourth to sixth scan lines SL4, SL5, and SL6.

In an embodiment, each of the stage groups STG1_4 and STG2_4 may include an output control circuit (or an output controller). For example, the first stage group STG1_4 may include a first output control circuit OCC1_2, and the second stage group STG2_4 may include a second output control circuit OCC2_2. Each of the output control circuits OCC1_2 and OCC2_2 may control a voltage level of an output control node, for example, the first node QB_A or the second node QB_B of FIG. 16, included in each of stages included in a corresponding stage group.

According to an embodiment, the three stages included in each of the stage groups STG1_4 and STG2_4 may share one output control circuit.

For example, the first to third stages ST1_3, ST2_3, and ST3_3 included in the first stage group STG1_4 may share the first output control circuit OCC1_2 and the fourth to sixth stages ST4_3, ST5_3, and ST6_3 included in the second stage group STG2_4 may share the second output control circuit OCC2_2.

Figure 16:
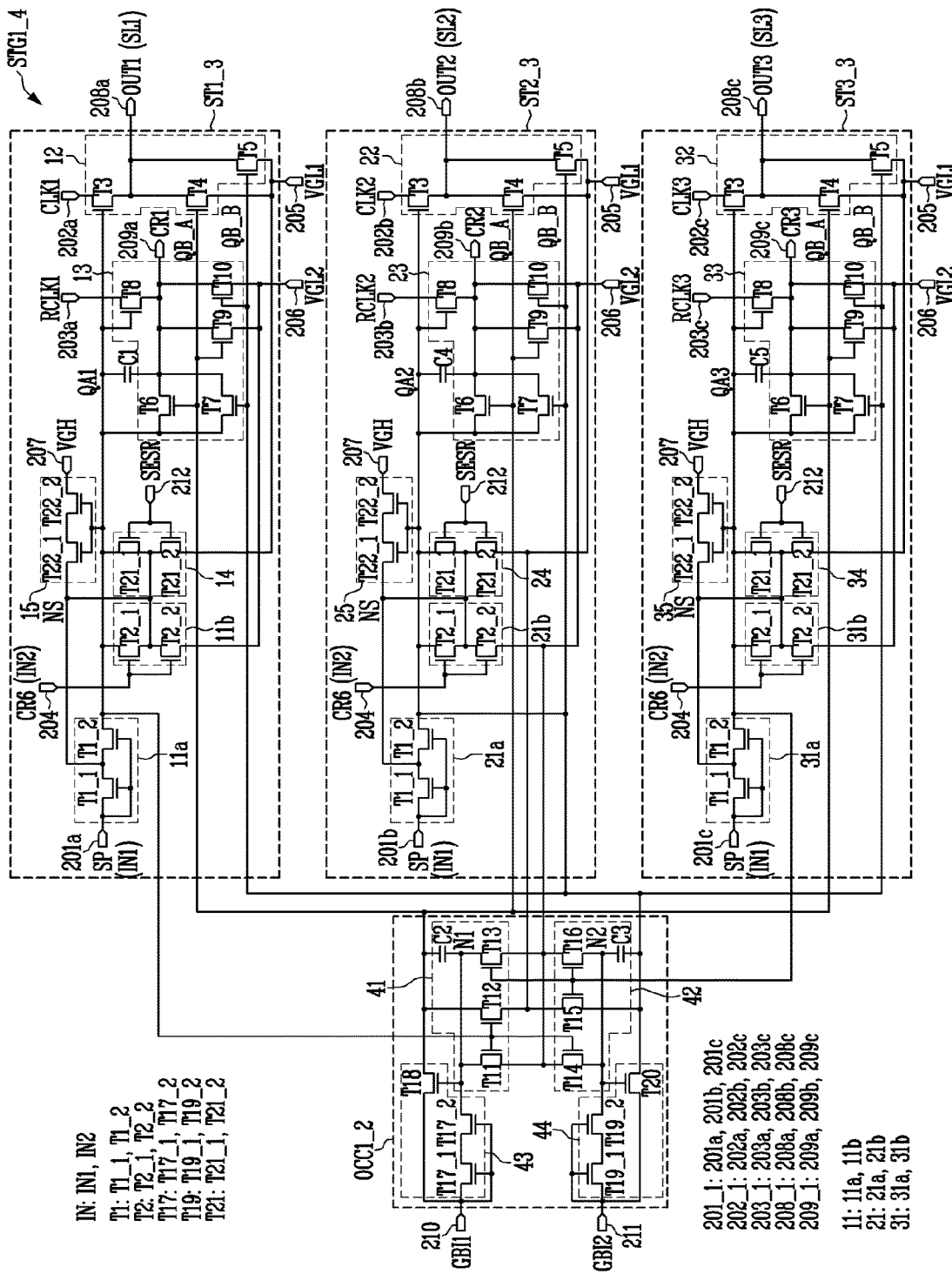
FIG. 16 is a circuit diagram illustrating an example of a first stage group included in the scan driver of FIG. 15.

As described above, as the three stages included in each of the stage groups STG1_4 and STG2_4 share one output control circuit, the voltage level of the output control node, for example, the first node QB_A or the second node QB_B of FIG. 16, included in each of the three stages included in one stage group may be controlled by one output control circuit. Accordingly, a dead space of the scan driver 200_3 (or the stage groups STG1_4 and STG2_4) may be reduced (or minimized).

A configuration in which the voltage level of the output control node included in each of the stages is controlled according to an operation of the output control circuit is specifically described with reference to FIGS. 16, 17A, and 17B.

The second stage group STG2_4 may be connected in dependence on the first stage group STG1_4. The stage groups STG1_4 and STG2_4 may have substantially the same configuration. For example, the stages ST1_3 to ST6_3 included in each of the stage groups STG1_4 and STG2_4 may have substantially the same configuration.

Each of the stage groups STG1_4 and STG2_4 may include a first input terminal 201_1, a second input terminal 202_1, a third input terminal 203_1, the fourth input terminal 204, the first power input terminal 205, the second power input terminal 206, the third power input terminal 207, a first output terminal 208_1, and a second output terminal 209_1.

In an embodiment, each of the stage groups STG1_4 and STG2_4 may further include a fifth input terminal 210, a sixth input terminal 211, and a seventh input terminal 212.

According to an embodiment, the three stages included in each of the stage groups STG1_4 and STG2_4 may be commonly connected to the fourth input terminal 204, the seventh input terminal 212, the first power input terminal 205, the second power input terminal 206, and the third power input terminal 207. In addition, the output control circuit included in each of the stage groups STG1_4 and STG2_4 may be connected to the fifth input terminal 210 and the sixth input terminal 211.

In an embodiment, the first input terminal 201_1 included in each of the stage groups STG1_4 and STG2_4 may include a first sub-input terminal 201a, a second sub-input terminal 201b, and a ninth sub-input terminal 201c, the second input terminal 202_1 may include a third sub-input terminal 202a, a fourth sub-input terminal 202b, and a tenth sub-input terminal 202c, and the third input terminal 203_1 may include a fifth sub-input terminal 203a, a sixth sub-input terminal 203b, and an eleventh sub-input terminal 203c. Each sub-input terminal may be connected to a corresponding stage among the stages included in each of the stage groups STG1_4 and STG2_4.

For example, among the stages ST1_3, ST2_3, and ST3_3 included in the first stage group STG1_4, the first stage ST1_3 may be connected to the first sub-input terminal 201a, the third sub-input terminal 202a, and the fifth sub-input terminal 203a, the second stage ST2_3 may be connected to the second sub-input terminal 201b, the fourth sub-input terminal 202b, and the sixth sub-input terminal 203b, the third stage ST3_3 may be connected to the ninth sub-input terminal 201c, the tenth sub-input terminal 202c, and the eleventh sub-input terminal 203c. The stages included in the second stage group STG2_4 may also be connected to sub-input terminals in substantially the same form.

In addition, the first output terminal 208_1 included in each of the stage groups STG1_4 and STG2_4 may include a first sub-output terminal 208a, a second sub-output terminal 208b, and a fifth sub-output terminal 208c, and the second output terminal 209_1 may include a third sub-output terminal 209a, a fourth sub-output terminal 209b, and a sixth sub-output terminal 209c. Each sub-output terminal may be connected to a corresponding stage among the stages included in each of the stage groups STG1_4 and STG2_4.

For example, the first stage ST1_3 among the stages ST1_3, ST2_3, and ST3_3 included in the first stage group STG1_4 may be connected to the first sub-output terminal 208a to output the first scan signal (or the first output signal OUT1) to the first sub-output terminal 208a, and may be connected to the third sub-output terminal 209a to output the first carry signal CR1 to the third sub-output terminal 209a. In addition, the second stage ST2_3 may be connected to the second sub-output terminal 208b to output the second scan signal (or the second output signal OUT2) to the second sub-output terminal 208b, and may be connected to the fourth sub-output terminal 209b to output the second carry signal CR2 to the fourth sub-output terminal 209b. In addition, the third stage ST3_3 may be connected to the fifth sub-output terminal 208c to output the third scan signal (or the third output signal OUT3) to the fifth sub-output terminal 208c, and may be connected to the sixth sub-output terminal 209b to output the third carry signal CR3 to the sixth sub-output terminal 209b. The stages included in the second stage group STG2_4 may also be connected to the sub-output terminals in substantially the same form.

The first input terminal 201_1 of the first stage group STG1_4 may receive the start pulse SP. For example, each of the first, second, and ninth sub-input terminals 201a, 201b, and 201c of the first stage group STG1_4 may receive the start pulse SP. Accordingly, each of the first to third stages ST1_3, ST2_3, and ST3_3 included in the first stage group STG1_4 may receive the start pulse SP through the first, second, and ninth sub-input terminals 201a, 201b, and 201c.

In addition, the first input terminal 201_1 of the second stage group STG2_4 may receive carry signals output from the second output terminal 209 of a previous stage group.

For example, the first input terminal 201_1 of the second stage group STG2_4 may receive the first to third carry signals CR1, CR2, and CR3 output from the second output terminal 209 of the first stage group STG1_4. For example, the first sub-input terminal 201a of the second stage group STG2_4 may receive the first carry signal CR1 output from the third sub-output terminal 209a of the first stage group STG1_4, the second sub-input terminal 201b of the second stage group STG2_4 may receive the second carry signal CR2 output from the fourth sub-output terminal 209b of the first stage group STG1_4, and the ninth sub-input terminal 201c of the second stage group STG2_4 may receive the third carry signal CR3 output from the sixth sub-output terminal 209c of the first stage group STG1_4. Accordingly, the fourth to sixth stages ST4_3, ST5_3, and ST6_3 included in the second stage group STG2_4 may receive the first to third carry signals CR1, CR2, and CR3 through the first, second, and ninth sub-input terminals 201a, 201b, and 201c, respectively.

First to third clock signals CLK1, CLK2 and CLK3 or fourth to sixth clock signals CLK4 to CLK6 among the clock signals CLK1 to CLK6 may be provided to the second input terminal 202_1 of the stage groups STG1_4 and STG2_4.

In an embodiment, the second input terminal 202_1 of a k-th stage group, where k is an integer greater than 0, may receive the first to third clock signals CLK1, CLK2, and CLK3. For example, a third sub-input terminal 202a of the k-th stage group may receive the first clock signal CLK1, a fourth sub-input terminal 202b of the k-th stage group may receive the second clock signal CLK2, and a tenth sub-input terminal 202c of the k-th stage group may receive the third clock signal CLK3. On the other hand, a second input terminal 202_1 of a (k+1)-th stage group may receive the fourth to sixth clock signals CLK4, CLK5, and CLK6. For example, a third sub-input terminal 202a of the (k+1)-th stage group may receive the fourth clock signal CLK4, a fourth sub-input terminal 202b of the (k+1)-th stage group may receive the fifth clock signal CLK5, and a tenth sub-input terminal 202c of the (k+1)-th stage group may receive the sixth clock signal CLK6.

For example, the second input terminal 202_1 of the first stage group STG1_4 may receive the first to third clock signals CLK1, CLK2, and CLK3. For example, the third sub-input terminal 202a of the first stage group STG1_4 may receive the first clock signal CLK1, the fourth sub-input terminal 202b of the first stage group STG1_4 may receive the second clock signal CLK2, and the tenth sub-input terminal 202c of the first stage group STG1_4 may receive the third clock signal CLK3. On the other hand, the second input terminal 202_1 of the second stage group STG2_4 may receive the fourth to sixth clock signals CLK4, CLK5, and CLK6. For example, the third sub-input terminal 202a of the second stage group STG2_4 may receive the fourth clock signal CLK4, the fourth sub-input terminal 202b of the second stage group STG2_4 may receive the fifth clock signal CLK5, and the tenth sub-input terminal 202c of the second stage group STG2_4 may receive the sixth clock signal CLK6.

Accordingly, an s-th stage, where s is an integer greater than 0, included in the k-th stage group may receive the first clock signal CLK1 through the third sub-input terminal 202a of the second input terminal 202_1, an (s+1)-th stage included in the k-th stage group may receive the second clock signal CLK2 through the fourth sub-input terminal 202b of the second input terminal 202_1, and an (s+2)-th stage included in the k-th stage group may receive the third clock signal CLK3 through the tenth sub-input terminal 202c of the second input terminal 202_1.

In addition, an (s+3)-th stage included in the (k+1)-th stage group may receive the fourth clock signal CLK4 through the third sub-input terminal 202a of the second input terminal 202_1, an (s+4)-th stage included in the (k+1)-th stage group may receive the fifth clock signal CLK5 through the fourth sub-input terminal 202b of the second input terminal 202_1, and an (s+5)-th stage included in the (k+1)-th stage group may receive the sixth clock signal CLK6 through the tenth sub-input terminal 202c of the second input terminal 202_1.

That is, the first to sixth clock signals CLK1 to CLK6 may be sequentially provided to the s-th to (s+5)-th stages included in two adjacent stage groups, for example, the k-th stage group and the (k+1)-th stage group.

In an embodiment, the clock signals CLK1 to CLK6 may have the same period in a display scan period DSP_3 (refer to FIG. 17A) and have a waveform in which a phase partially overlaps. For example, in the display scan period DSP_3 (refer to FIG. 17A), the second clock signal CLK2 may be set to a signal shifted by about 1/6 period from the first clock signal CLK1, the third clock signal CLK3 may be set to a signal shifted by about 1/6 period from the second clock signal CLK2, the fourth clock signal CLK4 may be set to a signal shifted by about 1/6 period from the third clock signal CLK3, the fifth clock signal CLK5 may be set to a signal shifted by about 1/6 period from the fourth clock signal CLK4, and the sixth clock signal CLK6 may be set to a signal shifted by about 1/6 period from the fifth clock signal CLK5.

In an embodiment, the clock signals CLK1 to CLK6 may have a waveform maintained as a constant level during a self-scan period SSP_2 (refer to FIG. 17B). For example, in the self-scan period SSP_2 (refer to FIG. 17B), the clock signals CLK1 to CLK6 may be set to a signal maintained as a low level (or a low voltage).

Accordingly, during the self-scan period, power consumption for transiting (or clocking) a signal level of the clock signals CLK1 to CLK6 at a constant period may be reduced, by maintaining the clock signals CLK1 to CLK6 used to generate the scan signal as a constant level.

First to third carry clock signals RCLK1, RCLK2, and RCLK3 or fourth to sixth carry clock signals RCLK4 to RCLK6 among the carry clock signals RCLK1 to RCLK6 may be provided to the third input terminal 203_1 of the stage groups STG1_4 and STG2_4.

In an embodiment, the third input terminal 203_1 of the k-th stage group may receive the first to third carry clock signals RCLK1, RCLK2, and RCLK3. For example, the fifth sub-input terminal 203a of the k-th stage group may receive the first carry clock signal RCLK1, the sixth sub-input terminal 203b of the k-th stage group may receive the second carry clock signal RCLK2, and the eleventh sub-input terminal 203c of the k-th stage group may receive the third carry clock signal RCLK3. On the other hand, the third input terminal 203_1 of the (k+1)-th stage group may receive the fourth to sixth carry clock signals RCLK4, RCLK5, and RCLK6. For example, the fifth sub-input terminal 203a of the (k+1)-th stage group may receive the fourth carry clock signal RCLK4, the sixth sub-input terminal 203b of the (k+1)-th stage group may receive the fifth carry clock signal RCLK5, and the eleventh sub-input terminal 203c of the (k+1)-th stage group may receive the sixth carry clock signal RCLK6.

For example, the third input terminal 203_1 of the first stage group STG1_4 may receive the first to third carry clock signals RCLK1, RCLK2, and RCLK3. For example, the fifth sub-input terminal 203a of the first stage group STG1_4 may receive the first carry clock signal RCLK1, the sixth sub-input terminal 203b of the first stage group STG1_4 may receive the second carry clock signal RCLK2, and the eleventh sub-input terminal 203c of the first stage group STG1_4 may receive the third carry clock signal RCLK3. On the other hand, the third input terminal 203_1 of the second stage group STG2_4 may receive the fourth to sixth carry clock signals RCLK4, RCLK5, and RCLK6. For example, the fifth sub-input terminal 203a of the second stage group STG2_4 may receive the fourth carry clock signal RCLK4, the sixth sub-input terminal 203b of the second stage group STG2_4 may receive the fifth carry clock signal RCLK5, and the eleventh sub-input terminal 203c of the second stage group STG2_4 may receive the sixth carry clock signal RCLK6.

Accordingly, the s-th stage included in the k-th stage group may receive the first carry clock signal RCLK1 through the fifth sub-input terminal 203a of the third input terminal 203_1, the (s+1)-th stage included in the k-th stage group may receive the second carry clock signal RCLK2 through the sixth sub-input terminal 203b of the third input terminal 203_1, and the (s+2)-th stage included in the k th stage group may receive the third carry clock signal RCLK3 through the eleventh sub-input terminal 203c of the third input terminal 203_1.

In addition, the (s+3)-th stage included in the (k+1)-th stage group may receive the fourth carry clock signal RCLK4 through the fifth sub-input terminal 203a of the third input terminal 203_1, the (s+4)-th stage included in the (k+1)-th stage group may receive the fifth carry clock signal RCLK5 through the sixth sub-input terminal 203b of the third input terminal 203_1, and the (s+5)-th stage included in the (k+1)-th stage group may receive the sixth carry clock signal RCLK6 through the eleventh sub-input terminal 203c of the third input terminal 203_1.

That is, the first to sixth carry clock signals RCLK1 to RCLK6 may be provided sequentially to the s-th to (s+5)-th stages included in two adjacent stage groups, for example, the k-th stage group and the (k+1)-th stage group.

In an embodiment, the carry clock signals RCLK1 to RCLK6 may have the same period in the display scan period DSP_3 (refer to FIG. 17A), and may have a waveform in which a phase partially overlaps. For example, in the display scan period DSP_3 (refer to FIG. 17A), the second carry clock signal RCLK2 may be set to a signal shifted by about 1/6 period from the first carry clock signal RCLK1, the third carry clock signal RCLK3 may be set to a signal shifted by about 1/6 period from the second carry clock signal RCLK2, the fourth carry clock signal RCLK4 may be set to a signal shifted by about 1/6 period from the third carry clock signal RCLK3, the fifth carry clock signal RCLK5 may be set to a signal shifted by about 1/6 period from the fourth carry clock signal RCLK4, and the sixth carry clock signal RCLK6 may be set to a signal shifted by about 1/6 period from the fifth carry clock signal RCLK5.

In an embodiment, the carry clock signals RCLK1 to RCLK6 may have a waveform maintained as a constant level during the self-scan period SSP_2 (refer to FIG. 17B). For example, in the self-scan period SSP_2 (refer to FIG. 17B), the carry clock signals RCLK1 to RCLK6 may be set to a signal maintained as a high level (or a high voltage).

Accordingly, during the self-scan period, power consumption for transiting (or clocking) a signal level of the carry clock signals RCLK1 to RCLK6 at a constant period may be reduced, by maintaining the carry clock signals RCLK1 to RCLK6 used to generate the carry signal as a constant level.

Each of the fourth input terminals 204 of the stage groups STG1_4 and STG2_4 may receive a carry signal output from the second output terminal 209, for example, the sixth sub-output terminal 209c, of a next stage group.

In an embodiment, the fourth input terminal 204 of the k-th stage group may receive the carry signal output from the sixth sub-output terminal 209c of the (k+1)-th stage group. Accordingly, the s-th to (s+2)-th stages included in the k-th stage group may receive an (s+5)-th carry signal output from the (s+5)-th stage through the sixth sub-output terminal 209c of the (k+1)-th stage group.

For example, the fourth input terminal 204 of the first stage group STG1_4 may receive a sixth carry signal CR6 output from the sixth sub-output terminal 209c of the second stage group STG2_4. That is, the fourth input terminal 204 of the first stage group STG1_4 may receive the sixth carry signal CR6 output from the sixth stage ST6_3 included in the second stage group STG2_4. Accordingly, each of the first to third stages ST1_3, ST2_3, and ST3_3 included in the first stage group STG1_4 may receive the sixth carry signal CR6 through the fourth input terminal 204. Similarly to this, the fourth to sixth stages ST4_3, ST5_3, and ST6_3 may receive a ninth carry signal CR9, for example, the ninth carry signal CR9 output from a ninth stage, output from the sixth sub-output terminal of the third stage group.

However, in an example, the s-th to (s+2)-th stages included in the k-th stage group may receive a q-th carry signal, where q is an integer greater than p+5, output from a q-th stage through the fourth input terminal 204.

Meanwhile, similar to that described with reference to FIG. 2, the voltage of the first power VGL1, the voltage of the second power VGL2, and the voltage of the third power VGH may be applied to the first to third power input terminals 205, 206, and 207 of the stage groups STG1_4 and STG2_4.

The output signals OUT1 to OUT6 may be output to the first output terminals 208_1, for example, the first, second, and fifth sub-output terminals 208a, 208b, and 208c, of each of the stage groups STG1_4 and STG2_4. In an embodiment, the output signals OUT1 to OUT6 output to the first output terminals 208_1 may be provided to the corresponding scan lines SL1 to SL6 as scan signals.

The carry signals CR1 to CR6 may be output to the second output terminals 209_1, for example, the third, fourth, and sixth sub-output terminals 209a, 209b, and 209c, of each of the stage groups STG1_4 and STG2_4.

Meanwhile, similarly to that described with reference to FIG. 2, the first node control signal control signal GBI1, the second node control signal GBI2, and the initialization control signal SESR may be provided to the fifth input terminal 210, the sixth input terminal 211, and the seventh input terminal 212 of the stage groups STG1_4 and STG2_4, respectively.

FIG. 16 is a circuit diagram illustrating an example of the first stage group STG1_4 included in the scan driver 200_3 of FIG. 15. In FIG. 16, in order to avoid an overlapping description, a point different from that of the above-described embodiment is mainly described, a portion which is not specially described is in accordance with the above-described embodiment, the same reference numeral indicates the same component, and a similar reference numeral indicates a similar component.

The first stage group STG1_4 shown in FIG. 16 indicates an example of the first stage group STG1_4 included in the scan driver 200_3 described with reference to FIG. 15, and indicates a modified embodiment of the first stage group STG1 described with reference to FIG. 3.

Referring to FIGS. 15 and 16, the first stage group STG1_4 may include the first stage ST1_3, the second stage ST2_3, and the third stage ST3_3. In an embodiment, the first stage group STG1_4 may further include the first output control circuit OCC1_2.

The first stage ST1_3 may include the first input unit 11 (for example, the first sub-input unit 11a and the second sub-input unit 11b), the first output unit 12 (or the first scan signal output), the second output unit 13 (or the first carry signal output unit), and the first capacitor C1 (or the first boosting capacitor). According to embodiments, the first stage ST1_3 may further include the first initialization unit 14 and the first stabilization unit 15.

The first stage ST1_3 may generate and output the first carry signal CR1 and the first output signal OUT1 (or the first scan signal), based on the input signal IN, the first carry clock signal RCLK1, the first clock signal CLK1, the voltage of the first power VGL1, the voltage of the second power VGL2, and the voltage of the third power VGH.

The second stage ST2_3 may include the second input unit 21, for example, the third sub-input unit 21a and the fourth sub-input unit 21b, the third output unit 22 (or the second scan signal output), the fourth output unit 23 (or the second carry signal output unit), and the fourth capacitor C4 (or the second boosting capacitor). According to embodiments, the second stage ST2_3 may further include the second initialization unit 24 and the second stabilization unit 25.

The second stage ST2_3 may generate and output the second carry signal CR2 and the second output signal OUT2 (or the second scan signal), based on the input signal IN, the second carry clock signal RCLK2, the second clock signal CLK2, the voltage of the first power VGL1, the voltage of the second power VGL2, and the voltage of the third power VGH.

The third stage ST3_3 may include a third input unit 31, for example, a fifth sub-input unit 31a and a sixth sub-input unit 31b, a fifth output unit 32 (or a third scan signal output), a sixth output unit 33 (or a third carry signal output unit), and a fifth capacitor C5 (or a third boosting capacitor). According to embodiments, the third stage ST3_3 may further include a third initialization unit 34 and a third stabilization unit 35.

The third stage ST3_3 may generate and output the third carry signal CR3 and the third output signal OUT3 (or the third scan signal), based on the input signal IN, the third carry clock signal RCLK3, the third clock signal CLK3, the voltage of the first power VGL1, the voltage of the second power VGL2, and the voltage of the third power VGH.

In an embodiment, the first to third stages ST1_3, ST2_3, and ST3_3 included in the first stage group STG1_4 may be commonly connected to the same node. For example, the first to third stages ST1_3, ST2_3, and ST3_3 may be commonly connected to the first node QB_A and the second node QB_B.

According to an embodiment, signal levels of the first output signal OUT1 and the first carry signal CR1 output by the first stage ST1_3 may be controlled based on the voltage of the first node QB_A, the voltage of the second node QB_B, and the voltage of the third node QA1, signal levels of the second output signal OUT2 and the second carry signal CR2 output by the stage ST2_3 may be controlled based on the voltage of the first node QB_A, the voltage of the second node QB_B, and the voltage of the fourth node QA2, and signals levels of the third output signal OUT3 and the third carry signal CR3 output by the third stage ST3_3 may be controlled based on the voltage of the first node QB_A, the voltage of the second node QB_B, and a voltage of a node QA3.

The first output control circuit OCC1_2 may include a first control unit 41, a second control unit 42, a third control unit 43, and a fourth control unit 44.

In an embodiment, the first output control circuit OCC1_2 may control the voltage of the first node QB_A and the voltage of the second node QB_B, based on the first node control signal GBI1, the second node control signal GBI2, the first power VGL1, and the second power VGL2. For example, the first output control circuit OCC1_2 may control an operation of the first output unit 12 and the second output unit 13 of the first stage ST1_3, an operation of the third output unit 22 and the fourth output unit 23 of the second stage ST2_3, and an operation of the fifth output unit 32 and the sixth output unit 33 of the third stage ST3_3, by controlling the voltage of the first node QB_A and the voltage of the second node QB_B.

As described above, according to embodiments of the disclosure, an operation of three adjacent stages, for example, the first to third stages ST1_3, ST2_3, and ST3_3, may be controlled by one output control circuit, for example, the first output control circuit OCC1_2. For example, an operation in which three adjacent stages, for example, the first to third stages ST1_3, ST2_3, and ST3_3, output the scan signal and the carry signal may be controlled by one output control circuit, for example, the first output control circuit OCC1_2. Accordingly, a dead space of the scan driver 200_3 may be further minimized.

According to embodiments, except for the number of stages included in the stage group, since the first stage group STG1_4 of FIG. 16 is substantially the same as or similar to the first stage group STG1 described with reference to FIG. 3, an overlapping description is not repeated.

In FIGS. 15 and 16, the description is given based on an embodiment in which three adjacent stages are included in one stage group. However, for example, the scan driver 200_3 may be implemented by including four or more adjacent stages in one stage group.

Figure 17A:
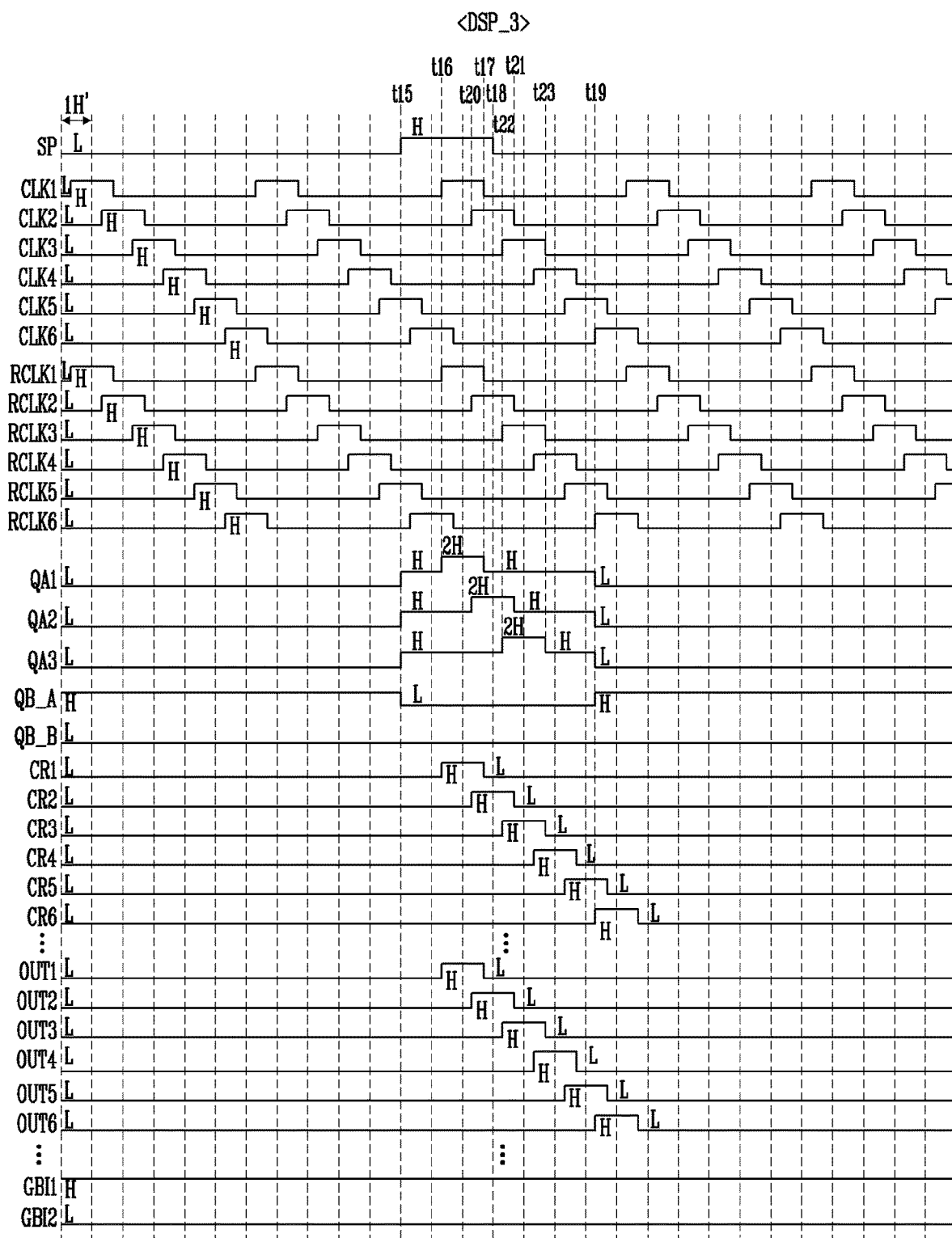
FIG. 17A is a timing diagram illustrating an example of driving of the first stage group of FIG. 15 in the display scan period.
Figure 17B:
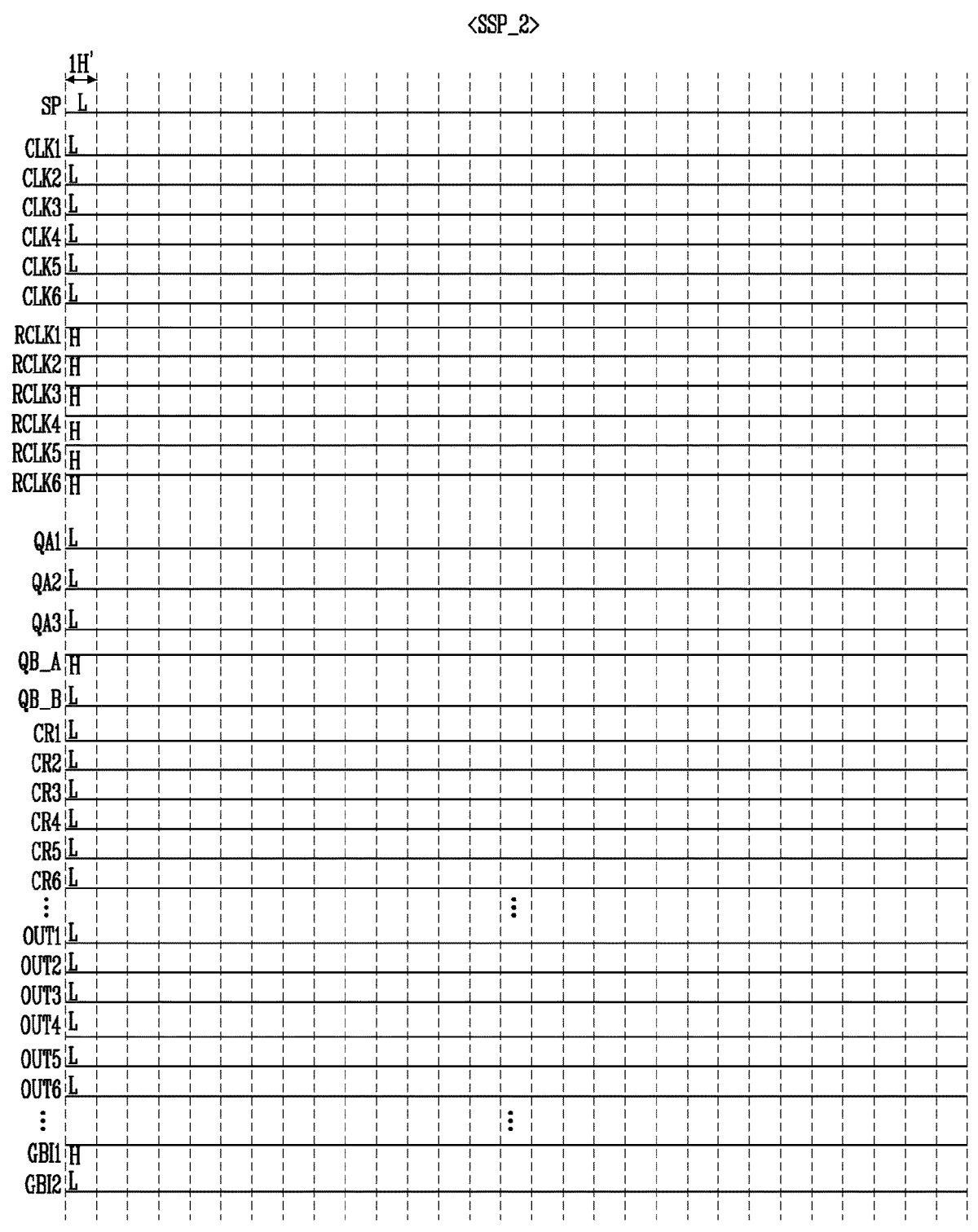

FIG. 17A is a timing diagram illustrating an example of driving of the first stage group STG1_4 of FIG. 15 in the display scan period. FIG. 17B is a timing diagram illustrating an example of driving the first stage group STG1_4 of FIG. 15 in the self-scan period. Meanwhile, for convenience of description, a description overlapping a content described with reference to FIGS. 6A and 6B is not be repeated in the description of FIGS. 17A and 17B.

Referring to FIGS. 1, 15, 16, 17A, and 17B, in FIGS. 17A and 17B, the scan signals (or the output signals OUT1 to OUT6) output through the scan lines SL1 to SLn and supplied to the pixels PX are shown. As described above, the scan driver 200_3 may supply a scan signal including a gate-on level of pulse to the scan lines SL1 to SLn in the display scan period DSP_3 of one frame. In addition, the scan driver 200_3 may supply a scan signal maintained as a gate-off level to the scan lines SL1 to SLn in the self-scan period SSP_2 of one frame.

In an embodiment, during a corresponding frame, for example, the display scan period DSP_3 and the self-scan period SSP_2, the first node control signal GBI1 may be maintained as the high level H, and the second node control signal GBI2 may be maintained as the low level L.

In FIGS. 17A and 17B, the description is given based on an embodiment in which the first node control signal GBI1 is maintained as the high level H and the second node control signal GBI2 is maintained as the low level L, and an embodiment in which the first node control signal GBI1 is maintained as the low level L and the second node control signal GBI2 is maintained as the high level H is described with reference to FIGS. 18A and 18B.

First, in order to describe an operation of the first stage group STG1_4 included in the scan driver 200_3 in the display scan period DSP_3, referring to FIGS. 15, 16, and 17A, in the display scan period DSP_3 of one frame, the first to sixth clock signals CLK1 to CLK6 may be supplied at different timings. For example, the second clock signal CLK2 may be set to a signal shifted by a 1/6 period, for example, 1 horizontal period 1H', from the first clock signal CLK1, the third clock signal CLK3 may be set to a signal shifted by 1/6 period, for example, 1 horizontal period 1H', from the second clock signal CLK2, the fourth clock signal CLK4 may be set to a signal shifted by 1/6 period, for example, 1 horizontal period 1H', from the third clock signal CLK3, the fifth clock signal CLK5 may be set to a signal shifted by about 1/6 period, for example, 1 horizontal period 1H', from the fourth clock signal CLK4, and the sixth clock signal CLK6 may be set to a signal shifted by about 1/6 period, for example, 1 horizontal period 1H', from the fifth clock signal CLK5.

In addition, in the display scan period DSP_3 of one frame, the first to sixth carry clock signals RCLK1 to RCLK6 may be supplied at different timings. For example, the second carry clock signal RCLK2 may be set to a signal shifted by 1/6 period, for example, 1 horizontal period 1H', from the first carry clock signal RCLK1, the third carry clock signal RCLK3 may be set to a signal shifted by 1/6 period, for example, 1 horizontal period 1H', from the second carry clock signal RCLK2, the fourth carry clock signal RCLK4 may be set to a signal shifted by 1/6 period, for example, 1 horizontal period 1H', from the third carry clock signal RCLK3, the fifth carry clock signal RCLK5 may be set to a signal shifted by about 1/6 period, for example, 1 horizontal period 1H', from the fourth carry clock signal RCLK4, and the sixth carry clock signal RCLK6 may be set to a signal shifted by about 1/6 period, for example, 1 horizontal period 1H', from the fifth carry clock signal RCLK5.

In a period from a fifteenth time point t15 to an eighteenth time point t18, the start pulse SP may have the high level H. In addition, in a period before the fifteenth time point t15 and a period after the eighteenth time point t18, the start pulse SP may have the low level L.

Meanwhile, similarly to that described with reference to FIG. 6A, in the period before the fifteenth time point t15, the voltage of the third node QA1 of the first stage ST1_3, the voltage of the fourth node QA2 of the second stage ST2_3, and the voltage of the fifth node QA3 of the third stage ST3_3 may have the low level L. Accordingly, in the period before the fifteenth time point t15, the eleventh to sixteenth transistors T11 to T16 may maintain a turn-off state.

Meanwhile, since the first node control signal GBI1 is maintained as the high level H, the seventeenth transistor T17 may be turned on or maintained as a turn-on state, and the eighteenth transistor T18 may be turned on or maintained as a turn-on state. Therefore, the first node control signal GBI1 of the high level H may be provided to the first node QB_A, and the voltage of the first node QB_A may have the high level H in the period before the fifteenth time point t15.

Meanwhile, unlike the first node control signal GBI1, since the second node control signal GBI2 is maintained as the low level L, the nineteenth transistor T19 and the twentieth transistor T20 may be turned off or maintained as a turn-off state. Accordingly, the second node QB_B may be maintained as the low level L.

Hereinafter, for convenience of description, the description is given based on an operation of the first stage ST1_3 and the first output control circuit OCC1_2 at fifteenth to nineteenth time points t15 to t19. In addition, an operation of the second stage ST2_3 and the third stage ST3_3 is mainly described based on a point different from that of the operation of the first stage ST1_3, and an overlapping description is not repeated.

At the fifteenth time point t15, the start pulse SP supplied through the first sub-input terminal 201a may transit from the low level L to the high level H. In this case, the first transistor T1 included in the first sub-input unit 11a may be turned on by the start pulse SP of the high level H (or the gate-on level).

When the first transistor T1 is turned on, the high level H of the start pulse SP may be supplied to the third node QA1. Accordingly, the voltage of the third node QA1 may transit from the low level L to the high level H.

Meanwhile, similarly to this, since the start pulse SP is supplied through the second sub-input terminal 201b of the second stage ST2_3, the first transistor T1 included in the second sub-input unit 11b of the second stage ST2_3 may be turned on at the fifteenth time point t15, and thus the voltage of the fourth node QA2 may transit from the low level L to the high level H.

In addition, similarly to this, since the start pulse SP is supplied through the ninth sub-input terminal 201c of the third stage ST3_3, the first transistor T1 included in the fifth sub-input unit 31a of the third stage ST3_3 may be turned on at the fifteenth time point t15, and thus the voltage of the fifth node QA3 may transit from the low level L to the high level H.

The eleventh, twelfth, and fourteenth transistors T11, T12, and T14 may be turned on by the voltage of the high level H of the third node QA1. In addition, the thirteenth, fifteenth, and sixteenth transistors T13, T15, and T16 may be turned on by the voltage of the high level H of the fifth node QA3. When the twelfth transistor T12 is turned on, the voltage of the second power VGL2 having the low level L may be supplied to the first node QB_A. Accordingly, the voltage of the first node QB_A may transit from the high level H to the low level L.

Meanwhile, the third transistor T3 of the first output unit 12 and the eighth transistor T8 of the second output unit 13 may be turned on by the voltage of the high level H of the third node QA1. Since both of the first clock signal CLK1 and the first carry clock signal RCLK1 have the low level L at the fifteenth time point t15, both of the first output signal OUT1 output through the first sub-output terminal 208a and the first carry signal CR1 output through the third sub-output terminal 209a may have the low level L.

Similarly to this, the third transistor T3 of the third output unit 22 and the eighth transistor T8 of the fourth output unit 23 may be turned on by the voltage of the high level H of the fourth node QA2. Since both of the second clock signal CLK2 and the second carry clock signal RCLK2 have the low level L at the fifteenth time point t15, the second output signal OUT2 output through the second sub-output terminal 208b and the second carry signal CR2 output through the fourth sub-output terminal 209b may have the low level L.

Similarly to this, the third transistor T3 of the fifth output unit 32 and the eighth transistor T8 of the sixth output unit 33 may be turned on by the voltage of the high level H of the fifth node QA3. Since both of the third clock signal CLK3 and the third carry clock signal RCLK3 have the low level L at the fifteenth time point t15, both of the third output signal OUT3 output through the fifth sub-output terminal 208c and the third carry signal CR3 output through the sixth sub-output terminal 209c may have the low level L.

Meanwhile, since the voltage of the third node QA1 has the high level H and the voltage of the node corresponding to the third sub-output terminal 209a has the low level L, the first capacitor C1 of the first stage ST1_3 may store the voltage corresponding to the difference (voltage difference) between the voltage of the high level H and the voltage of the low level L. Similarly to this, since the voltage of the fourth node QA2 has the high level H and the voltage of the node corresponding to the fourth sub-output terminal 209b has the low level L, the fourth capacitor C4 of the second stage ST2_3 may store the voltage corresponding to the difference (voltage difference) between the voltage of the high level H and the voltage of the low level L. Similarly to this, since the voltage of the fifth node QA3 has the high level H and a voltage of a node corresponding to the sixth sub-output terminal 209c has the low level L, the fifth capacitor C5 of the third stage ST3_3 may store a voltage corresponding to a difference (voltage difference) between the voltage of the high level H and the voltage of the low level L.

Thereafter, at the sixteenth time point t16, the first clock signal CLK1 of the high level H may be supplied through the third sub-input terminal 202a and the first carry clock signal RCLK1 of the high level H may be supplied.

Here, the third transistor T3 of the first output unit 12 and the eighth transistor T8 of the second output unit 13 may be turned on or may maintain a turn-on state by the voltage of the third node QA1 of the high level H.

Accordingly, the first clock signal CLK1 of the high level H may be supplied to the first sub-output terminal 208a, and thus the first output signal OUT1 may be output as the high level H.

In addition, since the eighth transistor T8 of the second output unit 13 is turned on or maintains the turn-on state, the first carry clock signal RCLK1 of the high level H may be supplied to the third sub-output terminal 209a, and thus the first carry signal CR1 may be output as the high level H.

Meanwhile, as described above, the voltage of the node corresponding to the third sub-output terminal 209a (that is, the node connected to the second electrode of the first capacitor C1) may change from the existing low level L to the high level H. In this case, the voltage of the third node QA1 may be increased from the existing high level H to the 2-high level 2H by the coupling of the first capacitor C1. Accordingly, the third transistor T3 of the first output unit 12 and the eighth transistor T8 of the second output unit 13 may stably maintain the turn-on state.

Thereafter, at the seventeenth time point t17, the first clock signal CLK1 of the low level L may be supplied through the third sub-input terminal 202a, and the first carry clock signal RCLK1 of the low level L may be supplied through the fifth sub-input terminal 203a.

Here, the third transistor T3 of the first output unit 12 and the eighth transistor T8 of the second output unit 13 may be turned on or may maintain a turn-on state by the voltage of the third node QA1 of the high level H.

Accordingly, the first clock signal CLK1 of the low level L may be supplied to the first sub-output terminal 208a, and thus the first output signal OUT1 may be output as the low level L again.

In addition, since the eighth transistor T8 of the second output unit 13 is turned on or maintains the turn-on state, the first carry clock signal RCLK1 of the low level L may be supplied to the third sub-output terminal 209a, and thus the first carry signal CR1 may be output as the low level L again.

Meanwhile, as described above, the voltage of the node corresponding to the third sub-output terminal 209a (that is, the node connected to the second electrode of the first capacitor C1) may change from the existing high level H to the low level L. In this case, the voltage of the third node QA1 may be lowered from the existing 2-high level 2H to the high level H again due to the coupling of the first capacitor C1.

Thereafter, at the eighteenth time point t18, the start pulse SP supplied through the first input terminal 201, for example, the first sub-input terminal 201a, the second sub-input terminal 201b, and the ninth sub-input terminal 201c, may transit from the high level H to the low level L.

Thereafter, at the nineteenth time point t19, the second input signal IN2 of the high level H (or the gate-on level), for example, the sixth carry signal CR6 of the high level H, may be supplied through the fourth input terminal 204. In this case, the second transistor T2 of the second sub-input unit 11b may be turned on.

Accordingly, the voltage of the second power VGL2 of the low level L may be supplied to the third node QA1, and thus the voltage of the third node QA1 may transit from the high level H to the low level L at the nineteenth time point t19.

Meanwhile, the second stage ST2_3 may operate substantially identically or similarly to the operation of the first stage ST1_3 described above.

For example, at the fifteenth time point t15, the voltage of the fourth node QA2 may transit from the low level L to the high level H by the first input signal IN1 (or the start pulse SP) of the high level H provided to the second sub-input terminal 201b. Accordingly, each of the third transistor T3 of the third output unit 22 and the eighth transistor T8 of the fourth output unit 23 may be turned on, and the second output signal OUT2 of the high level H and the second carry signal CR2 of the high level H may be output to the second sub-output terminal 208b and the fourth sub-output terminal 209b, respectively, in response to a period in which the second clock signal CLK2 supplied through the fourth sub-input terminal 202b and the second carry clock signal RCLK2 supplied through the sixth sub-input terminal 203b have the high level H. For example, in a period from a twentieth time point t20 to a twenty-first time point t21, the second clock signal CLK2 and the second carry clock signal RCLK2 may have the high level H. Accordingly, in the period from the twentieth time point t20 to the twenty-first time point t21, the second output signal OUT2 of the high level H may be output to the second sub-output terminal 208b through the third transistor T3 that is turned on (or maintaining the turn-on state) of the third output unit 22, and the second carry signal CR2 of the high level H may be output to the fourth sub-output terminal 209b through the eighth transistor T8 that is turned on (or maintaining the turn-on state) of the fourth output unit 23.

In addition, at the nineteenth time point t19, since the second input signal IN2 of the high level H (or the gate-on level), for example, the sixth carry signal CR6 of the high level H, is supplied through the fourth input terminal 204, the second transistor T2 of the fourth sub-input unit 201b may be turned on. In this case, since the voltage of the second power VGL2 of the low level L is supplied to the fourth node QA2, the voltage of the fourth node QA2 may transit from the high level H to the low level L at the nineteenth time point t19.

Meanwhile, the third stage ST3_3 may operate substantially identically or similarly to the operation of the first stage ST1_3 described above.

For example, at the fifteenth time point t15, the voltage of the fifth node QA3 may transit from the low level L to the high level H by the first input signal IN1 (or the start pulse SP) of the high level H provided to the ninth sub-input terminal 201c. Accordingly, each of the third transistor T3 of the fifth output unit 32 and the eighth transistor T8 of the sixth output unit 33 may be turned on, and the third output signal OUT3 of the high level H and the third carry signal CR3 of the high level H may be output to the fifth sub-output terminal 208c and the sixth sub-output terminal 209c, respectively, in response to a period in which the third clock signal CLK3 supplied through the tenth sub-input terminal 202c and the third carry clock signal RCLK3 supplied through the eleventh sub-input terminal 203c have the high level H. For example, in a period from a twenty-second time point t22 to a twenty-third time point t23, the third clock signal CLK3 and the third carry clock signal RCLK3 may have the high level H. Accordingly, in the period from the twenty-second time point t22 to the twenty-third time point t23, the third output signal OUT3 of the high level H may be output to the fifth sub-output terminal 208c through the third transistor T3 that is turned on (or maintaining the turn-on state) of the fifth output unit 32, and the third carry signal CR3 of the high level H may be output to the sixth sub-output terminal 209c through the eighth transistor T8 that is turned on (or maintaining the turn-on state) of the sixth output unit 33.

In addition, at the nineteenth time point t19, since the second input signal IN2 of the high level H (or the gate-on level), for example, the sixth carry signal CR6 of the high level H, is supplied through the fourth input terminal 204, the second transistor T2 of the ninth sub-input unit 201c may be turned on. In this case, since the voltage of the second power VGL2 of the low level L is supplied to the fifth node QA3, the voltage of the fifth node QA3 may transit from the high level H to the low level L at the nineteenth time point t19.

The third and eighth transistors T3 and T8 included in each of the first stage ST1_3, the second stage ST2_3, and the third stage ST3_3 may be turned off by the voltage of the low level L of the third node QA1, the voltage of the low level L of the fourth node QA2, and the voltage of the low level L of the fifth node QA3.

In addition, the eleventh to sixteenth transistors T11 to T16 may be turned off by the voltage of the low level L of the third node QA1 and the voltage of the low level L of the fifth node QA3. Here, since the twelfth transistor T12 is turned off, the voltage of the second power VGL2 of the low level L may be blocked from being supplied to the first node QB_A.

Here, as described above, since the seventeenth and eighteenth transistors T17 and T18 are turned on or maintain the turn-on state by the first node control signal GBI1 of the high level H, the voltage of the first node QB_A may change from the low level L to the high level H in correspondence with the nineteenth time point t19.

The fourth transistor T4 and the ninth transistor T9 included in each of the first stage ST1_3, the second stage ST2_3, and the third stage ST3_3 may be turned on by the voltage of the high level H of the first node QB_A.

Since the fourth transistor T4 is turned on, the voltage of the first power VGL1 of the low level L may be supplied to the first sub-output terminal 208a (the second sub-output terminal 208b, or the fifth sub-output terminal 208c), and thus the first output signal OUT1 (the second output signal OUT2, or the third output signal OUT3) may be output as the low level L.

In addition, since the ninth transistor T9 is turned on, the voltage of the second power VGL2 of the low level L may be supplied to the third sub-output terminal 209a (the fourth sub-output terminal 209b, or the sixth sub-output terminal 209c), and thus the first carry signal CR1 (the second carry signal CR2, or the third carry signal CR3) may be output as the low level L.

Next, in order to describe the operation of the first stage group STG1 included in the scan driver 200 in the self-scan period SSP_2, referring further to FIG. 17B, in the self-scan period SSP_2 of one frame, the start pulse SP may be maintained as the low level L.

In an embodiment, the first to sixth clock signals CLK1 to CLK6 may be maintained as a constant level during the self-scan period SSP of one frame. For example, the first to sixth clock signals CLK1 to CLK6 may be maintained as the low level L.

In addition, during the self-scan period SSP_2 of one frame, the first to sixth carry clock signals RCLK1 to RCLK6 may be maintained as a constant level. For example, the first to sixth carry clock signals RCLK1 to RCLK6 may be maintained as the high level H.

Here, since the start pulse SP is maintained as the low level L, the first transistor T1 may maintain a turn-off state. In this case, the voltage of the low level L supplied to the third node QA1, the fourth node QA2, and the fifth node QA3 before the self-scan period SSP_2 may be maintained.

Since each of the voltages of the third node QA1, the fourth node QA2, and the fifth node QA3 is maintained as the low level L, the third transistor T3 and the eighth transistor T8 included in each of the first stage ST1_3, the second stage ST2_3, and the third stage ST3_3 may be maintained as a turn-off state. In addition, since the voltages of the third node QA1, the fourth node QA2, and the third node QA3 are maintained as the low level L, the eleventh to sixteenth transistors T11 to T16 may be maintained as a turn-off state.

Meanwhile, since the voltage of the first node QB_A is maintained as the high level H by the first node control signal GBI1 maintained as the high level H, the fourth transistor T4 and the ninth transistor T9 included in each of the first stage ST1_3, the second stage ST2_3, and the third stage ST3_3 may maintain a turn-on state.

Since the fourth transistor T4 maintains the turn-on state, the voltage of the first power VGL1 of the low level L may be supplied to the first sub-output terminal 208a (or the second sub-output terminal 208b), and thus the first output signal OUT1 (the second output signal OUT2, or the third output signal OUT3) output through the first sub-output terminal 208a (the second sub-output terminal 208b, or the fifth sub-output terminal 208c) may be maintained as the low level L.

In addition, since the ninth transistor T9 maintains the turn-on state, the voltage of the second power VGL2 of the low level L may be supplied to the third sub-output terminal 209a (the fourth sub-output terminal 209b, or the sixth sub-output terminal 209c), and thus the first carry signal CR1 (the second carry signal CR2, or the third carry signal CR3) output to the third sub-output terminal 209a (the fourth sub-output terminal 209b, or the sixth sub-output terminal 209c) may be maintained as the low level L.

Figure 18A:
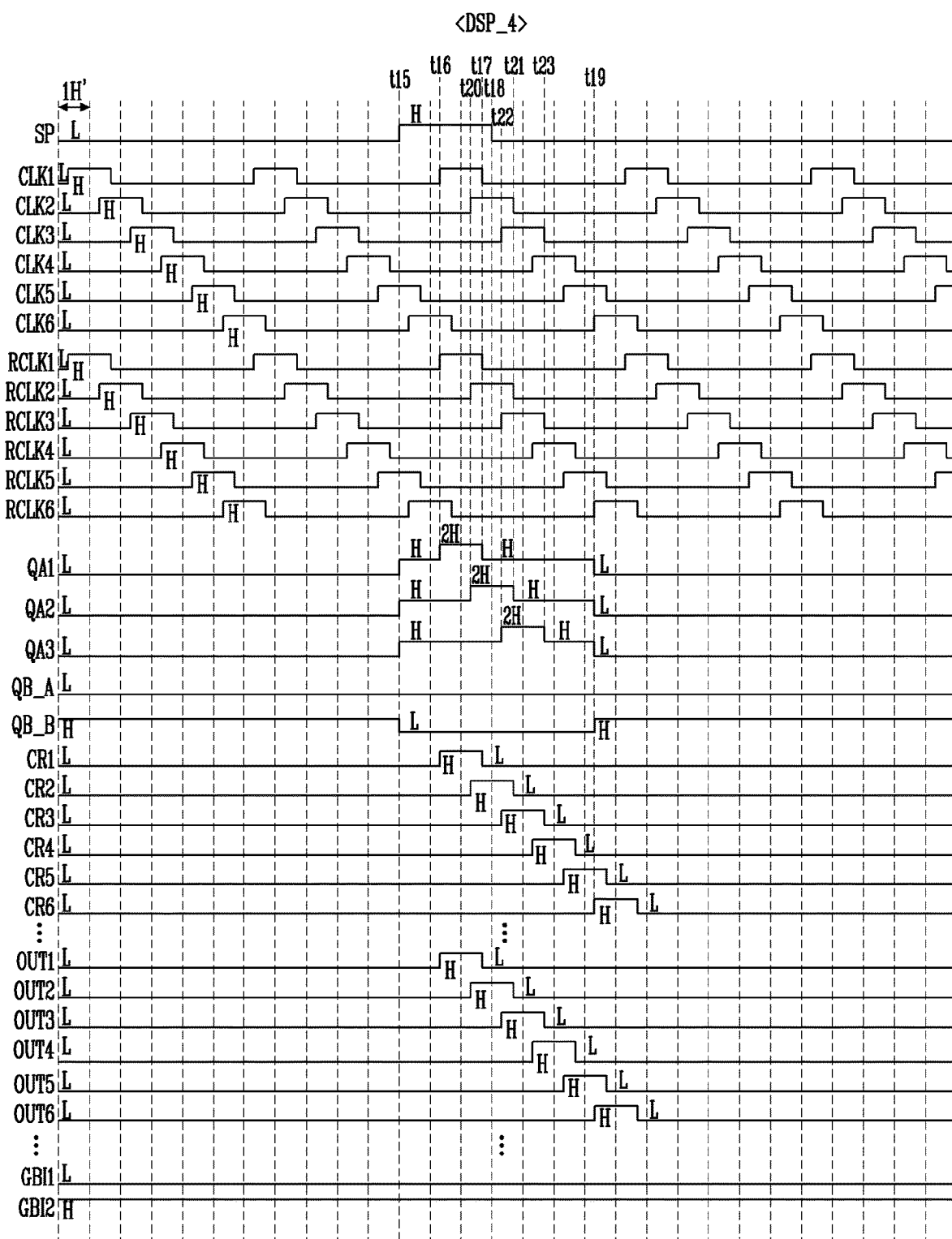
FIG. 18A is a timing diagram illustrating an example of driving the first stage group of FIG. 15 in the display scan period.

FIG. 18A is a timing diagram illustrating an example of driving the first stage group STG1_4 of FIG. 15 in the display scan period. FIG. 18B is a timing diagram illustrating an example of driving the first stage group STG1_4 of FIG. 15 in the self-scan period.

Figure 18B:
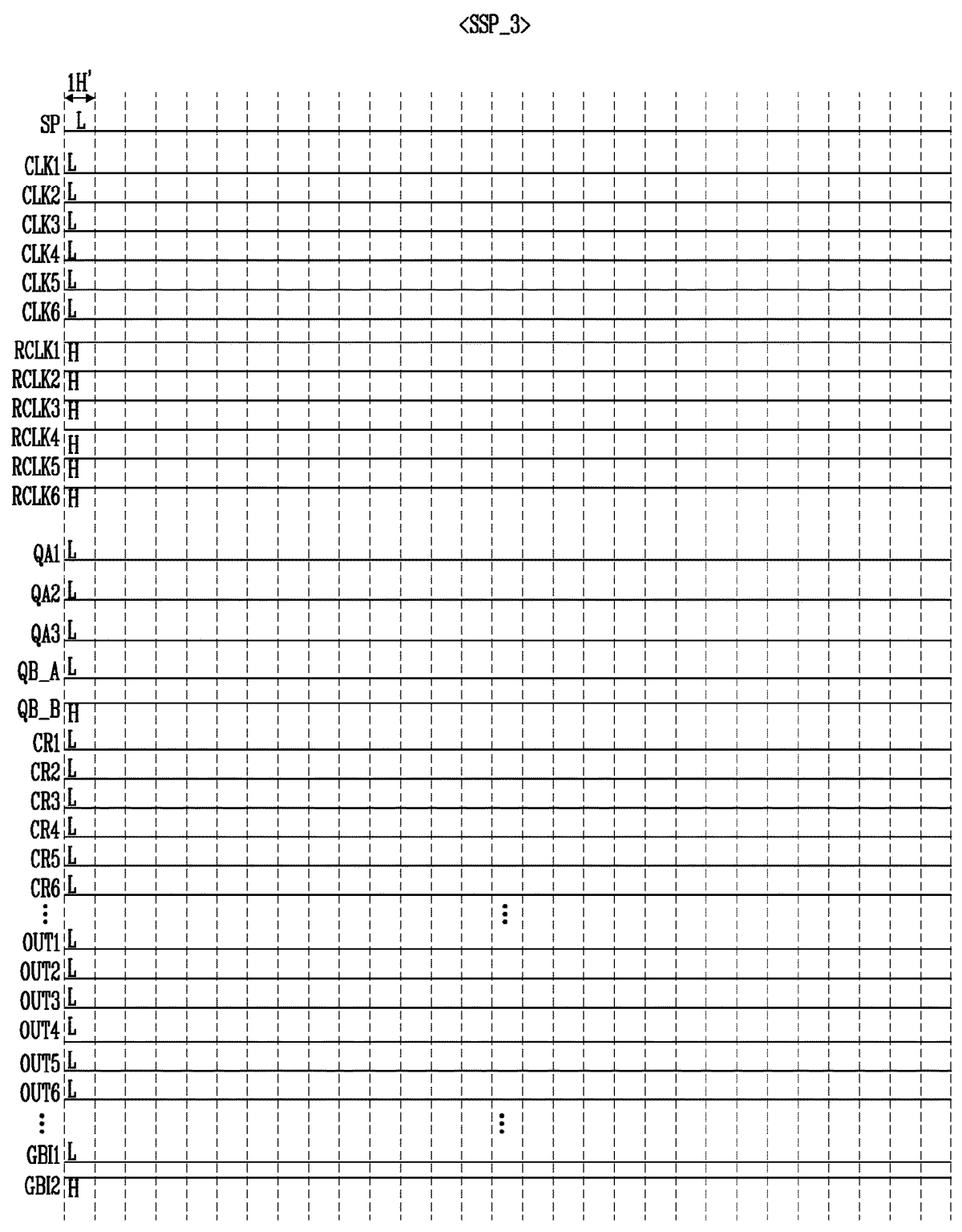

Referring to FIGS. 15, 16, 18A, and 18B, a timing diagram of signals in the display scan period DSP_4 is shown in FIG. 18A, and a timing diagram of signals in the self-scan period SSP_3 is shown in FIG. 18B.

Meanwhile, in FIGS. 18A and 18B, since the timing diagram of the signals in the display scan period DSP_4 of FIG. 18A and the timing diagram of the signals in the self-scan period SSP_3 of FIG. 18B are substantially the same as or similar to the timing diagram of the signals in the display scan period DSP_3 of FIG. 17A and the timing diagram of the signals in the self-scan period SSP_2 of FIG.

17B, respectively, except that the first node control signal GBI1 is maintained as the low level L and the second node control signal GBI2 is maintained as the high level H, an overlapping description is not repeated.

In an embodiment, during a corresponding frame, for example, the display scan period DSP_4 and the self-scan period SSP_3, the first node control signal GBI1 may be maintained as the low level L, and the second node control signal GBI2 may be maintained as the high level H. That is, the first node control signal GBI1 and the second node control signal GBI2 may have opposite signal levels.

First, in order to describe the operation of the first stage group STG1_4 in the display scan period DSP_3, referring to FIGS. 15, 16, and 18A, since the second node control signal GBI2 is maintained as the high level H, the nineteenth transistor T19 may be turned on or maintained as a turn-on state. Accordingly, the second node control signal GBI2 of the high level H may be provided to the second control node N2, and thus the twentieth transistor T20 may be turned on or maintained as a turn-on state. In this case, since the second node control signal GBI2 of the high level H is provided to the second node QB_B, in a period before the fifteenth time point t15, the voltage of the second node QB_B may have the high level H.

Meanwhile, unlike the second node control signal GBI2, since the first node control signal GBI1 is maintained as the low level L, the seventeenth transistor T17 and the eighteenth transistor T18 may be turned off or maintained as a turn-off state. Accordingly, the first node QB_A may be maintained as the low level L.

At the fifteenth time point t15, the eleventh to sixteenth transistors T11 to T16 may be turned on by the voltage of the high level H of the third node QA1 and the voltage of the high level H of the fifth node QA3.

When the fifteenth transistor T15 is turned on, the voltage of the second power VGL2 having the low level L may be supplied to the second node QB_B. Accordingly, the voltage of the second node QB_B may transit from the high level H to the low level L.

Meanwhile, since the fourteenth transistor T14 and the sixteenth transistor T16 are turned on, the voltage of the first power VGL1 of the low level L may be supplied to the second control node N2, and thus the twentieth transistor T20 may be turned off or may maintain a turn-off state.

Thereafter, at the nineteenth time point t19, the eleventh to sixteenth transistors T11 to T16 may be turned off by the voltage of the low level L of the third node QA1 and the voltage of the low level L of the fifth node QA3. Here, since the fifteenth transistor T15 is turned off, the voltage of the second power VGL2 of the low level L may be blocked from being supplied to the second node QB_B.

Here, as described above, since the nineteenth and twentieth transistors T19 and T20 are turned on or maintain the turn-on state by the second node control signal GBI2 of the high level H, the voltage of the second node QB_B may change from the low level L to the high level H in correspondence with the nineteenth time point t19.

The fifth transistor T5 and the tenth transistor T10 included in each of the first stage ST1_3, the second stage ST2_3, and the third stage ST3_3 may be turned on by the voltage of the high level H of the second node QB_B.

Since the fifth transistor T5 is turned on, the voltage of the first power VGL1 of the low level L may be supplied to the first sub-output terminal 208a (the second sub-output terminal 208b, or the fifth sub-output terminal 208c), and thus the first output signal OUT1 (the second output signal OUT2, or the third output signal OUT3) may be output as the low level L.

In addition, since the tenth transistor T10 is turned on, the voltage of the second power VGL2 of the low level L may be supplied to the third sub-output terminal 209a (the fourth sub-output terminal 209b, or the sixth sub-output terminal 209c), and thus the first carry signal CR1 (the second carry signal CR2, or the third carry signal CR3) may be output as the low level L.

Next, in order to describe the operation of the first stage group STG1_4 the self-scan period SSP_3, referring further to FIG. 18B, in the self-scan period SSP_3 of one frame, the start pulse SP may be maintained as the low level L.

In an embodiment, the first to sixth clock signals CLK1 to CLK6 may be maintained as a constant level during the self-scan period SSP_3 of one frame. For example, the first to sixth clock signals CLK1 to CLK6 may be maintained as the low level L.

In addition, during the self-scan period SSP_3 of one frame, the first to sixth carry clock signals RCLK1 to RCLK6 may be maintained as a constant level. For example, the first to sixth carry clock signals RCLK1 to RCLK6 may be maintained as the high level H.

Here, since the start pulse SP is maintained as the low level L, the first transistor T1 may maintain a turn-off state. In this case, the voltage of the low level L supplied to the third node QA1 the fourth node QA2, and the fifth node QA3 before the self-scan period SSP_3 may be maintained.

Since each of the voltages of the third node QA1, the fourth node QA2, and the fifth node QA3 is maintained as the low level L, the third transistor T3 and the eighth transistor T8 included in each of the first stage ST1_3, the second stage ST2_3, and the third stage ST3_3 may be maintained as a turn-off state. In addition, since the voltage of the third node QA1 and the voltage of the fifth node QA3 are maintained as the low level L, the eleventh to sixteenth transistors T11 to T16 may be maintained as a turn-off state.

Meanwhile, since the voltage of the second node QB_B is maintained as the high level H by the second node control signal GBI2 maintained as the high level H, the fifth transistor T5 and the tenth transistor T10 included in each of the first stage ST1_3, the second stage ST2_3, and the third stage ST3_3 may maintain a turn-on state.

Since the fifth transistor T5 maintains the turn-on state, the voltage of the first power VGL1 of the low level L may be supplied to the first sub-output terminal 208a (the second sub-output terminal 208b, or the fifth sub-output terminal 208c), and thus the first output signal OUT1 (the second output signal OUT2, or the third output signal OUT3) output through the first sub-output terminal 208a (the second sub-output terminal 208b, or the fifth sub-output terminal 208c) may be maintained as the low level L.

In addition, since the tenth transistor T10 maintains the turn-on state, the voltage of the second power VGL2 of the low level L may be supplied to the third sub-output terminal 209a (the fourth sub-output terminal 209b, or the sixth sub-output terminal 209c), and thus the first carry signal CR1 (the second carry signal CR2, or the third carry signal CR3) output to the third sub-output terminal 209a (the fourth sub-output terminal 209b, or the sixth sub-output terminal 209c) may be maintained as the low level L.

In an embodiment, as described above, the signal level of the first node control signal GBI1 and the signal level of the second node control signal GBI2 may vary at a constant period. For example, the signal level of the first node control signal GBI1 and the signal level of the second node control signal GBI2 may vary in one frame unit. As another example, the signal level of the first node control signal GBI1 and the signal level of the second node control signal GBI2 may vary in two or more frame units. However, in an embodiment, the signal level of the first node control signal GBI1 and the signal level of the second node control signal GBI2 may vary in one horizontal line unit, for example, 1 horizontal period 1H.

Although the disclosure has been described with reference to the embodiments thereof, it will be understood by those skilled in the art that various changes and modifications of the disclosure may be made without departing from the spirit and scope of the disclosure disclosed in the claims.

What is claimed is:

1. A scan driver comprising:
a plurality of stage groups configured to supply scan signals to scan lines based on clock signals, carry clock signals, a first power, and a second power,
wherein a first stage group of the stage groups comprises:
a first stage configured to supply a first scan signal to a first scan line based on an input signal, a first clock signal of the clock signals, a first carry clock signal of the carry clock signals, the first power, and the second power; and
a second stage configured to supply a second scan signal to a second scan line based on the input signal, a second clock signal of the clock signals, a second carry clock signal of the carry clock signals, the first power, and the second power, and
the first stage and the second stage are commonly connected to a first node and a second node, wherein the first stage comprises:
a first input unit configured to control a voltage of a third node based on the input signal and the second power;
a first output unit configured to output the first scan signal based on a voltage of the first node, a voltage of the second node, the voltage of the third node, the first clock signal, and the first power; and
a second output unit configured to output a first carry signal based on the voltage of the first node, the voltage of the second node, the voltage of the third node, the first carry clock signal, and the second power, and
the second stage comprises:
a second input unit configured to control a voltage of a fourth node based on the input signal and the second power;
a third output unit configured to output the second scan signal based on the voltage of the first node, the voltage of the second node, the voltage of the fourth node, the second clock signal, and the first power; and
a fourth output unit configured to output a second carry signal based on the voltage of the first node, the voltage of the second node, the voltage of the fourth node, the second carry clock signal, and the second power.

2. The scan driver according to claim 1, wherein the first stage group further comprises an output control circuit configured to control the voltage of the first node and the voltage of the second node based on a first node control signal, a second node control signal, the first power, the second power, the voltage of the third node, and the voltage of the fourth node.

3. The scan driver according to claim 2, wherein the output control circuit comprises:
a first control unit configured to control the voltage of the first node based on a voltage of the first control node, the voltage of the third node, the voltage of the fourth node, the first power, and the second power;
a second control unit configured to control the voltage of the second node based on a voltage of the second control node, the voltage of the third node, the voltage of the fourth node, the first power, and the second power;
a third control unit configured to control the voltage of the first control node based on the first node control signal; and
a fourth control unit configured to control the voltage of the second control node based on the second node control signal.

4. A scan driver comprising:
a plurality of stage groups configured to supply scan signals to scan lines based on clock signals, carry clock signals, a first power, and a second power,
wherein a first stage group of the stage groups comprises:
a first stage configured to supply a first scan signal to a first scan line based on an input signal, a first clock signal of the clock signals, a first carry clock signal of the carry clock signals, the first power, and the second power; and
a second stage configured to supply a second scan signal to a second scan line based on the input signal, a second clock signal of the clock signals, a second carry clock signal of the carry clock signals, the first power, and the second power, and
the first stage and the second stage are commonly connected to a first node and a second node, wherein each of the clock signals and each of the carry clock signals has a constant signal level in at least a portion of one frame,
the one frame includes a display scan period and a self-scan period,
in the self-scan period, each of the carry clock signals is maintained as a first level, and
in the self-scan period, each of the clock signals is maintained as a second level lower than the first level.

5. The scan driver according to claim 2, wherein each of the first node control signal and the second node control signal has a constant signal level during one frame, and
a signal level of the first node control signal is different from a signal level of the second node control signal.

6. The scan driver according to claim 1, wherein the first input unit comprises:
a first transistor connected between a first input terminal to which a first input signal of the input signals is supplied and the third node, and having a gate electrode connected to the first input terminal; and
a second transistor connected between the third node and a second power input terminal to which a voltage of the second power is supplied, and having a gate electrode connected to a fourth input terminal to which a second input signal of the input signals is supplied.

7. The scan driver according to claim 1, wherein the first output unit comprises:
a third transistor connected between a second input terminal to which the first clock signal is supplied and a first output terminal to which the first scan signal is output, and having a gate electrode connected to the third node;
a fourth transistor connected between a first power input terminal to which a voltage of the first power is supplied and the first output terminal, and having a gate electrode connected to the first node; and
a fifth transistor connected between the first power input terminal and the first output terminal, and having a gate electrode connected to the second node.

8. The scan driver according to claim 1, wherein the second output unit comprises:
a sixth transistor connected between the third node and a second output terminal to which the first carry signal is output, and having a gate electrode connected to the first node; and
a seventh transistor connected between the third node and the second output terminal, and having a gate electrode connected to the second node.

9. The scan driver according to claim 8, wherein the second output unit comprises:
an eighth transistor connected between a third input terminal to which the first carry clock signal is supplied and the second output terminal, and having a gate electrode connected to the third node;
a ninth transistor connected between a second power input terminal to which a voltage of the second power is supplied and the second output terminal, and having a gate electrode connected to the first node; and
a tenth transistor connected between the second power input terminal and the second output terminal, and having a gate electrode connected to the second node.

10. The scan driver according to claim 9, wherein the first stage further comprises a first capacitor connected between the third node and the second output terminal.

11. The scan driver according to claim 3, wherein the first control unit comprises:
an eleventh transistor connected between the first control node and a first power input terminal to which a voltage of the first power is supplied, and having a gate electrode connected to the third node;
a twelfth transistor connected between the first node and a second power input terminal to which a voltage of the second power is supplied, and having a gate electrode connected to the third node; and
a thirteenth transistor connected between the first control node and the first power input terminal, and having a gate electrode connected to the fourth node, and
the second control unit comprises:
a fourteenth transistor connected between the second control node and the first power input terminal, and having a gate electrode connected to the third node;
a fifteenth transistor connected between the second node and the second power input terminal, and having a gate electrode connected to the fourth node; and
a sixteenth transistor connected between the second control node and the first power input terminal, and having a gate electrode connected to the fourth node.

12. The scan driver according to claim 11, wherein the third control unit comprises:
a seventeenth transistor connected between a fifth input terminal to which the first node control signal is supplied and the first control node, and having a gate electrode connected to the fifth input terminal; and
an eighteenth transistor connected between the fifth input terminal and the first node, and having a gate electrode connected to the first control node, and
the fourth control unit comprises:
a nineteenth transistor connected between a sixth input terminal to which the second node control signal is supplied and the second control node, and having a gate electrode connected to the sixth input terminal; and
a twentieth transistor connected between the sixth input terminal and the second node, and having a gate electrode connected to the second control node.

13. The scan driver according to claim 11, wherein the first control unit further comprises a second capacitor connected between the first node and the first control node, and the second control unit further comprises a third capacitor connected between the second node and the second control node.

14. The scan driver according to claim 9, wherein the second output unit further comprises a twenty-third transistor connected between the third node and the sixth transistor, and having a gate electrode connected to the third input terminal.

15. A scan driver comprising:
a plurality of stage groups configured to supply scan signals to scan lines based on clock signals, carry clock signals, a first power, and a second power,
wherein a first stage group of the stage groups comprises:
a first stage configured to supply a first scan signal to a first scan line based on an input signal, a first clock signal of the clock signals, a first carry clock signal of the carry clock signals, the first power, and the second power; and
a second stage configured to supply a second scan signal to a second scan line based on the input signal, a second clock signal of the clock signals, a second carry clock signal of the carry clock signals, the first power, and the second power, and
the first stage and the second stage are commonly connected to a first node and a second node, wherein the first stage comprises:
a first input unit configured to control a voltage of a third node based on the input signal;
a first output unit configured to output the first scan signal based on a voltage of the first node, a voltage of the second node, the voltage of the third node, the first clock signal, and the first power; and
a second output unit configured to output a first carry signal based on the voltage of the first node, the voltage of the second node, the voltage of the third node, the first carry clock signal, and the second power, and
the second stage comprises:
a second input unit configured to control a voltage of a fourth node based on the input signal;
a third output unit configured to output the second scan signal based on the voltage of the first node, the voltage of the second node, the voltage of the fourth node, the second clock signal, and the first power; and
a fourth output unit configured to output a second carry signal based on the voltage of the first node, the voltage of the second node, the voltage of the fourth node, the second carry clock signal, and the second power.

16. The scan driver according to claim 15, wherein the first input unit comprises a first transistor connected between a first input terminal to which a first input signal of the input signal is supplied and the third node, and having a gate electrode connected to a fourth input terminal to which a second input signal of the input signal is supplied, and
the second input signal is a third carry clock signal of the carry clock signals.

17. The scan driver according to claim 1, wherein the first stage group further comprises a third stage configured to supply a third scan signal to a third scan line based on the input signal, a third clock signal of the clock signals, a third carry clock signal of the carry clock signals, the first power, and the second power, and
the third stage is commonly connected to the first node and the second node together with the first stage and the second stage.

18. The scan driver according to claim 17, wherein the third stage comprises:
- a third input unit configured to control a voltage of a fifth node based on the input signal and the second power;
- a fifth output unit configured to output the third scan signal based on the voltage of the first node, the voltage of the second node, the voltage of the fifth node, the third clock signal, and the first power; and
- a sixth output unit configured to output a third carry signal based on the voltage of the first node, the voltage of the second node, the voltage of the fifth node, the third carry clock signal, and the second power, and
- the first stage group further comprises an output control circuit configured to control the voltage of the first node and the voltage of the second node based on a first node control signal, a second node control signal, the first power, the second power, the voltage of the third node, and the voltage of the fifth node.

19. A scan driver comprising:
- a plurality of stage groups configured to supply scan signals to scan lines based on clock signals, carry clock signals, a first power, and a second power,
- wherein a first stage group of the stage groups comprises:
  - a first stage configured to supply a first scan signal to a first scan line by controlling a voltage of a third node based on an input signal, a first clock signal of the clock signals, a first carry clock signal of the carry clock signals, the first power, the second power, and a voltage of a first node or a second node;
  - a second stage configured to supply a second scan signal to a second scan line by controlling a voltage of a fourth node based on the input signal, a second clock signal of the clock signals, a second carry clock signal of the carry clock signals, the first power, the second power, and the voltage of the first node or the second node; and
  - an output control circuit configured to control the voltage of the first node and the voltage of the second node based on a first node control signal, a second node control signal, the first power, the second power, the voltage of the third node, and the voltage of the fourth node.

* * * * *